(12) United States Patent
Sakai et al.

(10) Patent No.: US 12,399,951 B2
(45) Date of Patent: Aug. 26, 2025

(54) INFORMATION PROCESSING DEVICE, NON-TRANSITORY STORAGE MEDIUM, INFORMATION PROCESSING METHOD AND ELECTRONIC CIRCUIT

(71) Applicants: KABUSHIKI KAISHA TOSHIBA, Tokyo (JP); TOSHIBA DIGITAL SOLUTIONS CORPORATION, Kawasaki (JP)

(72) Inventors: Yoshisato Sakai, Kawasaki Kanagawa (JP); Hayato Goto, Kawasaki Kanagawa (JP); Kosuke Tatsumura, Yokohama Kanagawa (JP); Kotaro Endo, Tokyo (JP); Masaru Suzuki, Tokyo (JP)

(73) Assignees: Kabushiki Kaisha Toshiba, Tokyo (JP); Toshiba Digital Solutions Corporation, Kawasaki (JP)

( * ) Notice: Subject to any disclaimer, the term of this patent is extended or adjusted under 35 U.S.C. 154(b) by 990 days.

(21) Appl. No.: 17/249,353

(22) Filed: Feb. 26, 2021

(65) Prior Publication Data

US 2021/0182356 A1 Jun. 17, 2021

Related U.S. Application Data

(63) Continuation of application No. PCT/JP2020/006841, filed on Feb. 20, 2020.

(30) Foreign Application Priority Data

Sep. 10, 2019 (JP) .................................. 2019-164742

(51) Int. Cl.
*G06F 17/11* (2006.01)
*G06F 17/16* (2006.01)

(52) U.S. Cl.
CPC .............. *G06F 17/11* (2013.01); *G06F 17/16* (2013.01)

(58) Field of Classification Search
CPC ......... G06F 17/11; G06F 17/16; G06N 10/00; G06N 10/60
See application file for complete search history.

(56) References Cited

U.S. PATENT DOCUMENTS 10,250,271 B2   4/2019   Goto
10,860,679 B2  12/2020   Goto et al.
(Continued)

FOREIGN PATENT DOCUMENTS

JP   2017-73106 A    4/2013
JP   2019-145010 A   8/2019
(Continued)

OTHER PUBLICATIONS

W. Kern, On the depth of combinatorial optimization problems, Discrete Applied Mathematics 43, 1993 (Year: 1993).*
(Continued)

*Primary Examiner* — Emily E Larocque
(74) *Attorney, Agent, or Firm* — Finnegan, Henderson, Farabow, Garrett & Dunner, LLP

(57) ABSTRACT

According to one embodiment, an information processing device includes a first processing circuit and a second processing circuit. The first processing circuit is configured to update a third vector based on basic equations. Each of the basic equations is a partial derivative of an objective function with respect to either of the variables in the objective function. The second processing circuit is configured to update the element of the first vector and update the element of the second vector. The element of the first vector smaller
(Continued)

than a first value is set to the first value. The element of the first vector greater than a second value is set to the second value.

23 Claims, 40 Drawing Sheets

(56) References Cited

U.S. PATENT DOCUMENTS

| | | |
|---|---|---|
| 2020/0233921 A1 | 7/2020 | Sakai et al. |
| 2020/0401738 A1 | 12/2020 | Tamura |
| 2022/0129780 A1 | 4/2022 | Okuyama et al. |

FOREIGN PATENT DOCUMENTS

| | | |
|---|---|---|
| JP | 2020-119108 A | 8/2020 |
| JP | 2020-204929 A | 12/2020 |
| WO | WO 2020/202312 A1 | 10/2020 |

OTHER PUBLICATIONS

K.P. Kalinin et al., Global optimization of spin Hamiltonians with gain-dissipative systems, Scientific Reports, 2018 (Year: 2018).*

H. Goto, et al. "Combinatorial optimization by simulating adiabatic bifurcations in nonlinear Hamiltonian systems," Science Advances,5:eeav2372, 8 pages (2019).

H. Goto, et al. "Bifurcation-based adiabatic quantum computation with a nonlinear oscillator network," Scientific Reports, 6:21686, 8 pages (2016).

T. Inagaki, et al., "A coherent Ising machine for 2000-node optimization problems," Science, vol. 354, No. 6312, pp. 603-606 (2016).

M.W. Johnson, et al., "Quantum annealing with manufactured spins," Nature, vol. 473, pp. 194-198 (2011).

A. Lucas, "Ising formulations of many NP problems," Frontiers in Physics, vol. 2, Article 5, 15 pages (2014).

K. Tatsumura, et al. "FPGA-based Simulated Bifurcation Machine," IEEE 29$^{th}$ Int'l Conf. on Field-Programmable Logic and Applications (FPL), 24 page presentation (2019).

K. Tatsumura, et al. "FPGA-Based Simulated Bifurcation Machine," IEEE 29$^{th}$ Int'l Conf. on Field-Programmable Logic and Applications (FPL), pp. 59-66 (2019).

S. Tsukamoto, et al., "An Accelerator Architecture for Combinatorial Optimization Problems," Fujitsu Sci. Tech. J., vol. 53, No. 5, pp. 8-13 (2017).

M. Yamaoka, et al., "A 20k-Spin Ising Chip to Solve Combinatorial Optimization Problems With CMOS Annealing," IEEE J. Solid-State Circuits, vol. 51, No. 1, pp. 303-309 (2016).

Hayato Goto, "A simulated branching algorithm," Collection of Operations Research Society of Japan, 2020 Spring Research Conf., pp. 298-299, 2020-10021-146, ISSN:1883-1893 (2020).

Japan Patent Office, Office Action in JP App. No. 2024-003017, 2 pages, with machine translation, 2 pages (Dec. 6, 2024).

* cited by examiner

FOR EACH ALGORITHM, LEFT SIDE IS RESULT WHEN PC CLUSTERS WITH 1 COMPUTATION NODE IS USED, RIGHT SIDE IS RESULT WHEN 1 GPU IS USED (a)
```
p=0;
a=0;
for(ncycle=1;ncycle<=Nstep;ncycle++) {
    p+=dp;
    a+=da;
    for(i=1;i<=N;i++){
        Δyi=JS(Ji, s)                    } ~ 37
    }
    for(i=0;i<N;i++){
        TE(xi, yi, Δyi, hi, &sout, &xout, &yout);   } ~ 38
        yi=yout;
        xi=xout;
        si=sout
    }
}
```

(b)
```
JS(Ji, s){
    Δyi=0;
    for(j=1;j<=N;j++){
        Δyi += Jij * {(si==1)? cΔt:-cΔt};
    }
    return Δyi
}
```

(c)
```
TE(xin,yin, Δyin, hin, *sout, *xout, *yout){ ny1 = yin + Δyin;
    ny2 = ny0 + cΔt * a * hin;
    ny3 = ny1 + δy = ny1 + FX(xin);
    nx1 = xin + δx = xin + FY(ny3);

xout=(nx1>1.0)?1.0:(nx1<-1.0)-1.0:nx1;   //comp1&MUX1
    yout=(nx1>1.0 || nx1 <-1.0)?0.0:ny3;     //comp2&MUX2
    sout=(nx1>0)?1:0;                        //sgn, comp3&MUX3
}
```

SBM MULTI-CHIP CIRCUIT ARCHITECTURE
(Nchip=8)

```
p=0;
a=0;
for(ncycle=1;ncycle<=Nstep;ncycle++) {
    p+=dp;
    a+=da;

for(k=1;k<Nchip;k++){
        send_write(ch1TX, SbufL);
        send_write(ch2TX, SbufR);       }~44
        receive(ch1RX, SbufL);
        receive(ch2RX, SbufR);
    }
    for(i=1;i<=N/Nchip;i++){
        Δyi=JS(Jl, s)               }~45
    }
    for(i=0;i<N/Nchip;i++){
        TE(xi, yi, Δyi, hi, &sout, &xout, &yout);
        yi=yout;                                    }~46
        xi=xout;
        si=sout
    }
}
```

AN EXAMPLE OF ALGORITHM FOR CASES WHEN COMPUTATIONAL PROCESSES ARE DISTRIBUTED ACROSS A PLURALITY OF ELECTRONIC CIRCUITS

FIG. 34

TIMING CHART PRESENTING A CASE WHEN AN ARCHITECTURE USING A PLURALITY OF ELECTRONIC CIRCUITS IS USED (M=8)

INFORMATION PROCESSING DEVICE, NON-TRANSITORY STORAGE MEDIUM, INFORMATION PROCESSING METHOD AND ELECTRONIC CIRCUIT

CROSS REFERENCE TO RELATED APPLICATIONS

This application is continuation application of International Application No. JP2020/006841, filed on Feb. 20, 2020, which claims priority to Japanese Patent Application No. 2019-164742, filed on Sep. 10, 2019, the entire contents of which are incorporated herein by reference.

FIELD

Embodiments described herein relate generally to an information processing device, a non-transitory storage medium, an information processing method and an electronic circuit.

BACKGROUND

In combinatorial optimization problems, the most preferable combination for the desired purpose is selected from a plurality of combinations. Mathematically, combinatorial optimization problems can be attributed to problems for maximizing or minimizing objective functions, which are functions with a plurality of discrete variables. Combinatorial optimization problems are common in various fields including finance, logistics, transport, design, manufacture, and life science. However, due to the so-called "combinatorial explosion", the number or combinations increases in exponential orders of the problem size. Therefore, the optimal solution cannot be always calculated. Furthermore, in many cases, calculation of approximate solutions close to the optimal solution is difficult.

Technology which enables the calculation of solutions for combinatorial optimization problems within practical periods is needed to solve problems in various fields and accelerate innovation of the society, science, and technology.

BRIEF DESCRIPTION OF DRAWINGS

FIG. 27 is a diagram presenting an example of an algorithm implemented to an electronic circuit;

FIG. 34 is a diagram presenting a second example of methods for calculating a product between a matrix and a vector;

DETAILED DESCRIPTION

Figure 1:
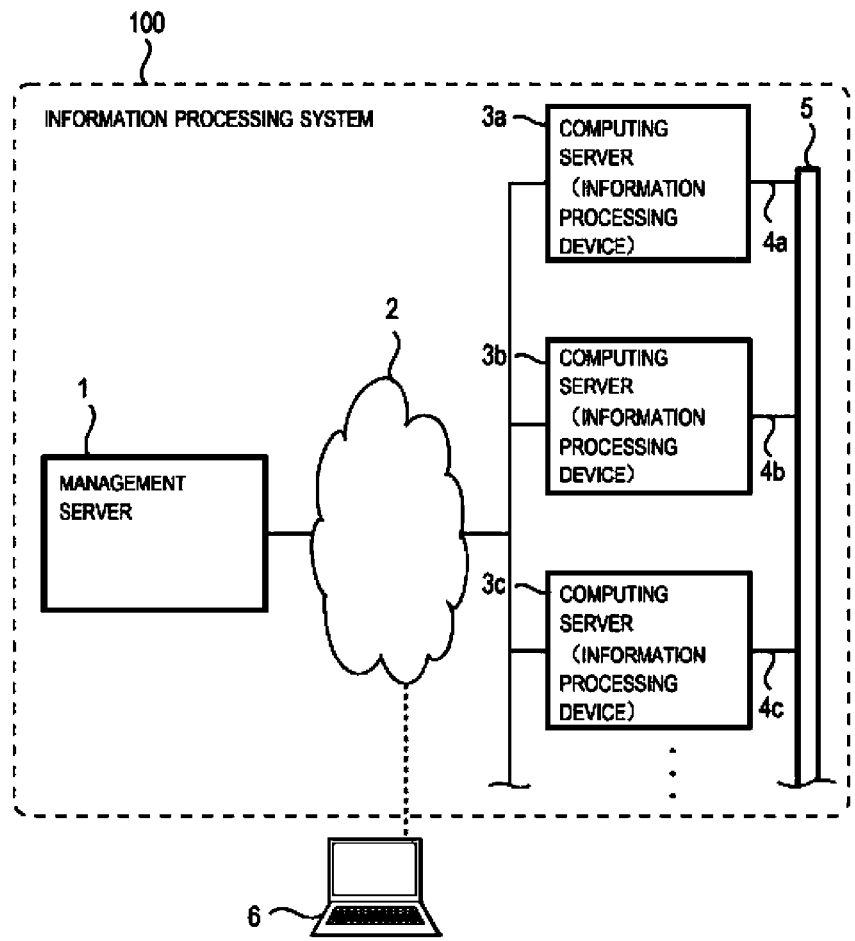
FIG. 1 is a diagram presenting a configuration example of an information processing system.

According to one embodiment, an information processing device includes a first processing circuit and a second processing circuit. The first processing circuit is configured to update a third vector based on basic equations. Each of the basic equations is a partial derivative of an objective function with respect to either of the variables in the objective function. The second processing circuit is configured to update the element of the first vector and update the element of the second vector. The element of the first vector smaller than a first value is set to the first value. The element of the first vector greater than a second value is set to the second value.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

Hereinafter, embodiments of the present invention will be described with reference to the drawings.

FIG. 1 is a diagram presenting a configuration example of an information processing system 100. The information processing system 100 in FIG. 1 includes a management server 1, a network 2, computing servers (information processing devices) 3a to 3c, cables 4a to 4c and a switch 5. Also, FIG. 1 includes an client device 6 which can communicate with the information processing system 100. Data communication between the management server 1, the computing servers 3a to 3c and the client device 6 is enabled by the network 2. For example, the network 2 is the internet including a plurality of computer networks which are connected together. The communication medium used in the network 2 can be wired, wireless or a combination of these. Examples of communication protocols used in the network 2 include TCP/IP. However, any type of communication protocol can be used.

Also, the computing servers 3a to 3c are each connected to the switch 5 via cables 4a to 4c. The cables 4a to 4c and the switch 5 provide the interconnection between computing servers. Computing servers 3a to 3c can communicate data via this interconnection. For example, switch 5 is an InfiniBand switch. For example, the cables 4a to 4c are InfiniBand cables. However, wired LAN switches and cables can be used instead of InfiniBand switches and cables. The communication standards and communication protocols used in the cables 4a to 4c and the switch 5 are not limited. Examples of the client device 6 include laptop computers, desktop computers, smartphones, tablets, and on-vehicle devices.

Parallel processing and/or distributed processing can be used for solving combinatorial optimization problems. Therefore, some steps of the calculation processes can be assigned to different computing servers 3a to 3c or processors in the computing servers 3a to 3c. Also, the computing servers 3a to 3c and/or processors in the computing servers 3a to 3c can execute similar processes for different variables in parallel.

For example, the management server 1 converts the combinatorial optimization problem entered by the user to a format which can be processed by each of the computing servers. The management server 1 also controls the computing servers. Then, the management server 1 collects the calculated results from each of the computing servers, and converts the aggregated calculated results to the solution of the combinatorial optimization problem. Thereby, the users can get the solutions for their combinatorial optimization problems. Solutions of the combinatorial optimization problem include optimal solutions and approximate solutions which are sufficiently close to the optimal solutions. The diversion allowed between the approximate solution and the optimal solution depends on the applications.

In FIG. 1, three computing servers are illustrated. However, the number of computing servers in the information processing system is not limited. Also, the number of computing servers used for solving the combinatorial optimization problem is not limited. For example, only one computing server can be included in the information processing system. Also, only a single computing server out of the plurality of computing servers in the information processing system can be used for solving the combinatorial optimization problem. Furthermore, the information processing system can include more than hundreds of computing servers. The computing servers could be servers installed in datacenters or desktop computers installed in the office. Also, the computing servers could be different types of computers installed in various locations. The type of information processing device used as the computing server is not limited. For example, the computing server can be a general purpose computer, a specialized electronic circuit or a combination of these.

Figure 2:
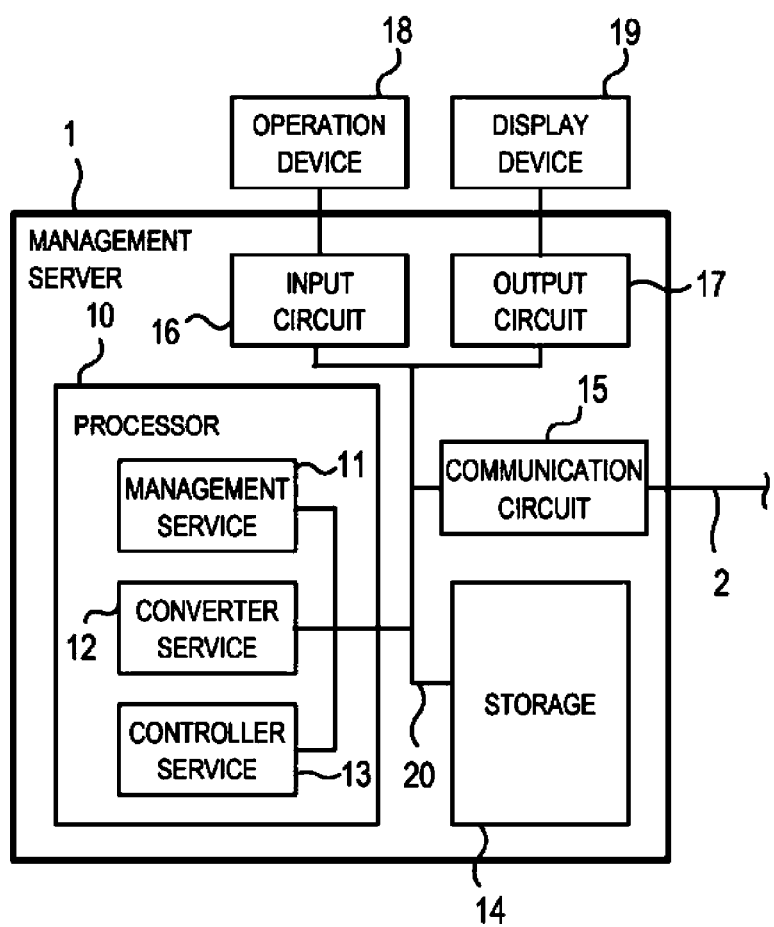
FIG. 2 is a block diagram presenting a configuration example of a management server.

FIG. 2 is a block diagram presenting a configuration example of the management server 1. For example, the management server 1 in FIG. 2 is a computer including a central processing unit (CPU) and a memory. The management server 1 includes a processor 10, a storage 14, a communication circuit 15, an input circuit 16 and an output circuit 17. The processor 10, the storage 14, the communication circuit 15, the input circuit 16 and the output circuit 17 are connected to each other via a bus 20. The processor 10 includes a management service 11, a converter service 12 and a controller service 13, as internal components.

The processor 10 is an electronic circuit which executes arithmetic calculations and controls the management server 1. For example, CPUs, microprocessors, ASICs, FPGAs, PLDs or a combination of these can be used as the processor 10. The management service 11 provides an interface for the user to execute various operations of the management server 1 via the client device 6. Examples of interfaces provided by the management service 11 include API, CLI or web pages. For example, the user can enter information related to the combinatorial optimization problem, view the solution of the combinatorial optimization problem or download the solution of the combinatorial optimization problem via the management service 11. The converter service 12 converts the combinatorial optimization problem to formats which can be processed by each computing server. The controller service 13 transmits control signals to each computing server. After the controller service 13 collects the calculated results from each of the computing servers, the converter service 12 aggregates the plurality of calculated results, thereby converting the results to the solution of the combinatorial optimization problem.

The storage 14 stores various data including programs in the management server 1, data required for execution of programs and data generated by the programs. Here, the program includes both the OS (operating system) and the applications. The storage 14 can be volatile memory, non-volatile memory or a combination of these. Examples of volatile memory include DRAM and SRAM. Examples of non-volatile memory include NAND flash memory, NOR flash memory, resistive random access memory and magne-toresistive random access memory. Also, hard disk drives, optical disks, magnetic tapes, or external storage devices can be used as the storage 14.

The communication circuit 15 communicates data with each of the devices connected to the network 2. For example, the communication circuit 15 is a NIC (Network Interface Card) which establishes connections to wired LANs. However, the communication circuit 15 can be other types of communication circuits such as circuits for wireless LANs. The input circuit 16 enables input of data to the management server 1. For example, the input circuit 16 can have external ports such as USB or PCI-Express. In the example of FIG. 2, an operation device 18 is connected to the input circuit 16. The operation device 18 is a device which can be used for entering information to the management server 1. For example, the operation device 18 is a keyboard, a mouse, a touch panel, or a sound recognition device. However, other devices can be used as the operation device 18. The output circuit 17 enables output of data from the management server 1. The output circuit 17 can have external ports such as HDMI or DisplayPort. In the example of FIG. 2, a display device 19 is connected to the output circuit 17. Examples of the display device 19 include LCD (liquid crystal displays), OLED (organic electroluminescence displays) and projectors. However, any other device can be used as the display device 19.

The administrator of the management server 1 can perform various maintenance tasks by using the operation device 18 and the display device 19. The operation device 18 and the display device 19 can be embedded to the management server 1. However, the operation device 18 and the display device 19 does not necessarily have to be connected to the management server 1. For example, the administrator can execute maintenance tasks of the management server 1 by using client devices which are accessible to the network 2.

Figure 3:
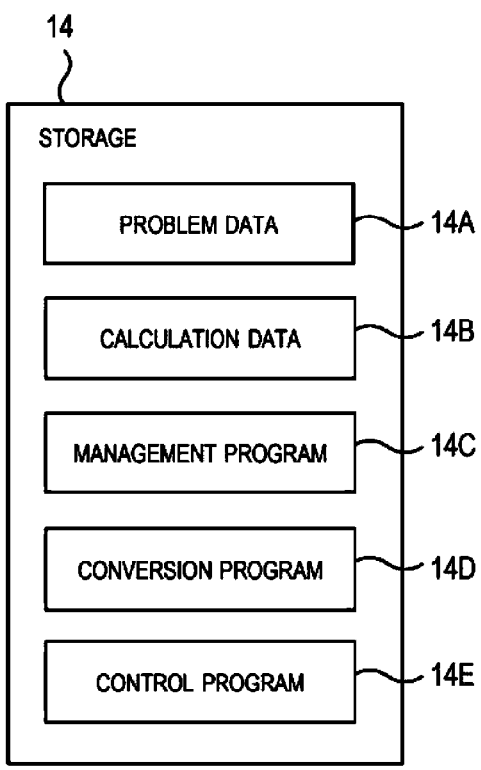
FIG. 3 is a diagram presenting examples of data saved in a storage of the management server.

FIG. 3 is a diagram presenting examples of data saved in the storage 14 of the management server 1. In the storage 14 of FIG. 3, problem data 14A, calculation data 14B, a management program 14C, a conversion program 14D and a control program 14E are stored. For example, the problem data 14A includes data of the combinatorial optimization problem. For example, the calculation data 14B includes calculated results collected from each computing server. For example, the management program 14C is a program which provides the features of the aforementioned management service 11. For example, the conversion program 14D is a program which provides the features of the aforementioned converter service 12. For example, the control program 14E is a program which provides the features of the aforementioned controller service 13.

Figure 4:
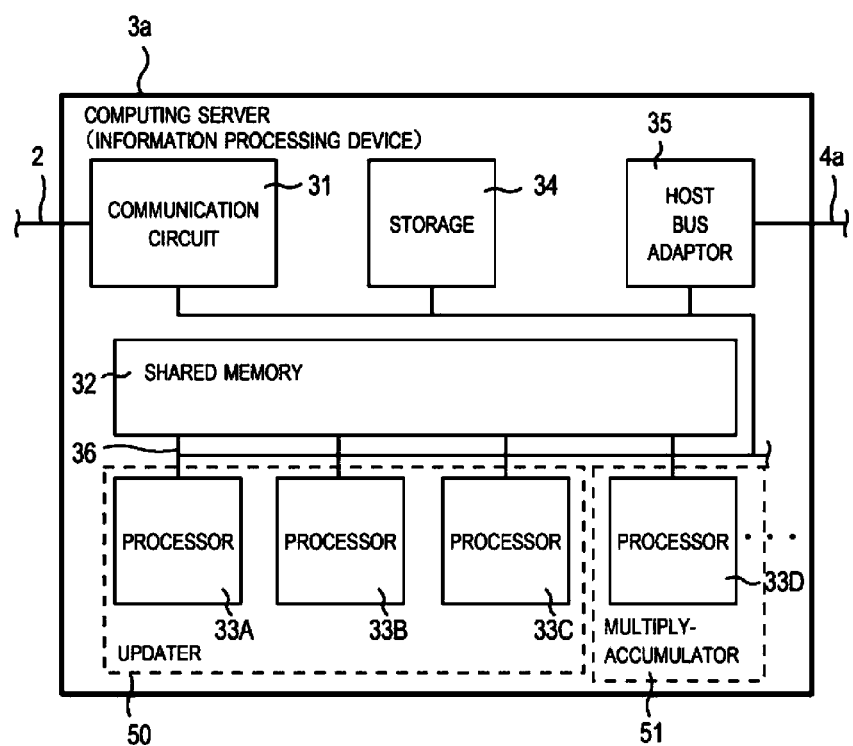
FIG. 4 is a block diagram presenting a configuration example of a computing server.

FIG. 4 is a block diagram presenting a configuration example of a computing server. FIG. 4 presents the configuration of the computing server 3a as an example. The configurations of other computing servers can be similar to the computing server 3a or different from the computing server 3a. For example, the computing server 3a is an information processing device which calculates the first vector, the second vector and the third vector independently or cooperatively with other computing servers. Also, the computing server 3a can calculate the fourth vector, which can be obtained by converting each element of the first vector with signum functions. For example, the values of each element in the third vector can be calculated by using equations derived from the energy equation of the Ising Model. For example, each of the elements in the third vector can be calculated based on basic equations. Each of the basic equations is the partial derivative of the energy equation of the Ising Model with respect to either of the variables.

The elements of the first vector are variables $x_i$ (i=1, 2, ..., N). The elements of the second vector are variables $y_i$ (i=1, 2, ..., N). The elements of the third vector are variables $z_i$ (i=1, 2, ..., N). The fourth vector can be obtained by converting each of the elements in the first vector using a first function. The first function is a function which takes either a first value or a second value which is greater than the first value. The aforementioned signum function is an example of the first function. Details of the variables $x_i$, $y_i$ and $z_i$ are discussed later.

For example, the computing server 3a includes a communication circuit 31, a shared memory 32, processors 33A to 33D, a storage 34 and a host bus adaptor 35. The communication circuit 31, the shared memory 32, the processors 33A to 33D, the storage 34 and the host bus adaptor 35 are connected to each other via a bus 36.

The communication circuit 31 communicates data with each of the devices connected to the network 2. For example, the communication circuit 31 is a NIC (Network Interfae card) used for establishing connections wired LAN. However, the communication circuit 31 can be other types of communication circuits such as circuits for wireless LANs. The shared memory 32 is memory which is accessible from the processors 33A to 33D. Examples of the shared memory 32 include volatile memory such as DRAM and SRAM. However, other types of memories such as non-volatile memory can be used as the shared memory 32. The processors 33A to 33D can share data with each other via the shared memory 32. Not all the memory in the computing server 3a has to be configured as shared memory. For example, some of the memory in the computing server 3a can be configured as local memory which is accessible from either of the processors.

The processors 33A to 33D are electronic circuits which execute calculation processes. For example, the processor can be a CPU (Central Processing Unit), a GPU (Graphics Processing Unit), a FPGA (Feld-Programmable Gate Array), an ASIC (Application Specific Integrated Circuit) or a combination of these. Also, the processor can be a CPU core or a CPU thread. If the processor is a CPU, the number of sockets in the computing server 3a is not limited. Also, the processor can be connected to other components of the computing server 3a via buses such as PCI express.

In the example of FIG. 4, the computer server has four processors. However, each of the computing servers can have a different number of processors. For example, depending on the computing server, different numbers and/or different types of processors can be implemented.

The multiply-accumulator 51 is configured to update each of the elements in the third vector based on basic equations. Here, each of the basic equations is the partial derivative of the objective function with respect to either of the variables. The object function can be derived based on formulations of the combinatorial optimization problems. Here, the variables of the basic equations are elements of the first vector or elements of the fourth vector. The fourth vector can be calculated by converting each of the elements in the first vector using a first function which takes either a first value or a second value which is greater than the first value. The multiply-accumulator 51 can be implemented by using a processing circuit (first processing circuit).

For example, the updater 50 is configured to: (1) update an element of the first vector by adding a corresponding element of a second vector or the weighted value of the second vector to the element of the first vector; (2) set an element of the first vector with a value smaller than a first value to the first value; (3) set an element of the first vector with a value greater than a second value to the second value; and (4) update an element of the second vector by adding (i) a weighted product between a first coefficient which increases or decreases monotonically based on number of updates and a corresponding element of the first vector and (ii) a weighted value of a corresponding element of the third vector.

For example, the energy equation of the Ising Model can be used as the objective function. Here, an Ising Model including many-body interaction can be used. Also, −1 can be used as the first value. +1 can be used as the second value. However, other values can be used as the first value and/or the second value. The updater 50 can also be implemented by using a processing circuit (second processing circuit).

In the example of FIG. 4, the processors 33A to 33C correspond to the updater 50 and the processor 33D corresponds to the multiply-accumulator 51. However, the correspondence between the updater/multiply-accumulator and the processors presented in FIG. 4 is only an example. Therefore, the correspondence between the updater/multiply-accumulator and the processors can be different. Also, the number of processors assigned to the updater 50 and the multiply-accumulator 51 is not limited. As mentioned below, the same processor can play the roles of the updater 50 and the multiply-accumulator 51. If different types of processors (for example, CPUs, GPUs, and FPGAs) are implemented in the computing server, different types of processors can be assigned to the updater 50 and the multiply-accumulator 51.

The storage 34 provides storage space for saving various data including programs in the computing server 3a, data required for execution of programs and data generated by the programs. Here, the program includes both the OS (operating system) and the applications. The storage 34 can be volatile memory, non-volatile memory or a combination of these. Examples of volatile memory include DRAM and SRAM. Examples of non-volatile memory include NAND flash memory, NOR flash memory, resistive random access memory and magnetoresistive random access memory. Also, hard disk drives, optical disks, magnetic tapes, or external storage devices can be used as the storage 34.

The host bus adaptor 35 enables communication of data between the computing servers. The host bus adaptor 35 is connected to the switch 5 via the cable 4a. For example, the host bus adaptor 35 is an HCA (Host Channel Adaptor). By forming a high-speed interconnection with the host bus adaptor 35, the cable 4a and the switch 5, the speed of parallel calculation processes can be accelerated.

Figure 5:
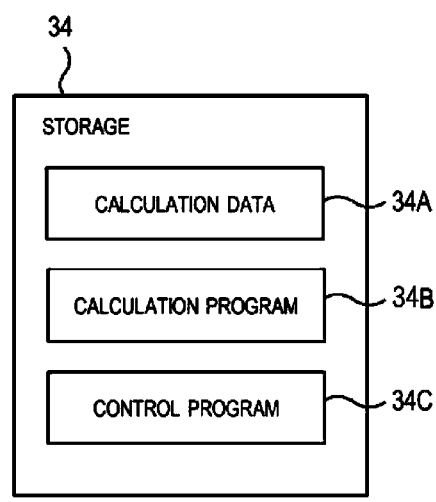
FIG. 5 is a diagram presenting examples of data saved in a storage of the computing server.

FIG. 5 is a diagram presenting examples of data saved in the storage of the computing server. In the storage 34 of FIG. 5, calculation data 34A, a calculation program 34B and a control program 34C are stored. The calculation data 34A can include data during calculation or calculated results. At least part of the calculation data 34A can be stored in different storage hierarchies including the shared memory 32, the processor cache and registers in the processor. The calculation program 34B is a program which executes calculation processes based on specific algorithms on each processor and saves data in the shared memory 32 and the storage 34. The control program 34C controls the computing server 3a based on instructions transmitted from the controller service 13 of the management server 1 and transmits the calculation result of the computing server 3a to the management server 1.

Next, technologies related to calculations of combinatorial optimization problems are explained. An example of the information processing device used for solving the combinatorial optimization problem is an Ising Machine. An Ising Machine is an information processing device which calculates the ground state energy of the Ising Model. Traditionally, Ising Models have been used for models of ferromagnetic substances and phase transition phenomena. Now, the Ising Model is frequently used as a model for solving combinatorial optimization problems. The following equation (1) describes the energy of the Ising Model.

$$E_{Ising} = \sum_{i=1}^{N} h_i s_i + \frac{1}{2}\sum_{i=1}^{N}\sum_{j=1}^{N} J_{i,j} s_i s_j \tag{1}$$

Here, s and sj are spins. Spins are binary variables which take either +1 or −1 as the value. N is the number of spins. Also, $h_i$ corresponds to local magnetic fields interacting with each spin. J is a matrix including coupling coeffcients between spins. The matrix J is a real symmetric matrix with the diagonal elements set to 0. Thus, $J_{ij}$ in the equation above indicates the element of matrix J located in row i, column j.

The Ising Model in equation (1) is a quadratic polynomial having spins as the variables. However, the extended Ising Models (Ising Models including many-body interaction) including third degree terms or terms of higher degrees can be used. Details of Ising Models including many-body interaction are explained later.

If the Ising Model in equation (1) is used, the energy $E_{Ising}$ can be used as the objective function. For example, a solution which minimizes the energy $E_{Ising}$ can be calculated. The solution of the Ising Model can be expressed as a vector $(s_1, s_2, \ldots, s_N)$ which has spins as the elements. The optimal solution is the value of the vector $(s_1, s_2, \ldots, s_N)$ when the energy $E_{Ising}$ takes the minimum value. However, the calculated solution of the Ising Model does not necessary have to be exactly the same as the optimal solution. In the following, problems for calculating approximate solutions which can make the energy $E_{Ising}$ of the Ising Model smaller is referred to as the Ising Problem. In other words, the approximate solution is a solution which can make the value of the object function closer to the optimal value.

Since the spin $s_i$ in equation (1) is a binary variable, the equation $(1+s_i)/2$ can be used for conversion with discrete variables (bits) used in combinatorial optimization problems. Therefore, by converting combinatorial optimization problems to Ising Problems and using an Ising Machine for the calculation, solutions of the combinatorial optimization problems can be calculated. Problems for calculating solutions which can minimize the quadratic object functions with discrete variables (bits) taking either 0 or 1 as the values are called QUBO (Quadratic Unconstrained Binary Optimization) problems. The Ising Problem described in equation (1) is equivalent to the QUBO problem.

For example, Quantum Annealers, Coherent Ising Machines, Quantum Bifuration Machines have been proposed as hardware implementations of the Ising Machine. Quantum Annealers enable quantum annealing by using superconducting circuits. Coherent Ising Machines use oscillation phenomena in networks formed with optical parametric oscillators. Quantum Bifuration Machines use quantum mechanical bifurcation phenomena in networks formed by parametric oscillators with Kerr effect. These hardware implementations have the possibility of reducing calculation time drastically. However, scaling out and maintaining stable operations are difficult in these implementations.

Solutions of the Ising Problems can be calculated by using digital computers. Scaling out are easier in digital computers compared to hardware implementations using physical phenomena mentioned above. Also, stable operations are possible in digital computers. One example of algorithms which can be used to calculate solutions of Ising Problems in digital computers is Simulated Annealing (SA). Technologies for executing Simulated Annealing with higher speeds have been developed. However, Simulated Annealing is a sequential updating algorithm where each of the variables is updated sequentially. Thus, it is difficult to accelerate calculation processes by parallelization.

Taking the issues mentioned above into consideration, Simulated Bifurcation Algorithms which enable calculation of solutions for large-scale combinatorial optimization problems within shorter periods have been proposed. In the following, information processing devices and electronic circuits which solve combinatorial optimization problems by using the Simulated Bifurcation Algorithm are described.

First, an overview of the Simulated Bifurcation Algorithm is explained. In the Simulated Bifurcation Algorithm, the simultaneous ordinary differential equation of (2) below is solved numerically for the two variables $x_i$ and $y_i$ (i=1, 2, ..., N). Each of the N variables, $x_i$ correspond to the spins $s_i$ of the Ising Model. Each of the N variables, $y_i$ corresponds to the momentum. The variables $x_i$ and $y_i$ can be continuous variables.

$$\frac{dx_i}{dt} = \frac{\partial H}{\partial y_i} = Dy_i \quad (2)$$

$$\frac{dy_i}{dt} = -\frac{\partial H}{\partial x_i} = \{-D + p(t) - Kx_i^2\}x_i + f_i$$

Here, H is the Hamiltonian described in the equation (3) below. The coefficient D corresponds to the detuning. The coefficient p(t) corresponds to the pumping amplitude. The value of the coefficient p(t) increases according to the number of updates during the calculation of the Simulated Bifurcation Algorithm. The initial value of the coefficient p(t) can be set to 0. The coefficient p(t) is an example of the first coefficient. The coefficient K corresponds to the positive Kerr coefficient. The term $f_i$ corresponds to the external force according to the equation (4) below. The $z_i$ in equation (4) is equal to the partial derivative of the terms in equation (3) except for c.

$$H = \sum_{i=1}^{N}\left[\frac{D}{2}(x_i^2 + y_i^2) - \frac{p(t)}{2}x_i^2 + \frac{K}{4}x_i^4 + c\left(h x_i \alpha(t) + \frac{1}{2}\sum_{j=1}^{N} J_{i,j} x_i x_j\right)\right] \quad (3)$$

$$f_i = -c z_i \quad (4)$$

$$z_i = h_i \alpha(t) + \sum_{j=1}^{N} J_{i,j} x_j$$

Here, constant coefficients can be used for the coefficient c. Then, the value of the coefficient c needs to be determined before the calculation using the Simulated Bifurcation Algorithm is executed. For example, for the sake of calculation accuracy, the coefficient c can be set to a value close to the inverse number of the maximum eigenvalue of the $J^{(2)}$ matrix. For example, the value $c=0.5D(N/2n)^{(1/2)}$ can be used. Here, n is the number of edges in the graph representing the combinatorial optimization problem. Also, a(t) is a coefficient which increases along with the first coefficient p(t). For example, $(p(t))^{(1/2)}$ can be used as a(t).

By using the Simulated Bifurcation Algorithm, combinatorial optimization problems with objective functions having terms of third order or higher can be solved. Problems for finding combinations of variables which minimizes objective functions having terms of the third order or higher are referred to as the HOBO (Higher Order Binary Optimization) problems. If HOBO problems are handled, the following equation (5) can be used as the energy equation in the Ising Models extended to higher orders.

$$E_{HOBO} = \sum_{i=1}^{N} J_i^{(1)} s_i + \frac{1}{2}\sum_{i=1}^{N}\sum_{j=1}^{N} J_{i,j}^{(2)} s_i s_j + \frac{1}{3!}\sum_{i=1}^{N}\sum_{j=1}^{N}\sum_{k=1}^{N} J_{i,j,k}^{(3)} s_i s_j s_k + \ldots \quad (5)$$

Here, $J^{(n)}$ is a n-rank tensor which is a generalized form including both the local magnetic field $h_i$ and the coupling coefficient matrix J. For example, the tensor $J^{(1)}$ corresponds to the vector of the local magnetic field $h_i$ (referred to as the sixth vector). For the n-rank tensors $J^{(n)}$ with same index values, the values of the elements are 0. The equation (5) includes first-order terms, second-order terms, and third-order terms. Terms of higher orders can be defined in a similar fashion as the terms in equation (5). Equation (5) corresponds to the energy of the Ising Model including many-body interactions.

Both QUBO and HOBO are examples of PUBO (Polynomial Unconstrained Binary Optimization). Thus, combinatorial optimization problems categorized as PUBO with objective functions having terms of second order are QUBO problems. Also, combinatorial optimization problems categorized as PUBO with objective functions having terms of third order or higher are HUBO problems.

If HOBO problems are solved by using the Simulated Bifurcation Algorithm, the Hamiltonian H in the aforementioned equation (3) can be replaced with equations (6) below, and the external force $f_i$ in the aforementioned equations (4) can be replaced with equations (7) below.

$$H = \sum_{i=1}^{N} \left[ \frac{D}{2}(x_i^2 + y_i^2) - \frac{p(t)}{2}x_i^2 + \frac{K}{4}x_i^4 + c \left( J_i^{(1)} x_i a(t) + \frac{1}{2}\sum_{j=1}^{N} J_{i,j}^{(2)} x_i x_j + \frac{1}{3!}\sum_{j=1}^{N}\sum_{k=1}^{N} J_{i,j,k}^{(3)} x_i x_j x_k + \ldots \right) \right] \quad (6)$$

$$H_{Ising} = \sum_{i=1}^{N} \left[ J_i^{(1)} x_i \alpha(t) + \frac{1}{2}\sum_{j=1}^{N} J_{i,j}^{(2)} x_i x_j + \frac{1}{3!}\sum_{j=1}^{N}\sum_{k=1}^{N} J_{i,j,k}^{(3)} x_i x_j x_k + \ldots \right]$$

$$f_i = -cz_i \quad (7)$$

$$z_i = \frac{\partial H_{Ising}}{\partial x_i} = J_i^{(1)} \alpha(t) + \sum_{j=1}^{N} J_{i,j}^{(2)} x_j + \sum_{j=1}^{N}\sum_{k=1}^{N} J_{i,j,k}^{(3)} x_j x_k + \ldots$$

For example, each of the elements in the third vector can be calculated by using the second equation $z_i$ in (7). The second equation $z_i$ in (7) is equal to the partial derivative of the second equation in (6) with respect to either of the variables. Also, the second equation $z_i$ in (7) has elements of the first vector as variables.

Thus, the Hamiltonian can include many-body interaction terms (terms of tensors with rank-3 or higher). Also, Hamiltonians without many-body interaction terms (terms of tensors with rank-3 or higher) can be used. The second equation a in (7) is an example of a basic equation which is derived from the term corresponding to the energy of the Ising Model, within the Hamiltonian. Thus, the first value can be −1 and the second value can be 1. Also, the objective function can include a term corresponding to the energy equation of the Ising Model. In this case, the objective function can include a many-body interaction term.

In the Simulated Bifurcation Algorithm, the value of the spin $s_i$ can be determined based on the sign of the variable $x_i$ after the value of the first coefficient p(t) is increased from an initial value (for example, 0) to a predetermined value. In signum functions, $s(x_i)=1$ holds for $x_i>0$ and $s(x_i)=-1$ holds for $x_i<0$. Thus, if the first coefficient p(t) increases to a certain value, the variable $x_i$ can be converted by using signum functions to calculate the values of the spins $s_i$. For example, a function which is defined as $sgn(x_i)=x_i/|x_i|$, when $x_i$ is not equal to 0, and $sgn(x_i)=1$ or −1 when $x_i$ is equal to 0 can be used.

Thus, the updater 50 can be configured to: convert an element of the first vector with a value smaller than a third value which is between the first value and the second value to the first value; and convert an element of the first vector with a value greater than the third value to the second value, to calculate solutions of combinatorial optimization problems. For example, the updater 50 can be configured to: convert an element of the first vector which is a positive value to +1; and convert an element of the first vector which is a negative value to −1, to calculate solutions of combinatorial optimization problems. The timing when the updater 50 calculates the solution of the combinatorial optimization problem (for example, the spin $s_i$ of the Ising Model) is not limited. Also, the updater 50 can be configured to calculate the solution of the combinatorial optimization problem when the value of the first coefficient p exceeds a threshold. If the Ising Model is solved, the solution of the combinatorial optimization problem corresponds to the spins s of the Ising Model.

For example, if the Symplectic Euler Method is used, differential equations defined according to equations (2), (3) and (4), or equations (2), (5) and (7) can be solved. As indicated in the following equation (8), differential equations could be rewritten to discrete difference equations.

$$x_i(t + \Delta t) = x_i(t) + Dy_i(t)\Delta t \quad (8)$$

$$y_i(t + \Delta t) =$$
$$y_i(t) + [\{-D + p(t + \Delta t) - Kx_i^2(t + \Delta t)\}x_i(t + \Delta t) + f_i(t + \Delta t)]\Delta t$$

$$f_i(t + \Delta t) = -cz_i(t + \Delta t)$$

$$z_i(t + \Delta t) = J_i^{(1)}\alpha(t + \Delta t) +$$
$$\sum_{j=1}^{N} J_{i,j}^{(2)} x_j(t + \Delta t) + \sum_{j=1}^{N}\sum_{k=1}^{N} J_{i,j,k}^{(3)} x_j(t + \Delta t) x_k(t + \Delta t) + \ldots$$

Here, t corresponds to the time. Also, $\Delta t$ corresponds to time steps (time increments). The non-linear term $Kx^2(t+\Delta t)$ prevents the variable $x_i$ from diverging during the calculation processes.

The computing server can update the variables $x_i$ and $y_i$ (i=1, 2, . . . , N) according to the algorithm of equation (8). Thus, the data updated by the computer server can include a first vector, a second vector and a third vector. Here, the first vector $(x_1, x_2, \ldots, x_N)$ is a vector having N variables $x_i$ (i=1, 2, . . . , N) as elements. The second vector $(y_1, y_2, \ldots, y_N)$ is a vector having N variables $y_i$ (i=1, 2, . . . , N) as elements. The third vector $(z_1, z_2, \ldots, z_N)$ is a vector having N variables $z_i$ (i=1, 2, . . . , N) as elements. The computing server can solve each of the elements $z_i$ (i=1, 2, . . . , N) of the third vector, each of the elements $x_i$ (i=1, 2, . . . , N) of the first vector and each of the elements $y_i$ (l=1, 2, . . . , N) of the second vector.

Referring to (8), only a single type of index appears in the terms except the product-sum operations of matrices or tensors. The terms having only a single type of index in (8) can be calculated in parallel, thereby reducing the total computing time.

In equations (8), the time t and the time step $\Delta t$ are used to represent the relation to the original differential equations. However, when the algorithm is implemented to software or hardware according to the Symplectic Euler Method, the use of time t and the time step $\Delta t$ as explicit parameters are not necessary. For example, if the time step $\Delta t$ is set to 1, it is possible to eliminate the time step $\Delta t$ from the implemented algorithm. If the time t is not included as an explicit parameter during the implementation of the algorithm, $x_i(t+\Delta t)$ in equations (8) could be interpreted as the value of $x_i(t)$ after update. Thus, "t" in the aforementioned equations and the following equations represent the value of variable before update and "t+$\Delta t$" represent the value of variable after update.

Next, the results when combinatorial optimization problems are solved by implementing the Simulated Bifurcation Algorithm to digital computers by using the Symplectic Euler Method are explained. In the following, the average number of cuts and the maximum number of cuts when a benchmark set G22 of the maximum cut problem (G-Set) is solved 1000 times are presented. The maximum cut problem is a problem for cutting nodes of a weighted graph into two groups, ensuring that the total value of separated edges is maximized. The maximum cut problem is a type of combinatorial optimization problem.

Figure 6:
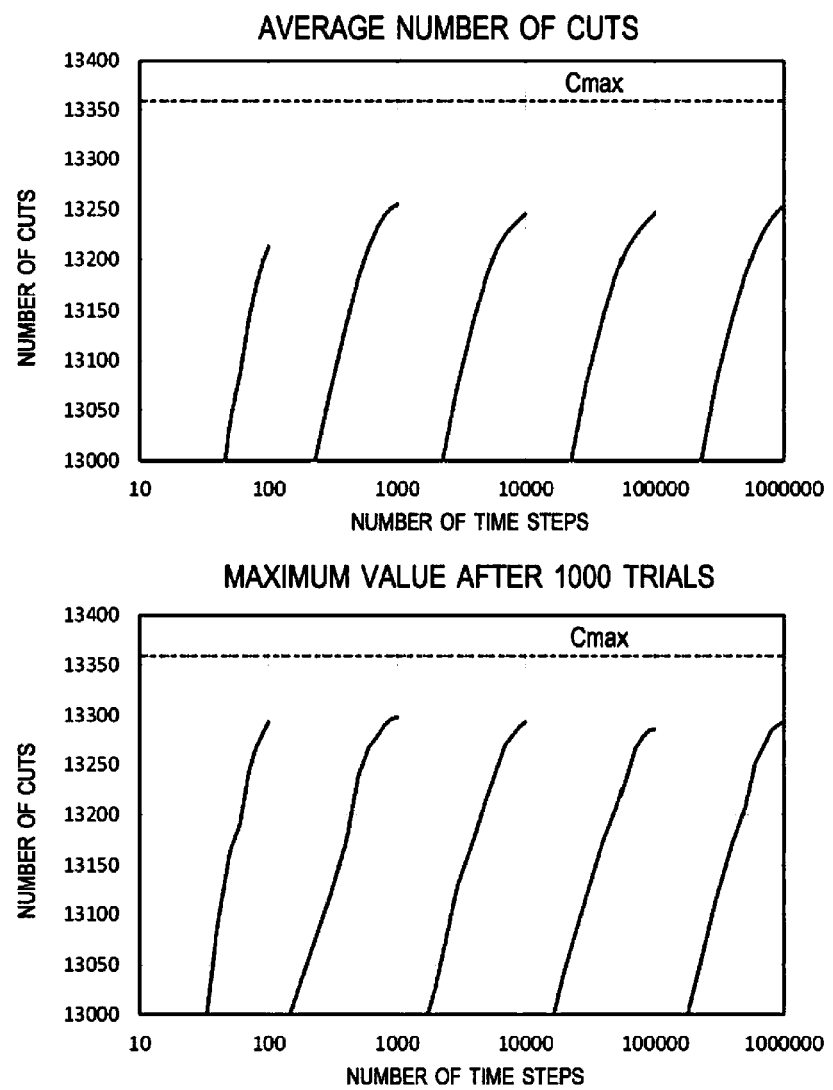
FIG. 6 is a diagram presenting first example for number of cuts when the maximum cut problem is solved multiple times.

FIG. 6 presents the result when the algorithm according to (8) above is used. Calculation is executed by setting time steps $\Delta t$ to 0.5. Also results for 100 total time steps, 1,000 total time steps, 10,000 total time steps, 100,000 total time steps and 1,000,000 total time steps are presented. D=K=1, $c=0.5D(N/2n)^{(1/2)}$ are used for the coefficients. The value 19,990 which is the number of edges for the graph used in G22 is substituted into n. The value of the coefficient p (first coefficient) is increased from 0 to 1 according to the increase of time steps. Also, the initial values of the variables $x_i$ are set to 0. Also, pseudorandom numbers in the range of [−0.1, 0.1] are used as initial values of the variables $y_i$.

The graph in the top side of FIG. 6 presents the average number of cuts. The graph in the bottom side of FIG. 6 presents the maximum number of cuts. In both of the graphs in FIG. 6, the perpendicular axis corresponds to the number of cuts and the horizontal axis corresponds to the time steps. The horizontal broken line Cmax in both of the graphs in FIG. 6 indicate the maximum number of cuts 13359 known for G22. The closer the number of cuts is to the broken line Cmax, the closer the result is to the optimal solution. Referring to FIG. 6, the result is not reaching to the maximum number of cuts even when the total time steps become greater. One possibility that solutions calculated when the algorithm according to (8) is used contains errors (differences from the optimal solution) is because continuous variables $x_i$ are used instead of binary variables to express the spins $s_i$.

Figure 7:
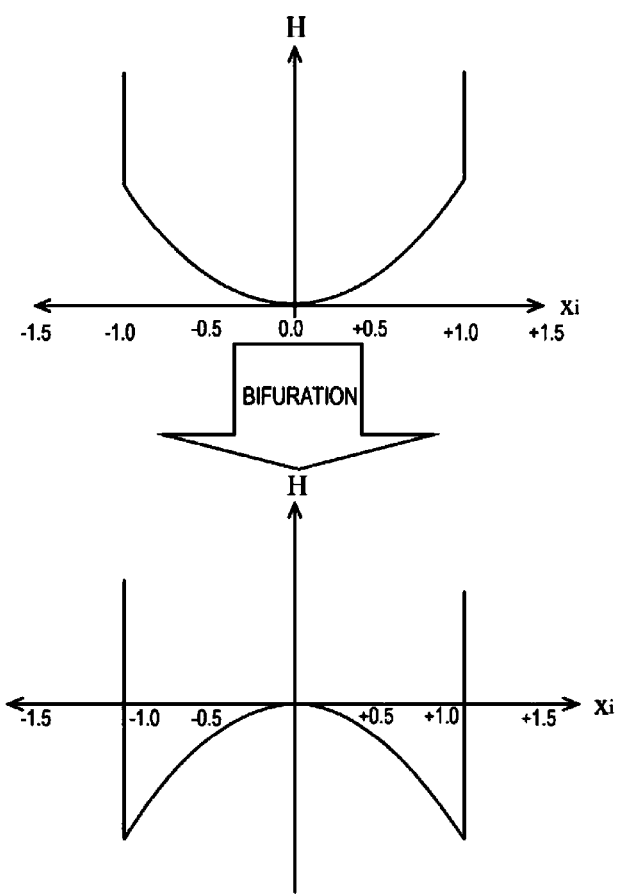
FIG. 7 is a diagram presenting an example of bifurcation in an algorithm where the absolute value of xi does not exceed 1.

Thus, the algorithm in equations (8) can be improved to reduce the errors. Specifically, if the absolute value of the variable $x_i$ exceeds 1 due to updates, the variable $x_i$ can be set to the value of sgn($x_i$). Namely, if $x_i>1$ holds after updates, the value of the variable $x_i$ can be set to 1. Also, if $x_i<-1$ holds after updates, the value of the variable $x_i$ can be set to −1. Thus, the spins s can be approximated with higher precision by using the variable $x_i$. For example, the updater 50 can be configured to: set the value of an element in the first vector with a value smaller than −1 to −1; and set the value of an element in the first vector with a value greater than +1 to +1. By including this process, the algorithm becomes equivalent to a physical model of N particles with a wall in the locations of $x_i=-1$ and $x_i=+1$ (FIG. 7).

Furthermore, if $x_i>1$ holds after updates, a coefficient r can be multiplied to the variable $y_i$ corresponding to $x_i$. For example, if the relation −1<r<=0 holds for the coefficient r, the aforementioned wall corresponds to a wall with a reflection coefficient of r. If a coefficient r equal to 0 is used, the algorithm becomes equivalent to a physical model with a wall causing completely inelastic collisions located in $x_i=-1$ and $x_i=+1$. Thus, the updater 50 can be configured to update an element of the second vector corresponding to an element of the first vector with a value smaller than the first value or an element of the first vector with a value greater than the second value to a product of the original value of the element in the second vector and a second coefficient. For example, the updater 50 can be configured to update an element of the second vector corresponding to an element of the first vector with a value smaller than −1 or an element of the first vector with a value greater than 1 to a product of the original value of the element in the second vector and a second coefficient. Here, the second coefficient corresponds to the aforementioned coefficient r.

Also, if $x_i>1$ holds after updates, the value of the variable $y_i$ corresponding to the variable $x_i$ can be set to a pseudo-random number. For example, random numbers within the range of [−0.1, 0.1] can be used. Thus, the updater 50 can be configured to set a value of the second vector corresponding to an element of the first vector with a value smaller than the first value or a value of the second vector corresponding to an element of the first vector with a value greater than the second value to a pseudorandom number.

If the update process is executed ensuring that $|x_i|<=1$ holds, the value of $x_i$ does not diverge even when the non-linear term $kx_i^2(t+\Delta t)$ is omitted. Thus, the algorithm according to (9) can be used instead of the algorithm according to (8).

$$x_i(t+\Delta t) = x_i(t) + Dy_i(t)\Delta t \quad (9)$$

$$y_i(t+\Delta t) = y_i(t) + [\{-D + p(t+\Delta t)\}x_i(t+\Delta t) + f_i(t+\Delta t)]\Delta t$$

$$f_i(t+\Delta t) = -cz_i(t+\Delta t)$$

$$z_i(t+\Delta t) = J_i^{(1)}\alpha(t+\Delta t) + \sum_{j=1}^{N} J_{i,j}^{(2)}x_j(t+\Delta t) + \sum_{j=1}^{N}\sum_{k=1}^{N} J_{i,j,k}^{(3)}x_j(t+\Delta t)x_k(t+\Delta t) + \ldots$$

Figure 8:
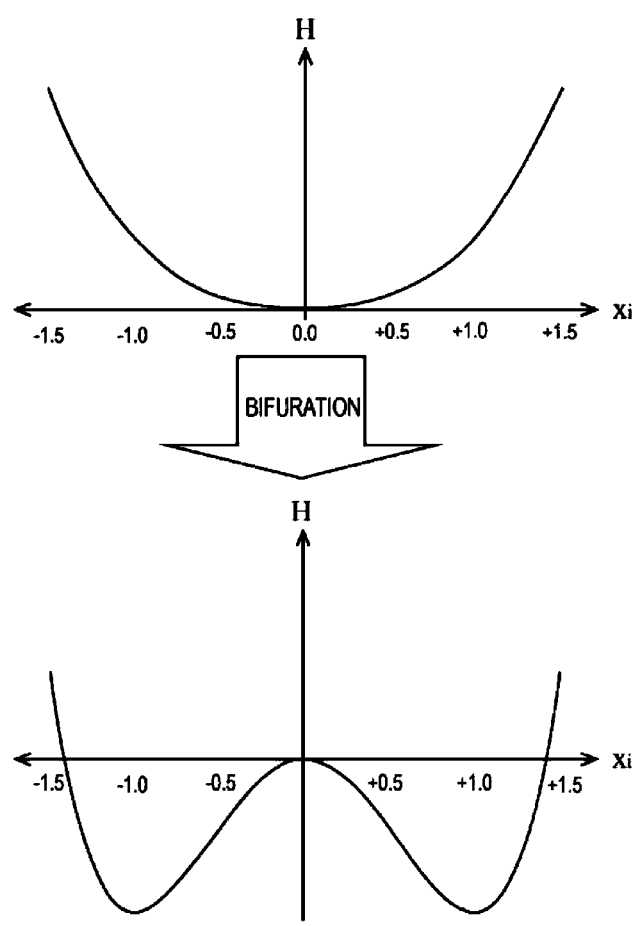
FIG. 8 is a diagram presenting an example of bifurcation in an algorithm where the absolute value of xi exceeds 1.

In the algorithm according to (9), pseudorandom numbers does not necessary have to be used. Similar to the equations of (8), the algorithm according to (9) also solves a Hamilton equation. Therefore, the variable $y_i$ corresponds to the momentum. Thus, by using the Symplectic Euler Method, solutions can be calculated stably without using small values for the time step $\Delta t$. Also, by using the algorithm according to (9), combinatorial optimization problems with objective functions of the third order or higher can be solved. In FIG. 8, a graph presenting the algorithm according to (8) as a physical model is illustrated.

Figure 9:
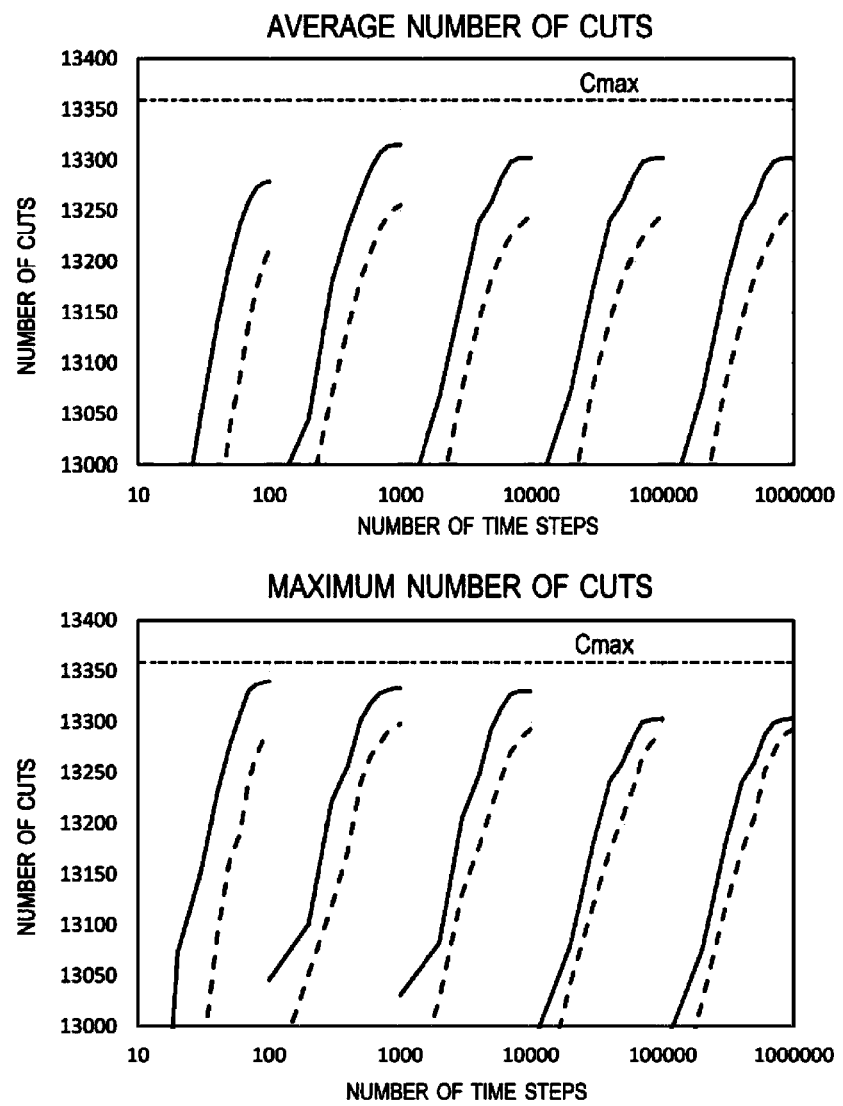
FIG. 9 is a diagram presenting second example for number of cuts when the maximum cut problem is solved multiple times.

FIG. 9 presents the result when G22 of the G-set is solved 1,000 times using the algorithm according to (9). In FIG. 9, the algorithm (9) is used. The value of the second coefficient r is set to 0 and the time step $\Delta t$ is set to 1. Other calculation conditions are similar to FIG. 6. Since the non-linear term is omitted in the algorithm according to (9), it was possible to set the time step $\Delta t$ to the double of FIG. 8.

The graph in the top side of FIG. 9 presents the average number of cuts. The graph in the bottom side of FIG. 9 presents the maximum number of cuts. The correspondence of each of the axes and the definition of the horizontal broken line Cmax is similar to FIG. 6. The data indicated in solid lines correspond to the results when the algorithm according to (9) is being used in the calculation. On the other hand, the data indicated in broken lines correspond to the results when the algorithm according to (8) is being used in the calculation. That is, the broken lines correspond to the lines in FIG. 6.

Referring to FIG. 9, both the average number of cuts and the maximum number of cuts are moving closer to the optimal solution, compared to FIG. 6. However, in the result of FIG. 9, differences still exist between the calculated values and the optimal solution. It can be inferred that the fact that continuous variables $x_i$, are used in the basic equations defining the elements of the third vector, instead of spins $s_i$ is causing errors. Especially, if high-order terms increase, the product operation between the variables $x_i$ in $z_i$ may increase errors. For example, if variables with an absolute value greater than 1 are multiplied repeatedly, the absolute value would become significantly greater than 1.

Therefore, the algorithm (9) can be improved further for reduction of errors. For example, as presented in the following equations (10), sgn($x_i$) can be substituted to $z_i$, instead of the continuous variables $x_i$. Here, sgn($x_i$) indicates the value of the continuous variable $x_i$ converted by signum functions. This value corresponds to the spin $s_i$.

$$x_i(t + \Delta t) = x_i(t) + Dy_i(t)\Delta t \quad (10)$$

$$y_i(t + \Delta t) =_i (t) + [\{-D + p(t + \Delta t)\}x_1(t + \Delta t) + f_i(t + \Delta t)]\Delta t$$

$$f_i(t + \Delta t) = -cz_i(t + \Delta t)$$

$$z_i(t + \Delta t) = J_i^{(1)}\alpha(t + \Delta t) +$$

$$\sum_{j=1}^{N} J_{i,j}^{(2)} s_j(t + \Delta t) + \sum_{j=1}^{N}\sum_{k=1}^{N} J_{i,j,k}^{(3)} s_j(t + \Delta t)s_k(t + \Delta t) + \ldots$$

In equations (10), the coefficient of the term including rank-1 tensor can be set to 1. Unlike the equations (8) and (9), the algorithm according to (10) does not solve a Hamilton equation. The equations (10) can be interpreted as a dynamical system controlled by an external field. If HOMO having high-order objective functions are handled using the algorithm according to (10), errors due to product operations could be prevented, for products of spins within $z_i$ takes either −1 or 1 as the values.

As presented in the algorithm of the aforementioned equations (10), the data calculated by the computing server can include a fourth vector ($s_1, s_2, \ldots, s_N$) having variables $s_i$ (i=1, 2, . . . , N) as elements. The fourth vector can be calculated by converting each element of the first vector by signum functions. Thus, the multiply-accumulator 51 can be configured to update the values of each of the elements in the third vector by using basic equations. Here, each of the basic equations is a partial derivative of the energy equation of the Ising Model respect to either of the variables. Here, elements of the first vector or the first vector calculated by converting elements of the first vector by signum functions can be used as variables of the basic equations for each index i.

Figure 10:
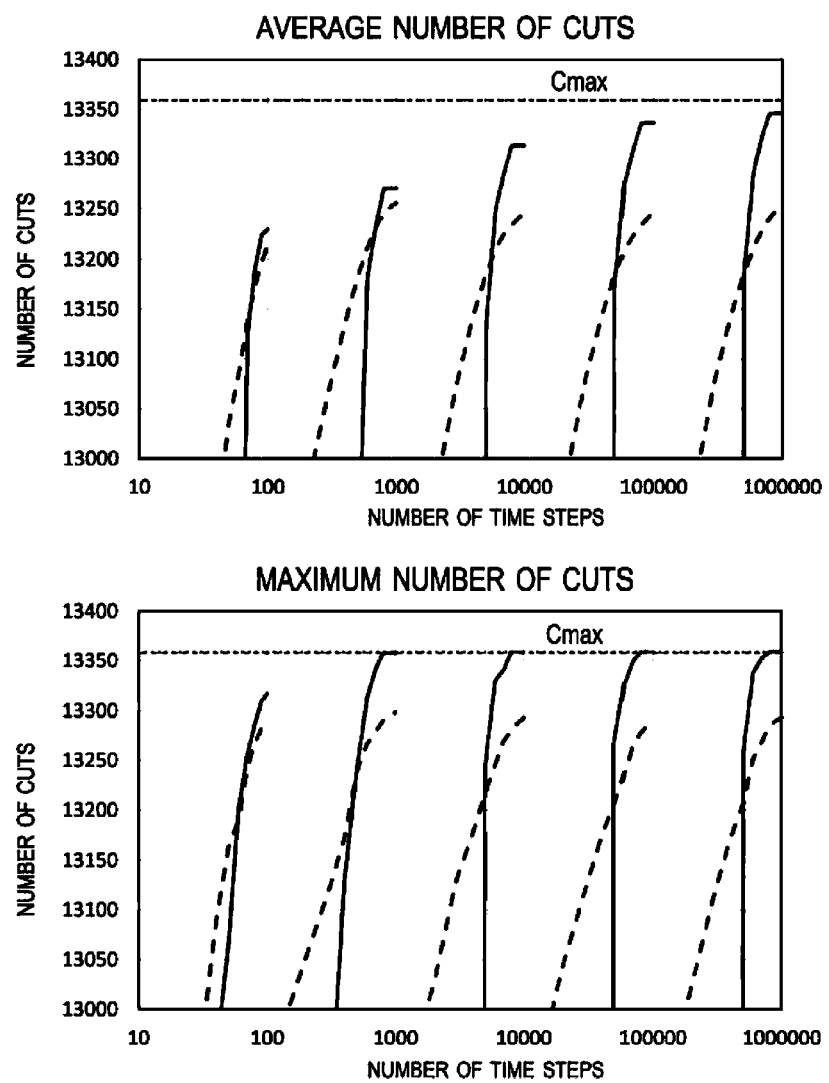
FIG. 10 is a diagram presenting third example for number of cuts when the maximum cut problem is solved multiple times.

FIG. 10 presents the result when G22 of the G-set is solved 1,000 times using the algorithm according to (10). Besides the difference in the algorithms, the calculation condition (for example, the time step $\Delta t$ and coefficients) are similar to FIG. 9. The graph in the top side of FIG. 10 presents the average number of cuts. The graph in the bottom side of FIG. 10 presents the maximum number of cuts. The correspondence of each of the axes and the definition of the horizontal broken line Cmax is similar to FIG. 6 and FIG. 9. The data indicated in solid lines correspond to the results when the algorithm according to (10) is being used in the calculation. On the other hand, the data indicated in broken lines correspond to the results when the algorithm according to (8) is being used in the calculation. That is, the broken lines correspond to the lines in FIG. 6.

Referring to FIG. 10, values closer to the optimal solution are obtained for both the average number of cuts and the maximum number of cuts, compared to the algorithm according to (8). Referring to the graph in the bottom side of FIG. 10, the maximum number of cuts 13359 can be obtained by using the algorithm according to (10).

The following equations (11) present a variation of the Simulated Bifurcation Algorithm using the Symplectic Euler Method.

$$x_i(t + \Delta t) = x_i(t) + Dy_i(t)\Delta t \quad (11)$$

$$y_i(t + \Delta t) = y_i(t) + [\{-D + p(t + \Delta t)\}x_i(t + \Delta t) + f_i(t + \Delta t)]\Delta t$$

$$f_i(t + \Delta t) = -g(t)\text{sgn}[z_i(t + \Delta t)]$$

$$z_i(t + \Delta t) = J_i^{(1)}\alpha(t + \Delta t) +$$

$$\sum_{j=1}^{N} J_{i,j}^{(2)} x_j(t + \Delta t) + \sum_{j=1}^{N}\sum_{k=1}^{N} J_{i,j,k}^{(3)} x_j(t + \Delta t)x_k(t + \Delta t) + \ldots$$

In the algorithm according to (11), the term corresponding to the external force $f_i$ is different from aforementioned examples. Here, the value z calculated by the fourth equation of (11) is converted by signum functions, thereby normalizing the value to 1. Thus, the multiply-accumulator 51 can be configured to update each of the elements in the third vector based on a value calculated by converting the value z of the basic equation by a first function. The values a for each of the basic equations can be calculated by using elements of the first vector as variables. For example, signum functions can be used as the first function. However, as mentioned later, other functions can be used as the first function.

In the equations (11), the function g(t) is used instead of the coefficient c. In general, the contribution of the elements of the third vector z to the calculation result varies, depending on problems. However, since the elements of the third vector are normalized by 1 in equation (11), there is no need to determine the value of the coefficient c for each problem. The following equation (12) can be used as the function g(t).

$$g(t)=\{D-p(t)\}\sqrt{p(t)} \quad (12)$$

The value of the function in equation (12) increases monotonically and then decreases monotonically depending on the number of updates. However, the aforementioned equation (12) is only an example. Thus, other functions having the first coefficient p(t) as the parameter can be used as the function g(t). Thus, the multiply-accumulator 51 can be configured to update each of the elements in the third vector by multiplying a second function having the first coefficient p as a parameter.

Figure 11:
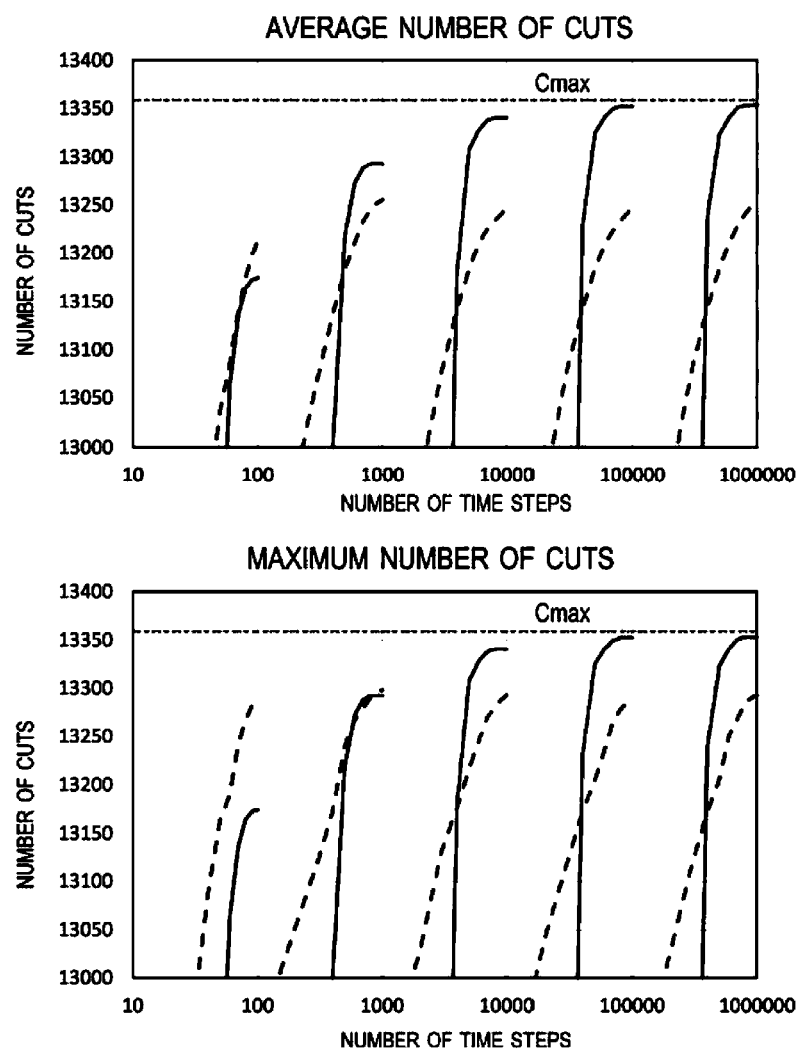
FIG. 11 is a diagram presenting fourth example for number of cuts when the maximum cut problem is solved multiple times.

FIG. 11 presents the result when G22 of the G-set is solved 1,000 times using the algorithm according to (11). Besides the difference in the algorithms, the calculation condition (for example, the time step $\Delta t$ and coefficients) are similar to FIG. 9. The graph in the top side of FIG. 11 presents the average number of cuts. The graph in the bottom side of FIG. 11 presents the maximum number of cuts. The correspondence of each of the axes and the definition of the horizontal broken line Cmax is similar to FIG. 6 and FIG. 9. The data indicated in solid lines correspond to the results when the algorithm according to (11) is being used in the calculation. On the other hand, the data indicated in broken lines correspond to the results when the algorithm according to (8) is being used in the calculation. That is, the broken lines correspond to the lines in FIG. 6.

Referring to FIG. 11, values closer to the optimal solution are obtained for both the average number of cuts and the maximum number of cuts, compared to the algorithm according to (8). Referring to the graph in the bottom side of FIG. 11, the maximum value 13358 close to the maximum number of cuts 13359 can be obtained by using the algorithm according to (11).

In the algorithms of (9) to (11), the coefficient a in the term including the rank-1 tensor in the basic equation (equation of $z_i$) can be calculated by using a constant coefficient (for example, a=1). Also, in the algorithms of (9) to (11), a coefficient which decreases or increases monotonically depending on the number of updates can be used as the coefficient a for the term including the rank-1 tensor in the basic equation (equation of zi). In this case, the term including the rank-1 tensor in the basic equation decreases or increases monotonically depending on the number of updates.

The algorithms of (9) and (10) include the coefficient c. To set the value of the coefficient c to a value close the inverse value of the maximum eigenvalue of the $J^{(2)}$ matrix, the maximum eigenvalue of the $J^{(2)}$ matrix needs to be calculated or estimated. The computation cost for the maximum eigenvalue is large. On the other hand, estimations of maximum eigenvalues have no guarantees of accuracies. Therefore, functions which take different values according to the number of updates, as presented in the aforementioned equation (12) can be used instead of the coefficient c. Also, instead of the coefficient c, an approximated value c1 calculated based on the first vector $(x_1, x_2, \ldots, x_N)$ and the third vector $(z_1, z_2, \ldots, z_N)$ can be used, as shown in the following equation (13).

$$c_1 = \frac{|x|}{|z|} = \frac{\sqrt{x_1^2 + x_2^2 + \ldots + x_N^2}}{\sqrt{z_1^2 + z_2^2 + \ldots + z_N^2}} \quad (13)$$

Referring to the equation (13), both the numerator and the denominators are norms of the vectors. As in equation (13), the square root of the square sum for each of the elements in the vector which is the L2 norm can be used as the norms of the vectors. However, norms according to other definitions such as the sum of absolute values of elements in the vector (the L1 norm) can be used instead.

Thus, the updater 50 can be configured to update an element of the second vector by: calculating a third coefficient c1 by dividing a first vector norm or a fourth vector norm with a third vector norm; adding weighted product between a first coefficient $p(t+\Delta t)$ and corresponding element of the first vector; and adding an element of the third vector weighted by the third coefficient c1.

Also, instead of the coefficient c, an approximated value c'1 defined by using inner products as shown in the following equation (14) can be used.

$$c'_1 = \frac{(x, x)}{|(x, z)|} = \frac{x_1^2 + x_2^2 + \ldots + x_N^2}{|x_1 z_1 + x_2 z_2 + \ldots + x_N z_N|} \quad (14)$$

Thus, the updater 50 can be configured to update an element of the second vector by: calculating a third coefficient c'1 which is an first inner product between first vectors divided by an absolute value of an second inner product between the first vector or the fourth vector and the third vector; adding a weighted product between a first coefficient $p(t+\Delta t)$ and corresponding element of the first vector; and adding an element of the third vector weighted by the third coefficient c'1.

The approximated values c1 and c'1 are calculated based on values of first vectors $(x_1, x_2, \ldots, x_N)$ and third vectors $(z_1, z_2, \ldots, z_N)$ at each timing. Therefore, the values c1 and c'1 are dynamically controlled coefficients, not constants like the coefficient c. It is possible to use the values of the first vector $(x_1, x_2, \ldots, x_N)$ and the third vector $(z_1, z_2, \ldots, z_N)$ calculated during the updating process of the variables. Thus, the use of the approximated values c1 or c'1 would not increase the computation cost significantly. In Ising problems without local magnetic fields, if the first vector $(x_1, x_2, \ldots, x_N)$ is the eigenvector corresponding to the maximum eigenvalue of $J^{(2)}$, the approximated values c1 and c'1 become greater than the inverse value of the maximum eigenvalue. This accelerates the convergence of the solution.

Figure 12:
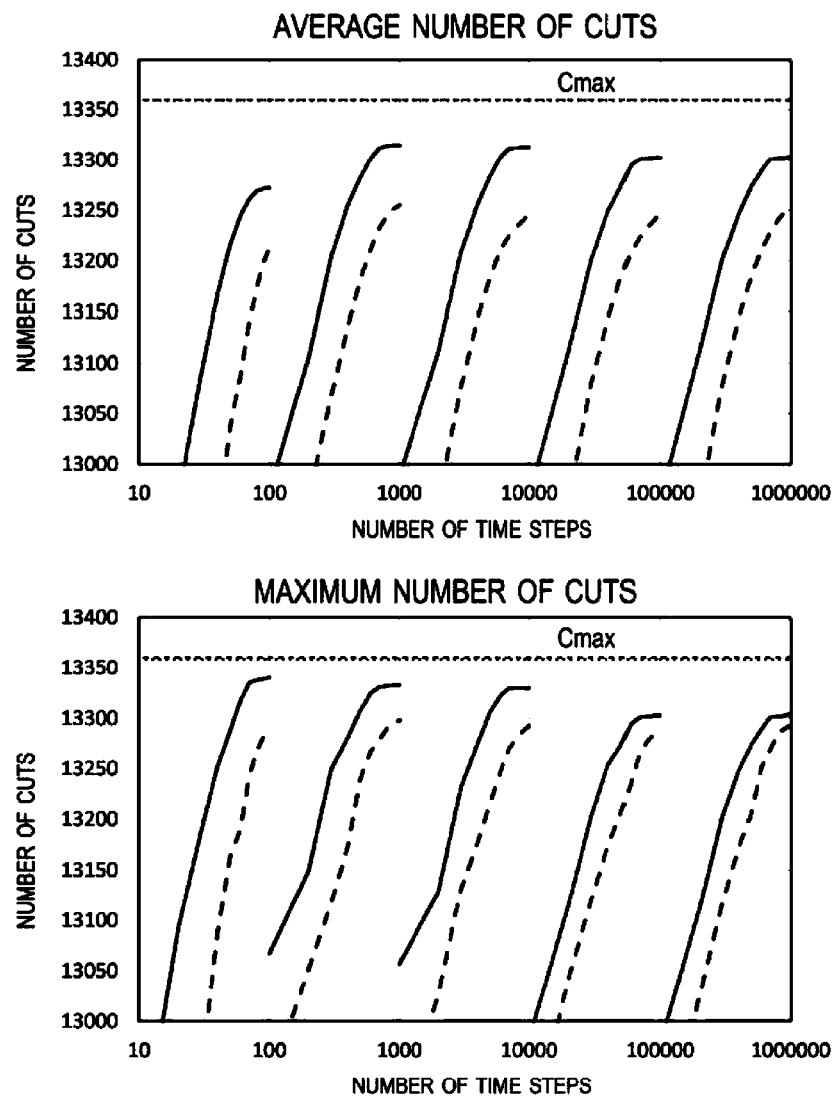
FIG. 12 is a diagram presenting fifth example for number of cuts when the maximum cut problem is solved multiple times.
Figure 13:
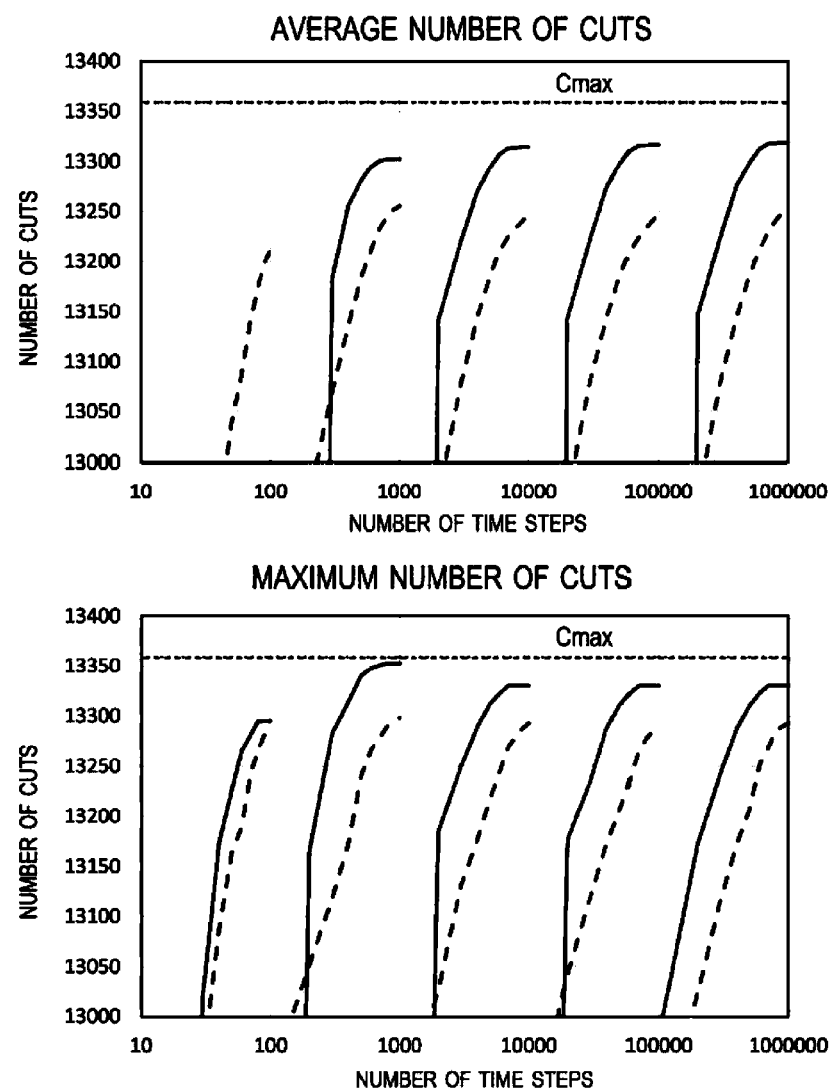
FIG. 13 is a diagram presenting sixth example for number of cuts when the maximum cut problem is solved multiple times.
Figure 14:
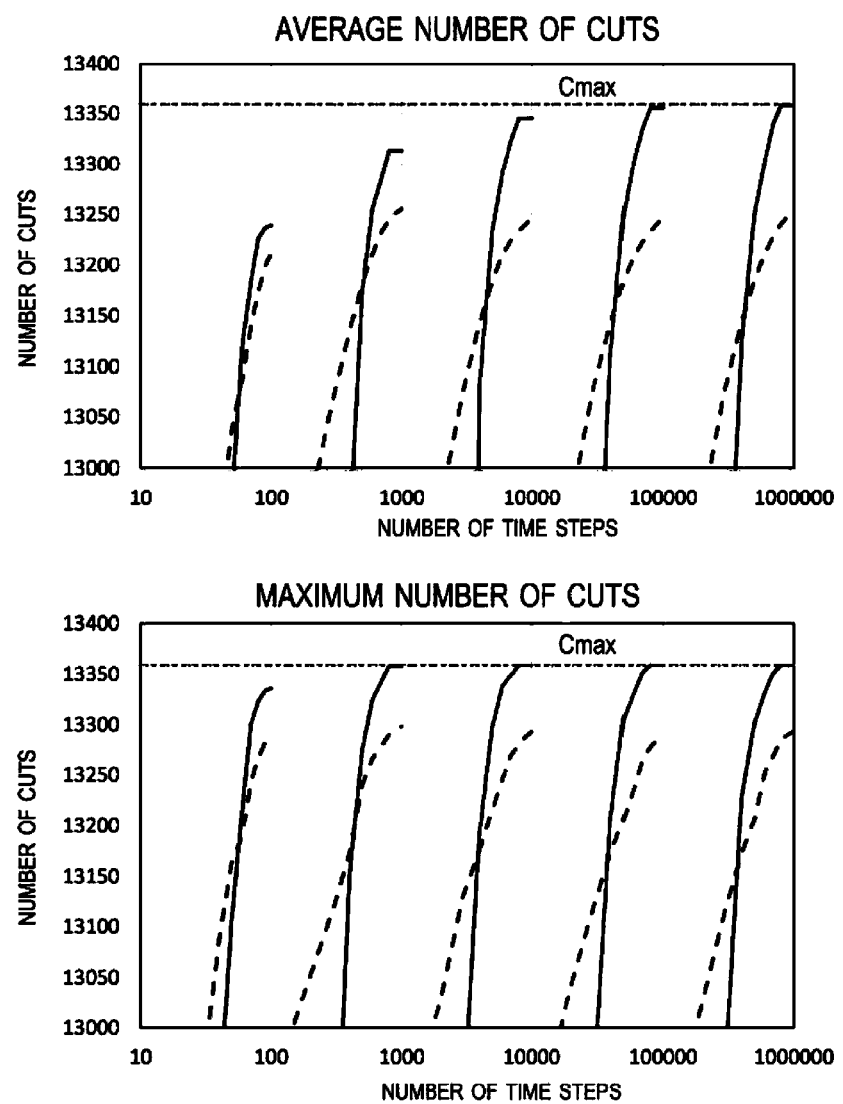
FIG. 14 is a diagram presenting seventh example for number of cuts when the maximum cut problem is solved multiple times.
Figure 15:
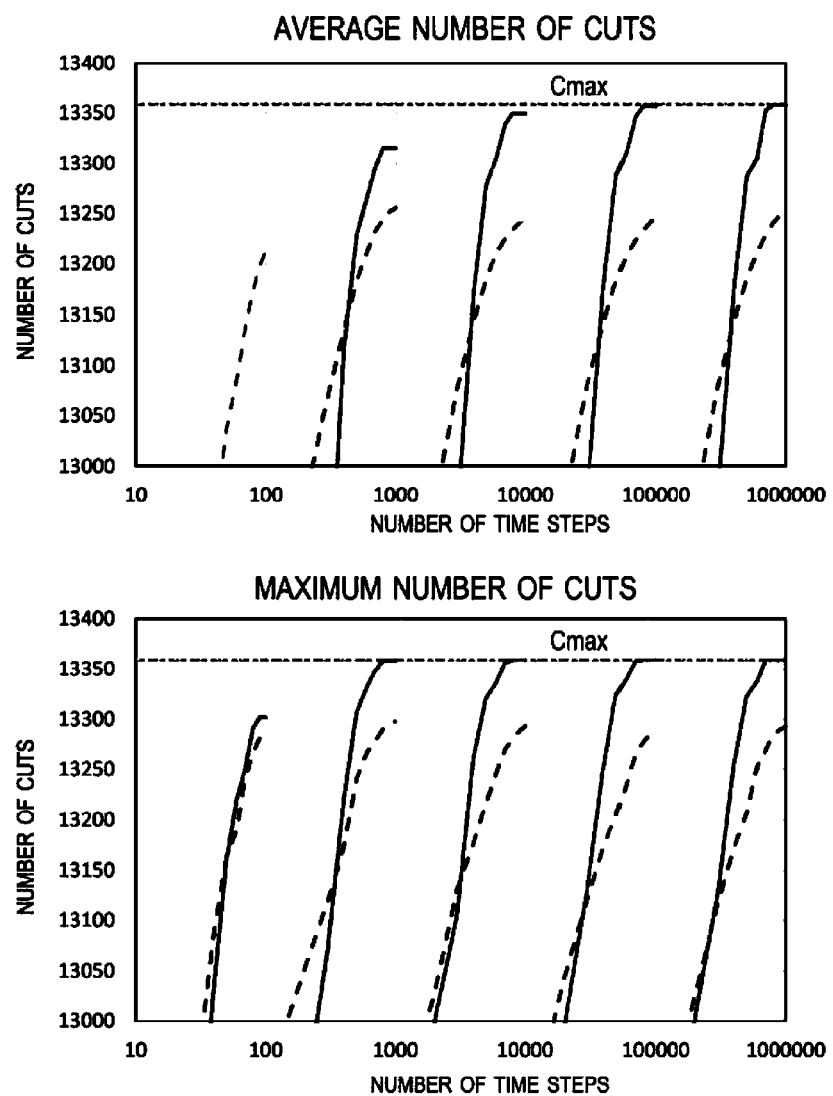
FIG. 15 is a diagram presenting eighth example for number of cuts when the maximum cut problem is solved multiple times.

FIG. 12 presents the result when G22 of the G-set is solved 1,000 times using the algorithm according to (9) with the approximated value c1 instead of the coefficient c. FIG. 13 presents the result when G22 of the G-set is solved 1,000 times using the algorithm according to (9) with the approximated value c'1 instead of the coefficient c. FIG. 14 presents the result when G22 of the G-set is solved 1,000 times using the algorithm according to (10) with the approximated value c1 instead of the coefficient c. FIG. 15 presents the result when G22 of the G-set is solved 1,000 times using the algorithm according to (10) with the approximated value c'1 instead of the coefficient c.

In the graphs of FIG. 12 to FIG. 15, the top sides present the average number of cuts. In the graphs of FIG. 12 to FIG. 15, the bottom sides present the maximum number of cuts. The correspondence of each of the axes and the definition of the horizontal broken line Cmax is similar to the each of the aforementioned graphs. The data indicated in broken lines correspond to the results when the algorithm according to (8) is being used in the calculation. That is, the broken lines correspond to the lines in FIG. 6.

Referring to FIG. 12 to FIG. 15, values closer to the optimal solution are obtained for both the average number of cuts and the maximum number of cuts, compared to the algorithm according to (8). Especially for the algorithm according to (10), use of approximated values c1 or c'1 enable the calculation of the maximum number of cuts 13359.

For the algorithm according to (9) and the algorithm according to (10), the approximated values c2 or c'2 presented in the following equation (15) can be used instead of the approximated values c1 and c'1.

$$c_2 = \frac{|s|}{|z|} = \frac{\sqrt{s_1^2 + s_2^2 + \ldots + s_N^2}}{\sqrt{z_1^2 + z_2^2 + \ldots + z_N^2}} = \frac{\sqrt{N}}{\sqrt{z_1^2 + z_2^2 + \ldots + z_N^2}} \quad (15)$$

$$c'_2 = \frac{(s, s)}{|(s, z)|} = \frac{s_1^2 + s_2^2 + \ldots + s_N^2}{|s_1 z_1 + s_2 z_2 + \ldots + s_N z_N|} = \frac{N}{|s_1 z_1 + s_2 z_2 + \ldots + s_N z_N|}$$

Thus, the updater 50 can be configured to update an element of the second vector by: calculating a third coefficient c2 which is equal to a fourth vector norm divided by a third vector norm; adding a weighted product between a first coefficient $p(t+\Delta t)$ and corresponding element of the first vector; and adding an element of the third vector weighted by the third coefficient c2. Here, the fourth vector is a vector calculated by converting each element of the first vector by signum functions.

Also, the updater 50 can be configured to update an element of the second vector by: calculating a third coefficient c'2 which is equal to an first inner product between fourth vectors divided by an second inner product between the fourth vector and the third vector; adding a weighted product between a first coefficient p(t+Δt) and corresponding element of the first vector; and adding an element of the third vector weighted by the third coefficient c2.

Regarding the equation (15), the third vector ($z_1$, $z_2$, ..., $z_N$) calculated in the variable updating process can be used. Therefore, the use of the approximated variables c2 and c'2 will not increase the computation cost significantly.

Figure 16:
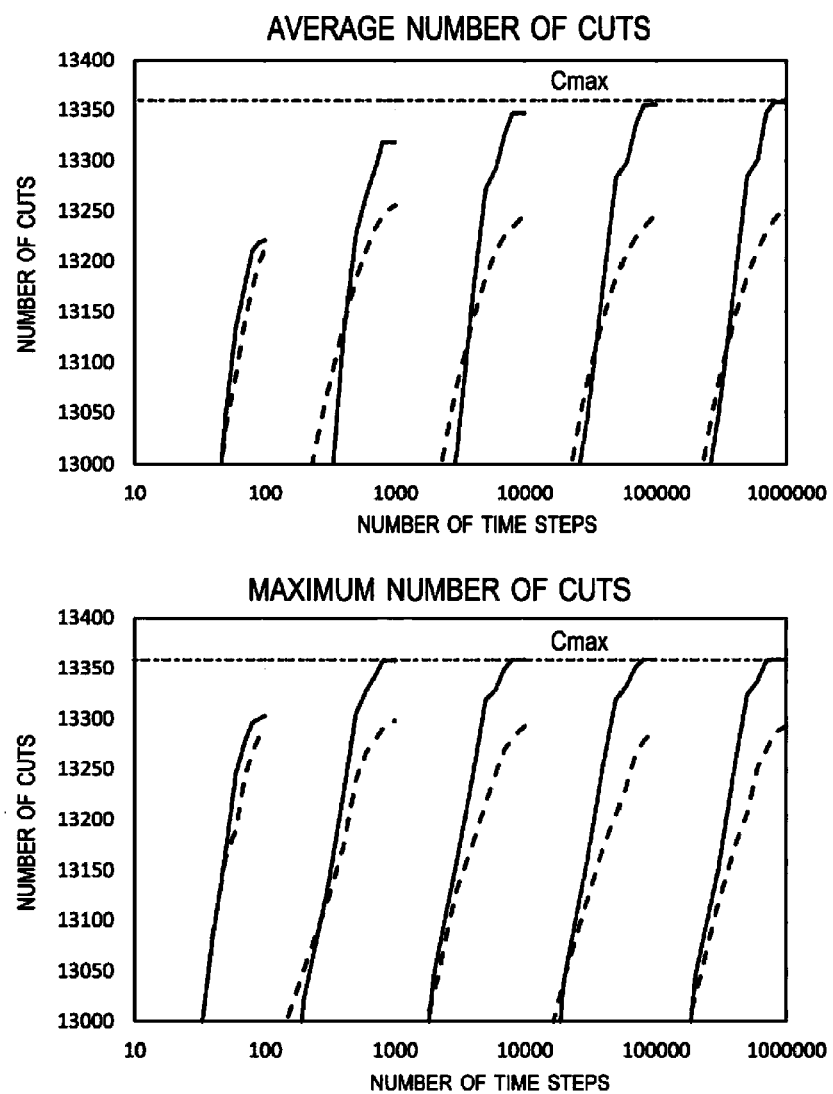
FIG. 16 is a diagram presenting ninth example for number of cuts when the maximum cut problem is solved multiple times.
Figure 17:
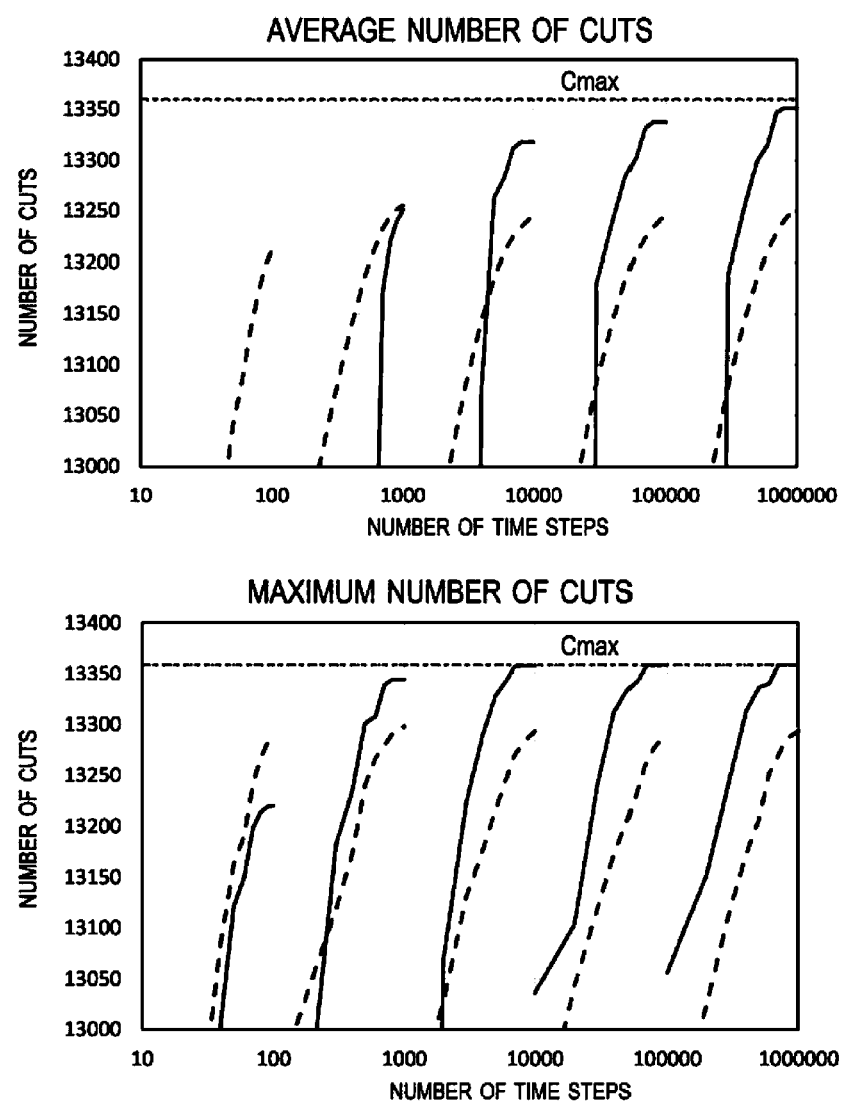
FIG. 17 is a diagram presenting tenth example for number of cuts when the maximum cut problem is solved multiple times.

FIG. 16 presents the result when G22 of the G-set is solved 1,000 times using the algorithm according to (10) with the approximated value c2 instead of the coefficient c. FIG. 17 presents the result when G22 of the G-set is solved 1,000 times using the algorithm according to (10) with approximated value c'2 instead of the coefficient c.

In the graphs of FIG. 16 and FIG. 17, the top sides present the average number of cuts. In the graphs of FIG. 16 and FIG. 17 the bottom sides present the maximum number of cuts. The correspondence of each of the axes and the definition of the horizontal broken line Cmax is similar to the each of the aforementioned graphs. The data indicated in broken lines correspond to the results when the algorithm according to (8) is being used in the calculation. That is, the broken lines correspond to the lines in FIG. 6.

Referring to FIG. 16 and FIG. 17, values closer to the optimal solution are obtained for both the average number of cuts and the maximum number of cuts, compared to the algorithm according to (8). Especially for the algorithm according to (10), use of approximated values c2 or c'2 enable the calculation of the maximum number of cuts 13359.

If the approximated values c1, c'1, c2 and c'2 are calculated by using the values of the vectors during execution of the algorithm, the values may fluctuate rapidly depending on timings. In order to reduce the fluctuations in the approximated values c1, c'1, c2 and c'2, values obtained by converting c1, c'1, c2 and c'2 according to predetermined rules can be used. For example, the following rule presented in equation (16) can be used for conversion.

$$d(t+\Delta t)=d(t)+\gamma[-d(t)+c(t+\Delta t)]\Delta t \quad (16)$$

Here, a value smaller than 1 can be set to γ. In c(t+Δt) of equation (16), approximated values calculated according to the aforementioned equations (13) to (15) can be substituted. In equation (16), c(t+Δt) can be Interpreted as the sampled value of a signal having fluctuating components at each calculation timing. Then, d(t+Δt) can be interpreted as the value of c(t+Δt) being filtered by a low-pass filter with a certain bandwidth.

Thus, the updater 50 can be configured to update an element of the second vector by using a fourth coefficient which is a value of the third coefficient (approximated values c1, c'1, c2 and c'2) converted by a low-pass filter, instead of the third coefficient.

Figure 18:
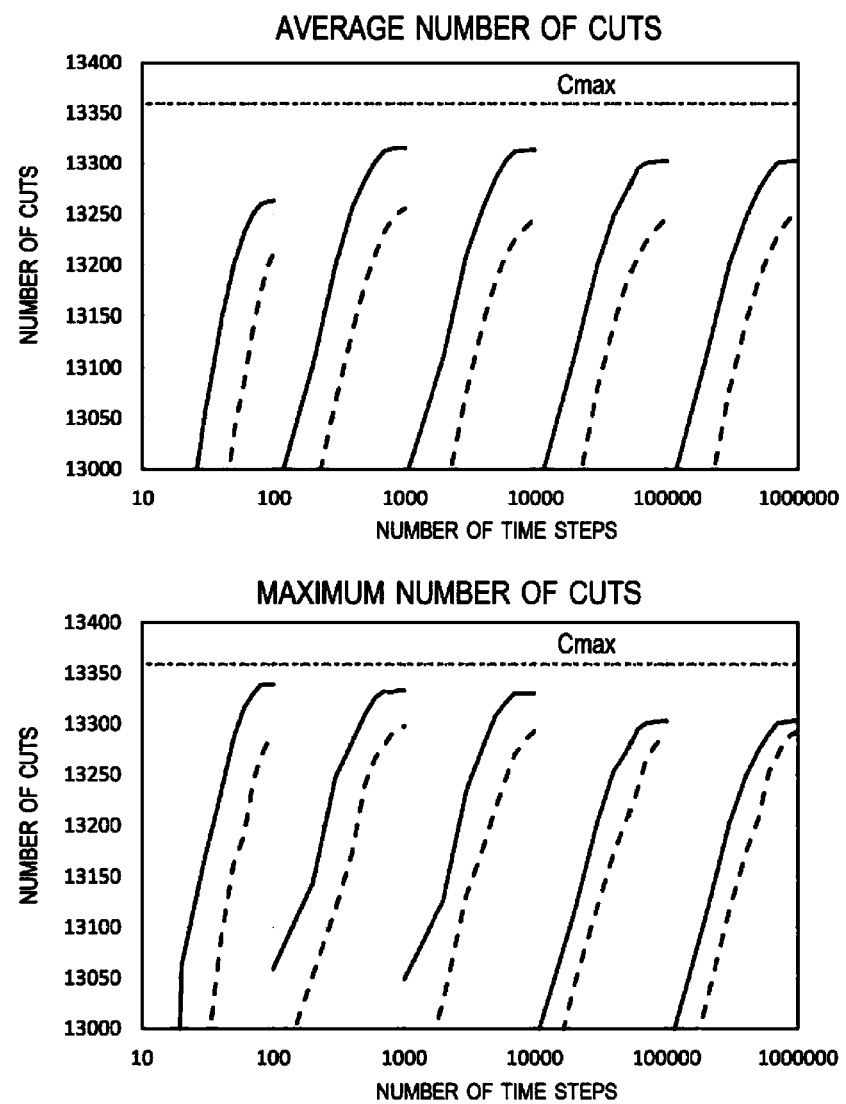
FIG. 18 is a diagram presenting eleventh example for number of cuts when the maximum cut problem is solved multiple times.
Figure 19:
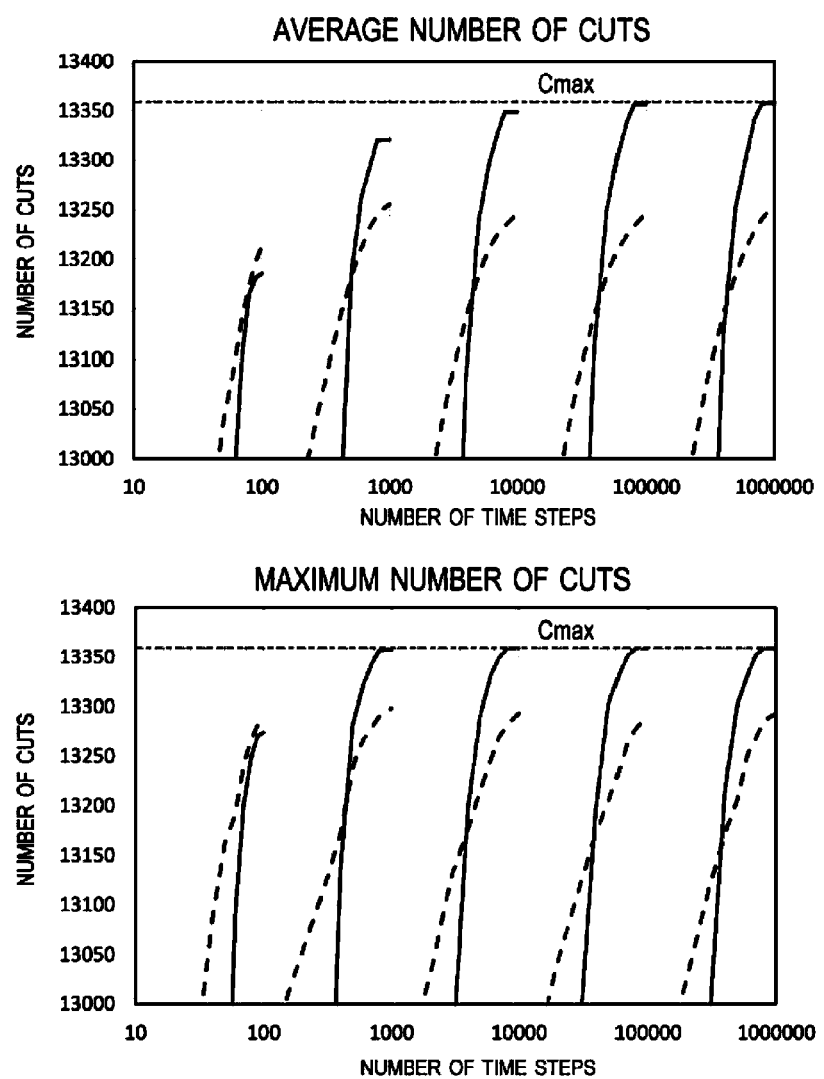
FIG. 19 is a diagram presenting twelfth example for number of cuts when the maximum cut problem is solved multiple times.
Figure 20:
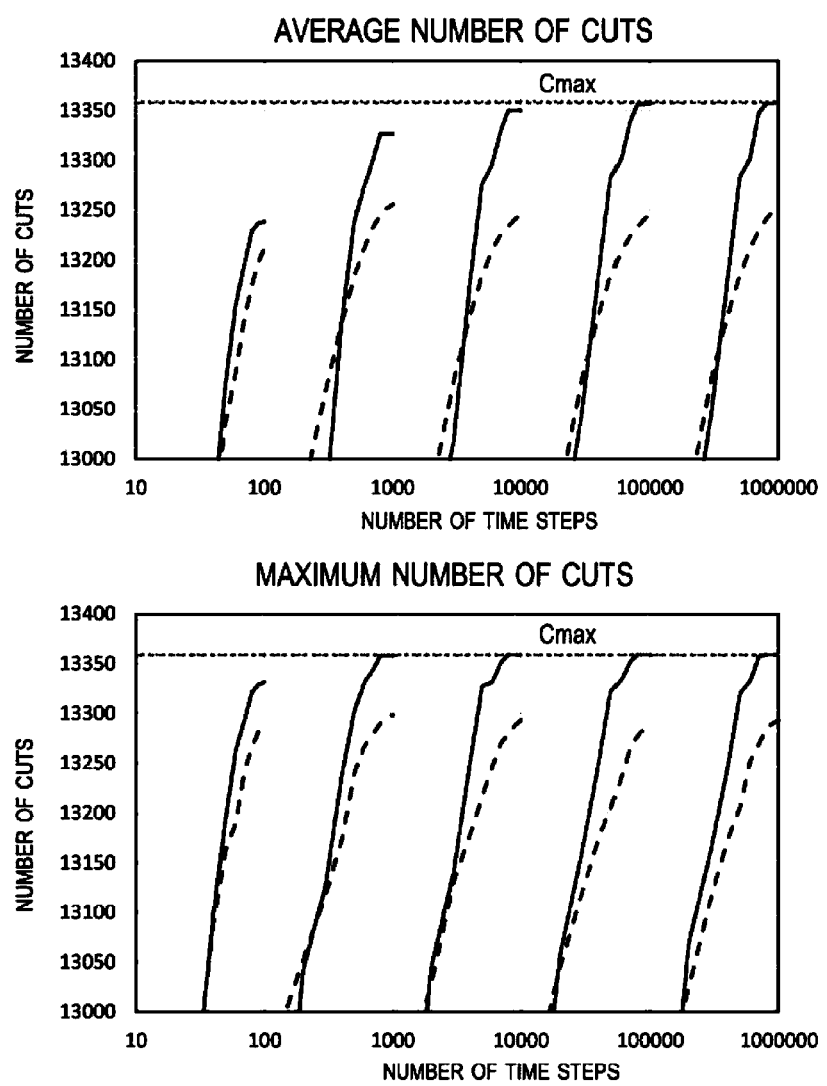
FIG. 20 is a diagram presenting thirteenth example for number of cuts when the maximum cut problem is solved multiple times.

FIG. 18 presents the result when G22 of the G-set is solved 1,000 times using the algorithm according to (9) with the approximated value c1 converted according to the rule of equation (16) (third coefficient) instead of the coefficient c. FIG. 19 presents the result when G22 of the G-set is solved 1,000 times using the algorithm according to (10) with the approximated value c1 converted according to the rule of equation (16) (third coefficient) instead of the coefficient c. FIG. 20 presents the result when G22 of the G-set is solved 1,000 times using the algorithm according to (10) with the approximated value c2 converted according to the rule of equation (16) (third coefficient) instead of the coefficient c.

In FIG. 18 to FIG. 20, calculation was executed by setting 0 as the initial value of d(t) and using γ=0.1.

In the graphs of FIG. 18 to FIG. 20, the top sides present the average number of cuts. In the graphs of FIG. 16 and FIG. 17 the bottom sides present the maximum number of cuts. The correspondence of each of the axes and the definition of the horizontal broken line Cmax is similar to the each of the aforementioned graphs. The data indicated in broken lines correspond to the results when the algorithm according to (8) is being used in the calculation. That is, the broken lines correspond to the lines in FIG. 6.

Referring to FIG. 18 and FIG. 20, values closer to the optimal solution are obtained for both the average number of cuts and the maximum number of cuts, compared to the algorithm according to (8). Especially, in examples of FIG. 19 and FIG. 20, the maximum number of cuts 13359 is obtained in the calculation.

In the examples described above, solutions of the Ising Model were calculated by using the Simulated Bifurcation Algorithm. However, combinatorial optimization problems which can be solved by using the Simulated Bifurcation Algorithm are not limited to Ising problems. General combinatorial optimization problems with binary variables can be calculated by using the Simulated Bifurcation Algorithm. For example, each of the aforementioned algorithms can be used for solving combinatorial optimization problems where the variables of the objective function are binary variables which take either a (first value) or b which is greater than a (second value).

For example, if the value of the variable $x_i$ becomes smaller than "a" after updates during execution of the algorithm according to (9), the value of the variable $x_i$ can be set to "a". Also, if the value of the variable $x_i$ becomes greater than b after updates, the value of the variable $x_i$ can be set to b. Also, if the solution of the objective function is calculated after a certain number of updates, a function $f(x_i)$ having a range of either a or b can be used instead of signum functions. The value of this function $f(x_i)$ can be determined by comparing the value of the variable $x_i$ to a threshold value v (a<v<b). For example, if $x_i$<v, $f(x_i)$=a holds. Also, if v<$x_i$, $f(x_i)$=b holds. For example, if $x_i$=v, either $f(x_i)$=a or $f(x_i)$=b holds. Here, (a+b)/2 can be used as the threshold value v, for example. As the aforementioned function $f(x_i)$, the first function which converts an element of the first vector to the fourth vector can be used.

In above, examples of Simulated Bifurcation Algorithms implemented by the Symplectic Euler Method and examples when a combinatorial optimization problem is calculated by each of the algorithms were described. In the following, examples of actual implementations of the algorithms are explained.

(PC Cluster Implementation Example)

First, a PC duster implementation example of the aforementioned algorithms is explained. A PC duster is a system having a plurality of computers connected together thereby enabling computing performances which cannot be achieved when a single computer is used. For example, the information processing system 100 of FIG. 1 includes a plurality of computing servers and processors. Thus, the information processing system 100 can be used as a PC duster. For example, in PC dusters, MPI (Message Passing Interface) can be used to enable parallel computing in configurations with memory distributed across a plurality of computing servers, as it is the case with the information processing system 100. For example, the control program 14E of the management server 1, the calculation program 34B of each computing server and the control program 34C of each computing server can be implemented by using MPI.

If the number of processors used in the PC duster is Q, L variables $x_i$ in the first vector $(x_1, x_2, \ldots, x_N)$ can be calculated by each processor. Similarly, L variables $y_i$ in the first vector $(y_1, y_2, \ldots, y_N)$ can be calculated by each processor. Thus, a processor #j (j=1, 2, ..., Q) calculates variables $\{x_m | m=(j-1)L+1, (j-1)L+2, \ldots, jL\}$ and $\{y_m | m=(j-1)L+1, (j-1)L+2, \ldots, jL\}$. Also, the tensor $J^{(n)}$ necessary for calculation of $\{y_m | m=(j-1)L+1, (j-1)L+2, \ldots, jL\}$ by the processor #j presented in the following equation (17) can be saved in a storage space accessible from the processor #j. Examples of such storage space include registers, cache and memory.

$$\{J_m^{(1)} | m=(i-1)L+1, \ldots iL\}$$

$$\{J_{m,j}^{(2)} | m=(i-1)L+1, \ldots iL; j=1, \ldots N\}$$

$$\{J_{m,j,k}^{(3)} | m=(i-1)L+1, \ldots iL; j=1, \ldots N; k=1, \ldots N\}, \quad (17)$$

Here, a case when each of the processors calculates a uniform number of variables in the first vector and the second vector was explained. However, the number of variables in the first vector and the second vector calculated by the processors can be different. For example, if there are performance differences in the processors implemented in the computing server, the number of variables to be calculated by each processor can be determined based on the performance of the processors.

Thus, the information processing device (for example, the computing server) can have a plurality of processors. At least either of the plurality of processors can be used as the updater 50. Thus, the updater 50 can include a plurality of processors. At least either of the plurality of processors can be configured to calculate some of the elements in the first vector and some of the elements in the second vector.

To update the value of variable $y_i$, the values of all the elements in the first vector $(x_1, x_2, \ldots, x_N)$ or the fourth vector $(s_1, s_2, \ldots, s_N)$ are needed. Here, the fourth vector $(s_1, s_2, \ldots, s_N)$ is a vector obtained by converting each element of the first vector to binary variables. For example, signum functions sgn( ) can be used for the conversion to binary variables. Here, Allgather functions can be used to share the values of all the elements in the first vector $(x_1, x_2, \ldots, x_N)$ and the fourth vector $(s_1, s_2, \ldots, s_N)$ to the Q processors. While the values of first vector $(x_1, x_2, \ldots, x_N)$ and the fourth vector $(s_1, s_2, \ldots, s_N)$ need to be shared between processors, the values of the second vector $(y_1, y_2, \ldots, y_N)$ and the tensor $J^{(n)}$ do not need to be shared between processors. For example, by using interprocessor communication or allocation of data to shared memory, data can be shared between processors.

The processor #j calculates values of the variables $\{z_m | m=(j-1)L+1, (j-1)L+s, \ldots, jL\}$. Then, the processor #j updates the variables $\{y_m | m=(j-1)L+1, (j-1)L+s, \ldots, jL\}$ based on the calculated values of $\{z_m | m=(j-1)L+1, (j-1)L+s, \ldots, jL\}$.

As presented in the aforementioned equations, the calculation of the vector $(z_1, z_2, \ldots, z_N)$ includes calculation of the product(s) between the tensor $J^{(n)}$ and the vector $(x_1, x_2, \ldots, x_N)$ or the product(s) between the tensor $J^{(n)}$ and the vector $(s_1, s_2, \ldots, s_N)$. Thus, in Simulated Bifurcation Algorithm, product-sum operations are necessary. Product-sum operations are operations having the greatest computation cost within the algorithms. Therefore, product-sum operations may become bottlenecks for improving calculation speeds. In the PC duster implementation, product-sum operations can be distributed across Q=N/L processors, enabling parallel executions of the product-sum operations and shorter calculation times.

Thus, the information processing device (for example, the computing server) can have a plurality of processors. At least either of the plurality of processors can be used as the multiply-accumulator 51. Thus, the multiply-accumulator 51 can include a plurality of processors. At least either of the plurality of processors can be configured to update some of the elements in the third vector. The updater 50 can also include a plurality of processors. Each of the plurality of processors in the updater 50 can be configured to update some of the elements in the first vector and some of the elements in the second vector.

Figure 21:
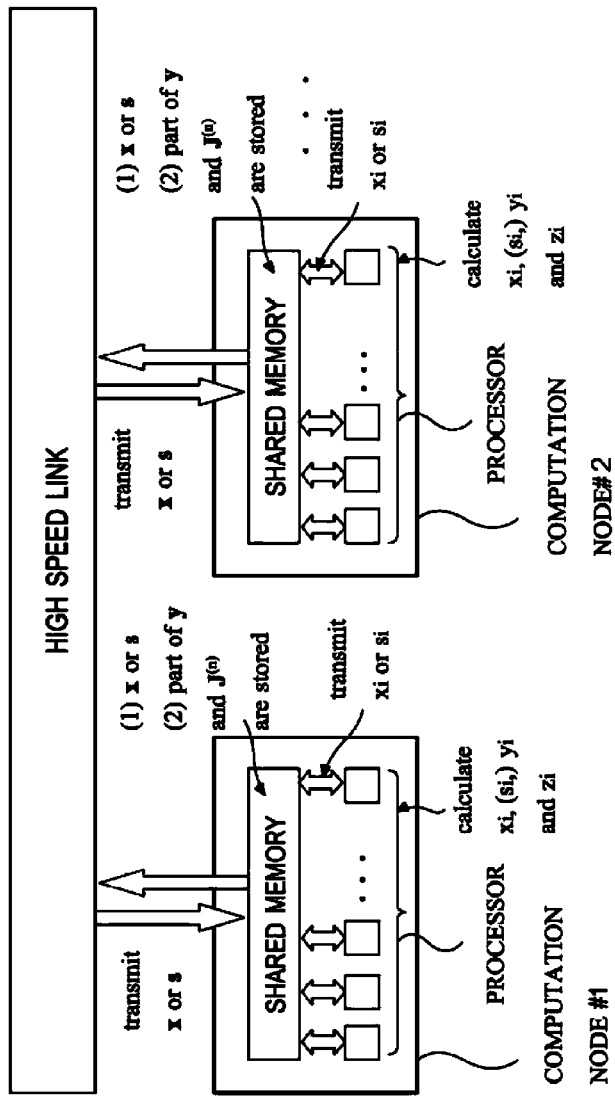
FIG. 21 is a schematic diagram presenting an example of a multiprocessor configuration.

FIG. 21 is a schematic diagram presenting an example of a multiprocessor configuration. The plurality of computation nodes in FIG. 21 corresponds to the plurality of computing servers of the information processing system 100. For example, the high speed link in FIG. 21 corresponds to the interconnection between the computing servers formed with the cables 4a to 4c and the switch 5. The shared memory in FIG. 21 corresponds to the shared memory 32. The processors in FIG. 21 correspond to the processors 33A to 33D in each computing server. In FIG. 21, a plurality of computation nodes are illustrated. However, a system with a configuration of a single computation node can be used, instead.

FIG. 21 presents data allocated in each of the components and data transmitted between the components. In each processor, the values of the variables $x_i$, $(s_i)$, $y_i$ and $z_i$ are calculated. Also the variables $x_i$ or $s_i$ are transmitted between the processors and the shared memory. Part of the tensor $J^{(n)}$ and total L variables from both the first vector $(x_1, x_2, \ldots, x_N)$ and the second vector $(y_1, y_2, \ldots, y_N)$ are saved in the shared memory of each computation node. If the algorithm according to (10) is executed, the fourth vector $(s_1, s_2, \ldots, s_N)$ can be saved in the shared memory of each of the computation nodes, instead of the first vector $(x_1, x_2, \ldots, x_N)$. The variables of the first vector $(x_1, x_2, \ldots, x_N)$ are transmitted by the high speed link connecting the computation nodes. This is because, when the Allgather function is used, the values of all the elements in the first vector $(x_1, x_2, \ldots, x_N)$ are needed to update the variables $y_i$ and $z_i$ in each processor. To update the variables $z_i$ according to the algorithm according to (10), the values of all the elements in the fourth vector need $(s_1, s_2, \ldots, s_N)$ to be accessible from each processor. Therefore, the fourth vector $(s_1, s_2, \ldots, s_N)$ can be transmitted in the high speed link.

However, the data allocation and data transmission presented in FIG. 21 is only an example. For example, a plurality of processors are executing calculations of variables $\{z_m | m=(j-1)L+1, (j-1)L+2, \ldots, jL\}$ including product-sum operations in parallel, the values of the variables $z_i$ can be shared between processors by using shared memory or transmission between computation nodes. Thereby, the values of the elements in the vector $(z_1, z_2, \ldots, z_N)$ can shared, enabling the calculations of the variables $y_i$. Thus, the allocation of data, data transmission methods and methods of parallelization are not limited in the PC duster implementation.

The information processing device (for example, the computing server) can have shared memory which is accessible from a plurality of processors. Then, the updater 50 can save elements of the updated first vector to the shared memory. Also, the updater 50 can save elements of the updated fourth vector to the shared memory, by converting each of the elements of the updated first vector.

Figure 22:
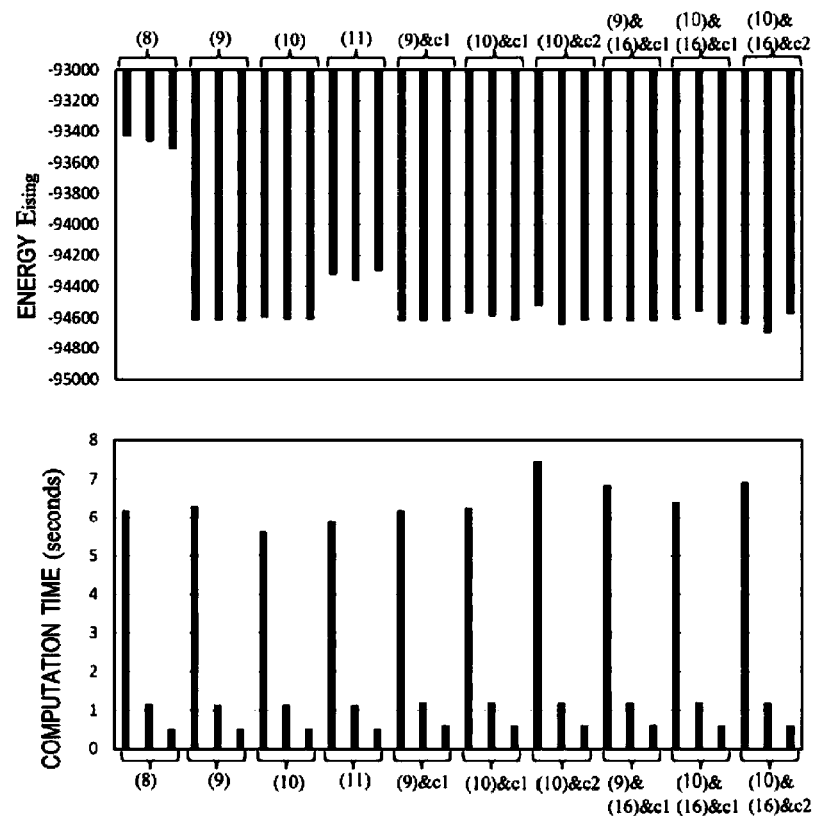
FIG. 22 is a diagram presenting results when a fully connected N=3,600 Ising problem is solved by using a PC duster.

Next, results when the aforementioned algorithms are executed on the PC duster are explained. FIG. 22 is a diagram presenting results when a fully connected N=3,600 Ising problem (without local magnetic fields) is solved by using a PC duster. In the fully connected Ising problem of FIG. 22, uniformly distributed random numbers in the range of [−1, 1] were used for the values of the elements in the coupling coefficient matrix J. Also, the total time steps were set to 10,000. The bar graph in the top side of FIG. 22 presents the average value of the energy $E_{Ising}$ when the fully connected Ising problem is solved 10 times using the aforementioned algorithms. On the other hand, the bar graph in the bottom side of FIG. 22 presents the computation time in units of seconds when the fully connected Ising problem is solved 10 times using the aforementioned algorithms.

For the bar graphs in the top side of FIG. 22 and bottom side of FIG. 22, ten results for each of the different conditions are presented from the left side to the right side. The results are:
(i) the result when the algorithm according to (8) is used;
(ii) the result when the algorithm according to (9) is used;
(ii) the result when the algorithm according to (10) is used;
(iv) the result when the algorithm according to (11) is used;
(v) the result when the approximated value c1 is used instead of the coefficient c in the algorithm according to (9);
(vi) the result when the approximated value c1 is used instead of the coefficient c in the algorithm according to (10);
(vii) the result when the approximated value c2 is used instead of the coefficient c in the algorithm according to (10);
(viii) the result when the value obtained by converting the approximated value c1 according to the rule (16) (the fourth coefficient) is used instead of the coefficient c in the algorithm according to (9);
(ix) the result when the value obtained by converting the approximated value c1 according to the rule (16) (the fourth coefficient) is used instead of the coefficient c in the algorithm according to (10); and
(x) the result when the value obtained by converting the approximated value c2 according to the rule (16) (the fourth coefficient) is used instead of the coefficient c in the algorithm according to (10).

Also, in the bar graphs of the top side of FIG. 22 and the bottom side of FIG. 22, results when the number of processors Q is 1, 36 and 72 are presented from the left side to the right side. If the number of processors Q is 1 or 36, the number of computation nodes in the PC duster was 1. If the number of processors Q is 72, the number of computation nodes in the PC duster was 2. A constant value 0.5D(3/N)^(½) was used for the coefficient c, for the case when the algorithm according to (8) was used, the case when the algorithm according to (9) was used and the case when the algorithm according to (10) is used. Also, the value of γ was set to 0.1 for the cases when the approximated values c1 and c2 were converted according to the rule of (16).

Referring to the bar graph in the top side of FIG. 22, the average value of energy $E_{Ising}$ is lower than the result of (i), for the results of (ii) to (x). Thus, the conditions corresponding to (ii) to (x) can yield solutions closer to the optimal solution. Also, referring to the bar graph in the bottom side of FIG. 22, it can be confirmed that parallel calculation with multiprocessor configurations can shorten computation time drastically.

(GPU Implementation Example)

Figure 23:
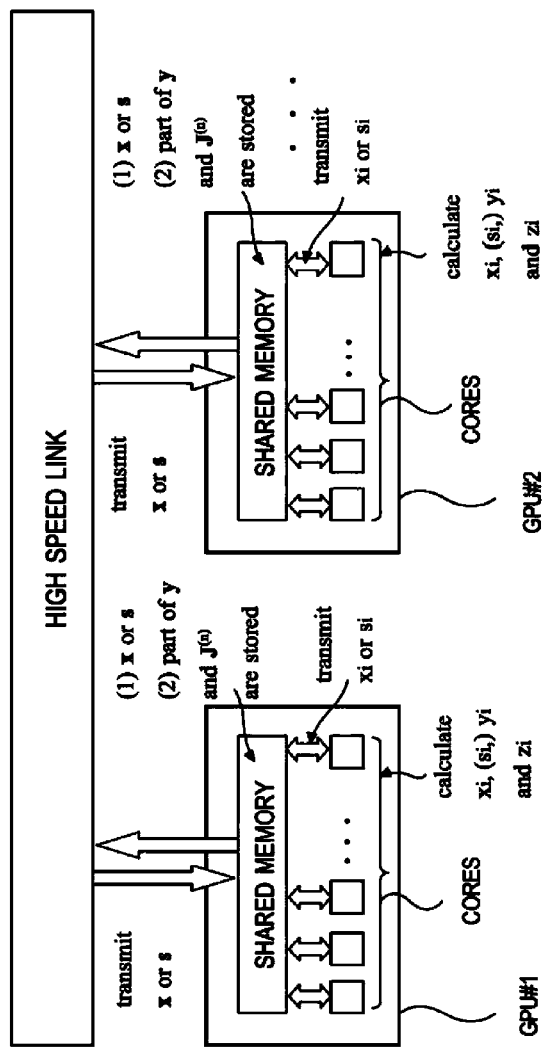
FIG. 23 is a schematic diagram presenting an example of configuration using GPUs.

The calculation of the aforementioned algorithms can be executed by using GPUs (Graphics Processing Units). FIG. 23 is a schematic diagram presenting an example of configuration using GPUs. FIG. 23 includes a plurality of GPUs connected with a high-speed link. Each GPU includes a plurality of cores which can access data stored in the shared memory. In the configuration example of FIG. 23, a plurality of GPUs is connected via a high-speed link forming a GPU duster. For example, if GPUs are installed to each of the computing servers of FIG. 1, the high-speed link corresponds to the interconnection formed by the cables 4a to 4c and the switch 5. In the configuration example of FIG. 23, a plurality of GPUs is used. However, even when a single GPU is used, calculation can be executed in parallel. Each of the GPUs in FIG. 23 can execute the calculation corresponding to each of the computation nodes in FIG. 21. Therefore, the processors of the information processing device (computing server) can be a core of a Graphics Processing Unit (GPU).

In the GPUs, the variables $x_i$, $y_i$ and the tensor $J^{(n)}$ can be defined as the device variable. The GPUs can calculate the product of the tensor $J^{(n)}$ and the first vector $(x_1, x_2, \ldots, x_N)$ or the product of the tensor $J^{(n)}$ and the fourth vector $(s_1, s_2, \ldots, s_N)$ in parallel by using matrix vector product functions for updating the variables $y_i$. By executing the product operation between matrices and vectors, the product between tensors and vectors can be calculated. The calculation of the first vector $(x_1, x_2, \ldots, x_N)$ and the second vector $(y_1, y_2, \ldots, y_N)$ except the product-sum operations can be executed by each of the threads. Thereby, the calculation processes can be parallelized.

Figure 24:
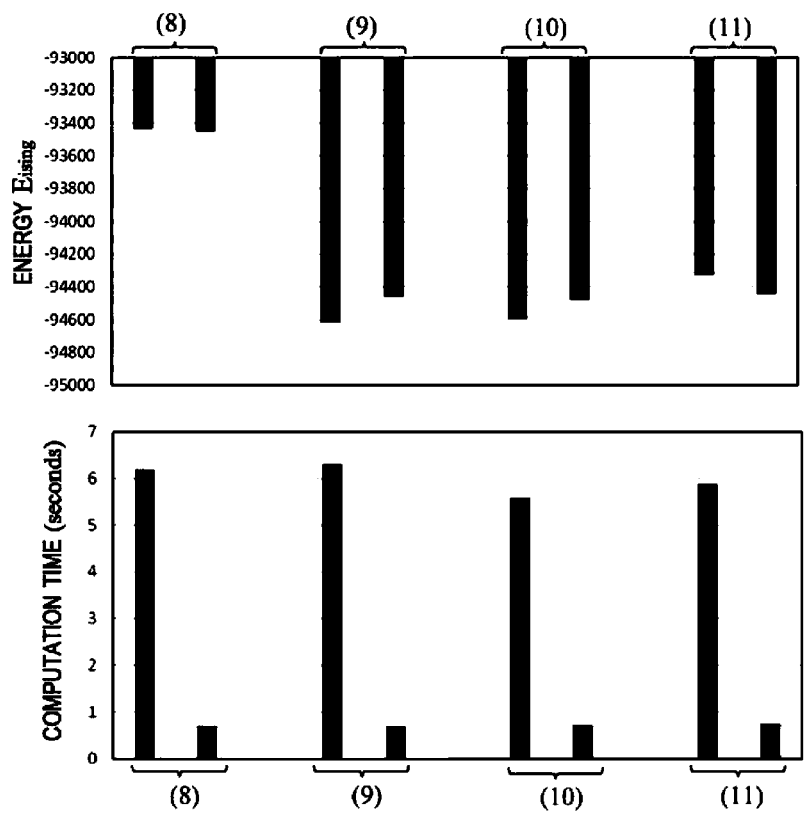
FIG. 24 is a diagram presenting results when a fully connected N=3,600 Ising problem is solved by using a GPU.

FIG. 24 is a diagram presenting results when a fully connected N=3,600 Ising problem is solved by using a GPU. The bar graph in the top side of FIG. 24 presents the average energy $E_{Ising}$ when the fully connected Ising problem is solved ten times by using each algorithm. On the other hand, the bar graph in the top side of FIG. 24 presents the average computation time when the fully connected Ising problem is solved ten times by using each algorithm, in units of seconds.

Both the bar graph in the top side of FIG. 24 and the bar graph in the bottom side of FIG. 24 include four cases; the case when the algorithm according to (8) is used, the case when the algorithm according to (9) is used, the case when the algorithm according to (10) is used, and the case when the algorithm according to (11) is used. The constant 0.5D (3/N)^(½) is used as the coefficient c for the case when the algorithm according to (8) is used, the case when the algorithm according to (9) is used and the case when the algorithm according to (10) is used. The total time steps for each of the cases are set to 10,000. Also, the left side corresponds to the result obtained when a PC duster with single computation node is used, for each of the algorithms. The right side corresponds to the result obtained when 1 GPU is used, for each of the algorithms.

Referring to the bar graph in the top side of FIG. 24, the average value of energy $E_{Ising}$ becomes lower when the algorithms of (9) to (11) are used, compared to cases when the algorithm according to (8) is used. If the average value of energy $E_{Ising}$ is lower, the possibility that a solution close to the optimal solution is calculated becomes greater. Referring to the bar graph in the bottom side of FIG. 24, parallel calculation by GPU shortens computation time compared to cases when a PC duster with a single computation node is used. This is because the degree of parallelism is higher in GPUs compared to general purpose CPUs.

(Example of Processing Flow)

Figure 25:
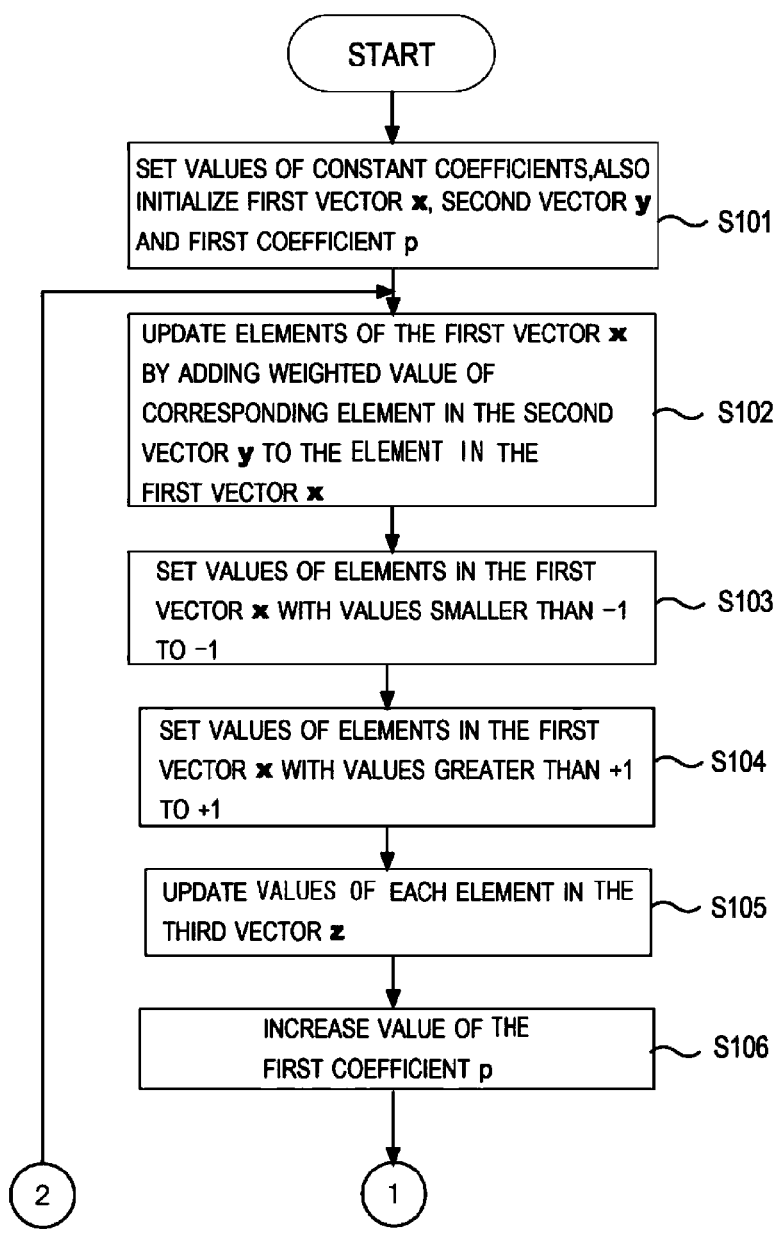
FIG. 25 is a flowchart presenting an example process executed by the information processing system.
Figure 26:
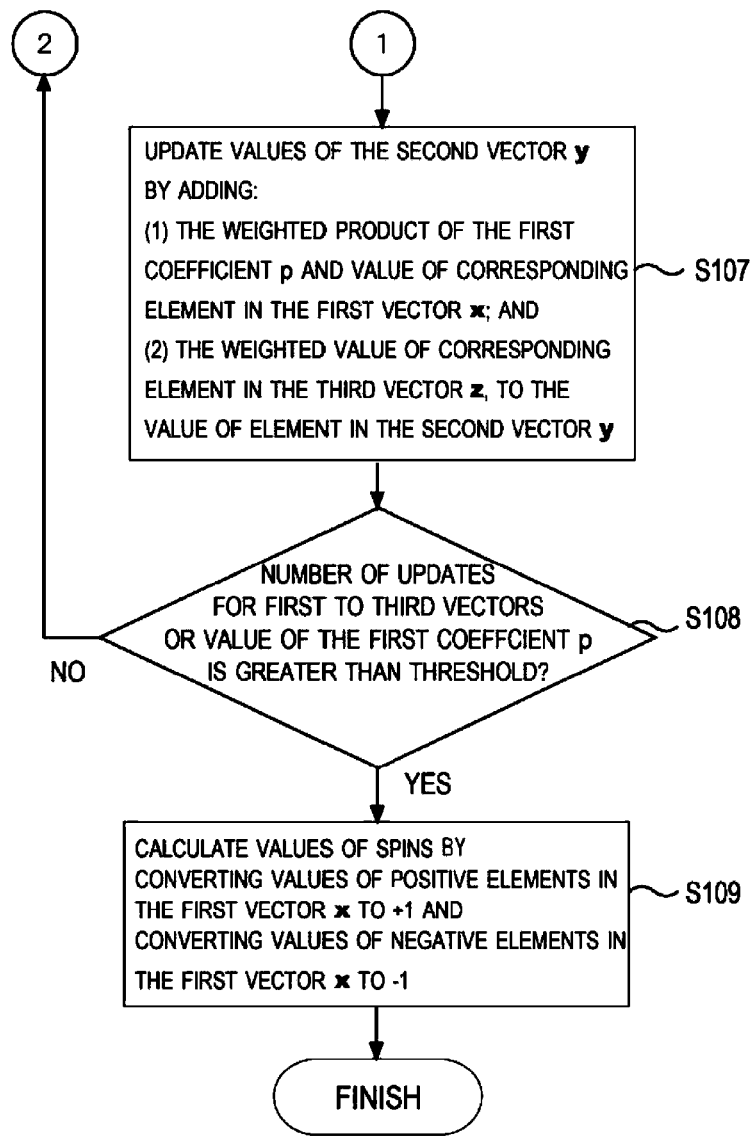
FIG. 26 is a flowchart presenting an example process executed by the information processing system.

FIG. 25 and FIG. 26 include a flowchart presenting an example process executed by the information processing system 100. In the following, the process is explained with reference to FIG. 25 and FIG. 26.

First, the updater 50 sets values of constant coefficients and initializes the first vector, the second vector and the first coefficient p (step S101). In step S101, values of the constant coefficient D and Δt are set. If the coefficient c is a constant, the value of the coefficient c can be set as well. For example, during the initialization of the first vector and the second vector, the values for each of the elements can be set to pseudorandom numbers within the range of [−0.1, +0.1]. For example, 0 can be used as the initial value of the first coefficient p. Also, if the coefficient a used during the calculation of elements of the third vector is a constant, the coefficient a can be initialized in step S101. For example, 0 can be used as the initial value of the coefficient a. Also, in step S101, values of the elements in the tensor $J^{(n)}$ can be set. The values of the elements in the tensor $J^{(n)}$ can be obtained when the combinatorial optimization problem is converted to formats which can be processed by each computing server. In above algorithms which increase the values of the coefficients p and a according to the number of updates were explained. However, algorithms which decrease the values of the coefficients p and a according to the number of updates can be used, instead.

Next, the updater 50 updates the elements of the first vector by adding weighted value of corresponding element in the second vector to the element in the first vector (step S102). For example, in step S102, the values of elements in the first vector can be updated by using equations of $x_i$ presented in (9) to (11) above.

Then, the updater 50 sets values of elements in the first vector with values smaller than −1 to −1 (step S103). Also, the updater 50 sets values of elements in the first vector with values greater than +1 to +1 (step S104). The processes of steps S103 and S104 can be executed simultaneously. Also, the process of step S103 can be executed after the process of step S104.

Although not presented in FIG. 25, the updater 50 can update the element of the second vector corresponding to the element of the first vector with an absolute value greater than 1 by multiplying a second coefficient r which is greater than −1 and equal to or less than 0 to the original value of the second vector in steps S103 and/or S104. Also, the updater 50 can set to value of the element of the second vector corresponding to the element of the first vector with an absolute value greater than 1 to pseudorandom numbers with an absolute value smaller than 1 in steps S103 and/or S104.

Next, the multiply-accumulator 51 updates values of each element in the third vector (step S105). For example, the elements of the third vector can be calculated by using equations of $z_i$ (basic equations) presented in (9) to (11) described above. The values of each element in the third vector can be updated according to the algorithm according to (10). In the algorithm according to (10) is used, the values of elements in the first vector converted by the first function (for example, signum functions) can be used as variables in the equation of $z_i$. In this case, the values of the elements in the third vector are calculated by using a fourth vector ($s_1$, $s_2$, . . . , $s_N$) in step S105. The fourth vector ($s_1$, $s_2$, . . . , $s_N$) can be obtained by converting the first vector updated in step S102 to binary variables.

Then, the updater 50 increases the value of the first coefficient p (step S106). For example, in step S106, a constant value can be added to the first coefficient p. Also, a variable which is not constant can be added to the first coefficient p. Thereby, the value of the first coefficient p increases monotonically according to the number of updates. If the coefficient a is not a constant coefficient, a constant value can be added to the coefficient a in step S106. Also, in step S106, the value of the third coefficient can be updated according to the methods of (13) to (15). The value of the fourth coefficient obtained by converting the third coefficient according to equation (16) can be calculated in step S106.

Next, the updater 50 updates the values of the second vector by adding: (1) the weighted product of the first coefficient p and value of the corresponding element in the first vector; and (2) the weighted value of the corresponding element in the third vector to the value of element in the second vector (step S107). For example, values of the elements in the second vector can be updated by using the equation of $y_i$ presented in (9) to (11) above. During the update of the second vector, at least either the constant coefficient c, the third coefficient or the fourth coefficient can be used to calculate weighted values of corresponding elements in the third vector.

Then, the updater 50 determines whether the number of updates for the first to third vectors or the value of the first coefficient p is greater than threshold or not (step S108). The value of the threshold used in the judgment of step S108 is not limited. Depending on the result of the judgment in step S108, the executed process branches. If the result of judgment in step S108 is positive (YES in step S108), the process proceeds to step S109. In step S109, the updater 50 calculates values of spins by converting values of positive elements in the first vector to +1 and converting values of negative elements in the first vector x to −1. The process of step S109 can be executed by information processing devices other than the computing servers, such as the management server. Then, the first vector can be transmitted from the computing server to the management server. Also, if the result of judgment in step S108 is negative (NO in step S108), the process of step S102 and beyond are executed again.

The flowchart presented in FIG. 25 and FIG. 26 is only an example of the processes which can be executed by the information processing system 100. The order the processes of steps S102 to step S107 are executed can be different from above. For example, in the electronic circuit explained below, the processes of steps S102 to step S107 are executed in a different order compared to the flowchart presented in FIG. 25 and FIG. 26. Also, at least either of the processes in steps S101 to steps S109 can be executed in parallel by plurality of processors, plurality of information processing devices (computers) or a plurality of electronic circuits. The information processing system, the information processing device (the computer) or the electronic circuit can be implemented so that all the elements of the first vector ($x_1$, $x_2$, . . . , $x_N$) or the fourth vector ($s_1$, $s_2$, . . . , $s_N$) after the latest update can be accessed during the updating process of the element of the third vector (variable $z_i$).

The values of the spins in the calculated Ising Model can be presented on a display device. Also, the converter service 12 in the management server 1 can convert the combination of spin values to the solution of the combinatorial optimization problem. In this case, the management service 11 of the management server 1 can present the solution of the combinatorial optimization problem to the display of the client device 6, which is used by the user.

The Simulated Bifurcation Algorithm can be implemented by using a program. In this case, a program which makes the computer execute calculations based on basic equations can be implemented. Here, each of the basic functions is a partial derivative of an equation respect to either of the variables. The corresponding program includes: a step for updating each of the elements in the third vector based on basic equations having elements of a first vector or a fourth vector as variables; a step for updating an element of the first vector by adding a corresponding element of a second vector or the weighted value of the second vector to the element of the first vector; a step for setting an element of the first vector with a value smaller than a first value to the first value; a step for setting an element of the first vector with a value greater than a second value to the second value; and a step for updating an element of the second vector by adding (i) a weighted product between a first coefficient which increases or decreases monotonically based on number of updates and a corresponding element of the first vector and (ii) a weighted value of a corresponding element of the third vector. Here, the fourth vector can be calculated by converting the first vector with a first equation. The first equation converts elements of the first vector to either a first value or a second value which is greater than the first value. For example, the program is stored in the storage 34 of the computing server. The computing server can provide the functions of the aforementioned information processing device by executing the program.

Also, the computer can execute the Simulated Bifurcation Algorithm according to the following information processing method. The information processing method can make the computer execute calculations based on basic equations, each of the basic equations is a partial derivative of an equation respect to either of the variables. The information processing method includes: a step for updating each of the elements in the third vector based on basic equations having elements of a first vector or a fourth vector as variables; a step for updating an element of the first vector by adding a corresponding element of a second vector or the weighted value of the second vector to the element of the first vector; a step for setting an element of the first vector with a value smaller than a first value to the first value; a step for setting an element of the first vector with a value greater than a second value to the second value; and a step for updating an element of the second vector by adding (i) a weighted product between a first coefficient which increases or decreases monotonically based on number of updates and a corresponding element of the first vector and (ii) a weighted value of a corresponding element of the third vector. Here, the fourth vector can be calculated by converting the first vector with a first equation. The first equation converts elements of the first vector to either a first value or a second value which is greater than the first value. The aforementioned computing server can be used as the information processing device.

(Example of Implementation to an Electronic Circuit)

As mentioned above, use of software enables execution of the Simulated Bifurcation Algorithm on an information processing device. However, at least part of the aforementioned algorithms can be implemented on an electronic circuit, thereby improving the processing speed drastically. In the following, an example when the Simulated Bifurcation Algorithm is implemented to an electronic circuit is explained. Examples of electronic circuits include FPGAs (Field-Programmable Gate Arrays). However, other types of electronic circuits such as ASICs (Application Specific Integrated Circuits).

FIG. 27 is a diagram presenting an example of an algorithm implemented to an electronic circuit. FIG. 27 corresponds to the pseudocode of the algorithm according to (10) described above. In the following, a case when the algorithm according to (10) is implemented to an electronic circuit is explained. However, other algorithms explained above such as (9) and (11) can be implemented to the electronic circuit. FIG. 27(a) presents the process for updating each of the variables $x_i$, $y_i$ and $s_i$ (i=1, 2, . . . , N). By executing the process, the variables are updated from values at time "t" to values at time "t+$\Delta$t". For each of the N variables indicated in the index "i", the update process is executed N times (loop 37 and 38). The function JS( ) is called from the loop 37 in FIG. 27 (a). The function JS( ) is defined in FIG. 27 (b). The function JS( ) has the row i in the J matrix and the vector ($s_1$, $s_2$, . . . , $s_N$) as parameters. Also, the function TE( ) is called from the loop 38 in FIG. 27 (a). The function TE( ) is defined in FIG. 27 (c). Also, functions FX( ) and FY( ) defined in FIG. 27(d) are called from the function TE( ). If electronic circuits which are configured to execute processes in parallel are used for implementation of the algorithm, at least part of the processes described as loops ("for" statements) can be altered to processes which are executed in parallel.

It is possible to interpret that the algorithm described in FIG. 27 calculates states of a dynamical system including a wall and a plurality of particles i (i=1, 2, . . . , N). In the following, the processes executed in each step of the algorithm are explained with reference to the dynamics of the particles i. The algorithm in FIG. 27 includes a part which calculates a matrix-vector product (to be referred to as the MM part) and a part which calculates time-evolution (to be referred to as the TE part).

The MM part calculates the delta $\Delta y_i$ of the momentum $y_i$ caused by interaction between other particles, for each of the particles i. The TE part updates the position $x_i$ and the momentum $y_i$ for each of the particles i. The process for updating the position and momentum of the particles correspond to the calculation of time-evolution for the time step $\Delta t$.

The TE part calculates the momentum $y_i$ by adding $\Delta y_i$ and including the effect of the external field $h_i$. Then, the amount $\delta y_i = FX(x_i)$ dependent on the position $x_i$ of the particle is added to the momentum $y_i$. Next, the amount $\delta x_i = FY(y_i)$ dependent on the momentum $y_i$ of the particle is added to the position $x_i$. Then, it is determined whether the particle is colliding to a fully inelastic wall at x=−1.0 and x=+1.0. If there is a collision, the process equivalent to locating the particle to the position of either of the walls is executed. This process can be implemented by using a comparator comp1 and a multiplexer MUX1 of FIG. 32 in the electronic circuit. Also, if the particle is colliding to a fully inelastic wall at x=−1.0 and x=+1.0, the momentum $y_i$ is set to 0.0. This process can be implemented by using a comparator comp2 and a multiplexer MUX2 of FIG. 32 in the electronic circuit. The binarization process is executed in the last part of the TE part. This process can be implemented by using a comparator comp3 and a multiplexer MUX3 of FIG. 32 in the electronic circuit.

Referring to the algorithm of FIG. 27, it can be inferred that if the variables (for example, the position and the momentum) corresponding to the N particles can be calculated in parallel, the overall processing speed can be accelerated. However, difference between the parts where calculation of variables can be executed independently from other variables (in other words, the parts where parallelization is easy) and the parts where dependencies with variables of other particles exists (in other words, the parts where there are restrictions in parallelization) should be considered during the implementation of the Simulated Bifuration Algorithm.

Here, the computational complexity of the algorithm in FIG. 27 is discussed. The computational complexity of the TE part is O(N). On the other hand, the computational complexity of the MM part is $O(N^2)$. TE part includes some sequential processes. However, the TE part can be calculated independently for each particle. Therefore, acceleration of the process by using pipelining or time parallelization is possible for the TE part. The process of the MM part can be accelerated by using parallel processing elements (PEs) and memory sub-systems which can supply necessary data.

In the following, a configuration which accelerates calculation speed by using a plurality of TE pipeline circuits is explained. By using a plurality of TE pipeline circuits, the process of the MM part and the process of the TE part can overlap in the time-domain. Referring to the algorithm of FIG. 27, the process of the MM part needs to be executed and $\Delta y_i$ needs to be calculated for all the indices i (i=1, 2, . . . , N) to update the fourth vector $(s_1, s_2, \ldots, s_N)$. Thus, the fourth vector $(s_1, s_2, \ldots, s_N)$ in the algorithm of FIG. 27 has data dependency. This data dependency becomes an obstacle for overlapping the process of the MM part and the process of the TE part in the time-domain. In order to resolve this data dependency issue, the values of elements in the fourth vector $(s_1, s_2, \ldots, s_N)$ can be saved in a memory having a double-buffer structure. In the following, the memory having a double-buffer structure is going to be referred to as the memory Smem.

Figure 28:
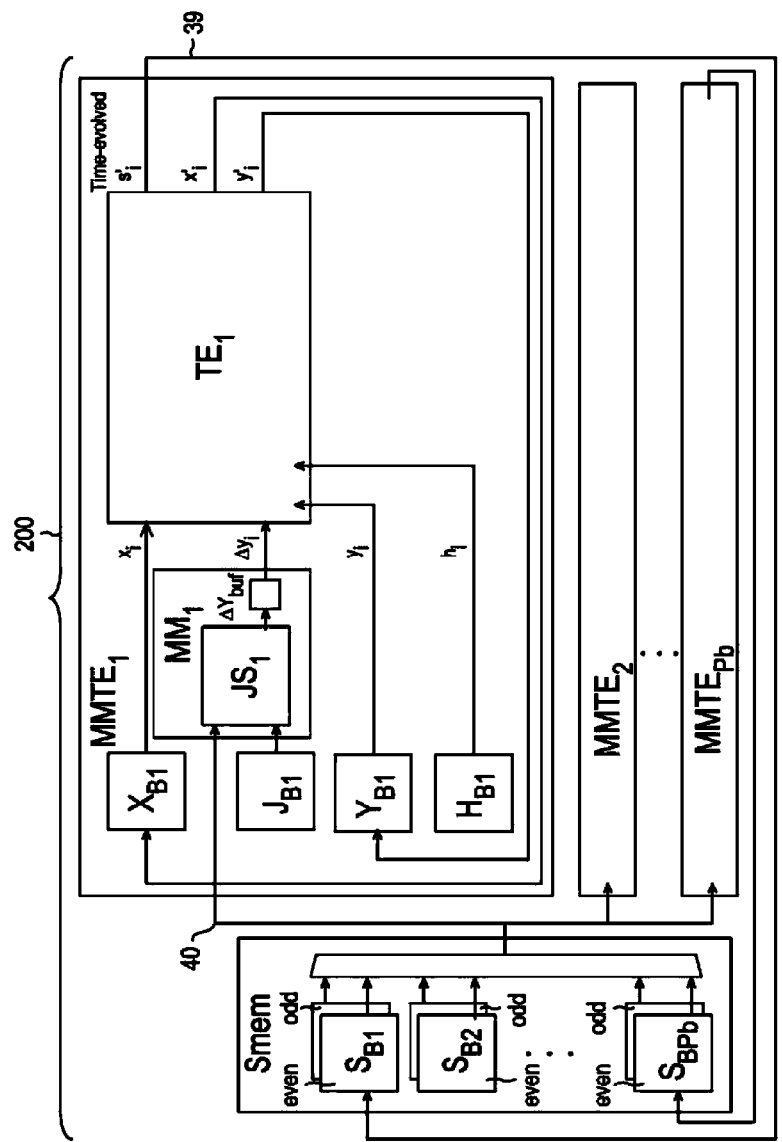
FIG. 28 is a block diagram presenting a configuration example of an electronic circuit.

FIG. 28 is a block diagram presenting a configuration example of an electronic circuit. In order to execute the loop process in the algorithm of FIG. 27, the electronic circuit 200 in FIG. 28 is configured so that data can circulate within each component. In the electronic circuit 200, N particles are divided into Pb groups. Then, the variables are calculated for each of the Pb groups, as presented in FIG. 29. The electronic circuit 200 has at least Pb circuit blocks MMTE (MMTE$_1$ to MMTE$_{Pb}$). The circuit block MMTE executes the MM part process and the TE part process for each of the Nb (Nb=N/Pb) particles belonging to each group. Also, each circuit block MMTE is connected to the memory Smem.

The memory Smem provides storage space which is accessible globally from each of the circuit blocks MMTE$_1$ to MMTE$_{Pb}$. The memory Smem can include volatile memory, non-volatile memory or a combination of these. However, the type of memory used as the memory Smem is not limited. Each circuit block MMTE can be configured so that data writes to the memory Smem and data read from the memory Smem can be executed concurrently or simultaneously. The memory Smem includes Pb areas ($S_{B1}$, $S_{B2}$, . . . , $S_{BPb}$). Also, each of the areas in the memory Smem has a double-buffer structure including an even buffer and an odd buffer. The even buffer and the odd buffer execute a first operation and a second operation alternately. In each of the periods, different operations can be executed for the even buffer and the odd buffer. Thus, during the period when one buffer is executing the first operation, the other buffer can execute the second operation. During the first operation, the buffer can broadcast the fourth vector $(s_1, s_2, \ldots, s_N)$ to the circuit blocks MMTE$_1$ to MMTE$_{Pb}$. During the second operation, the buffer can store the updated variables s received from the circuit blocks MMTE$_1$ to MMTE$_{Pb}$. Here, the buffer includes both the even buffer and the odd buffer.

Thus, the first memory (memory Smem) of the electronic circuit can have Pb first areas and Pb second areas. The first area and the second area can be configured so that when the elements of the fourth vector are broadcasted from the first area to the Pb first circuits (circuit blocks MM$_k$), elements of the fourth vector provided from a second circuit (circuit block TE$_k$) are saved in the second area. Also, the first area and the second area can be configured so that when elements of the fourth vector are broadcasted from the second area to the Pb first circuits, elements of the fourth vector provided from a second circuit (circuit block TE$_k$) are saved in the first area.

The circuit block MMTE$_k$ (k=1, 2, . . . , Pb) includes a circuit block MM$_k$, a circuit block TE$_k$, a memory X$_{Bk}$, a memory Y$_{Bk}$, a memory H$_{Bk}$ and a memory J$_{Bk}$. The memory X$_{Bk}$ stores Nb variables $x_i$. The memory Y$_{Bk}$ stores Nb variables $y_i$. The memory H$_{Bk}$ stores Nb variables $h_i$. The memory J$_{Bk}$ stores Nb*N elements in the J matrix. The circuit block MM$_k$ is connected to the memory Smem and the memory J$_{Bk}$. The circuit block MM$_k$ executes the multiply-accumulate (MAC) operation of the following equation (18) by using Nb*N elements of the J matrix which is read from the memory J$_{Bk}$ and the fourth vector $(s_1, s_2, \ldots, s_N)$ read from the memory Smem. Thereby, $\delta y_i$ is calculated by the circuit block MM$_k$.

$$\sum_{j=1}^{N} J_{ij}(c\Delta t \cdot s_j) \tag{18}$$

The circuit block TE$_k$ is connected to the memory X$_{Bk}$, the memory Y$_{Bk}$, the memory H$_{Bk}$, the memory Smem and the circuit block MM$_k$. The circuit block TE$_k$ uses the variables $x_i$ read from the memory X$_{Bk}$, the variables $y_i$ read from the memory Y$_{Bk}$, the variables $h_i$ read from the memory H$_{Bk}$, and the $\Delta y$ calculated by the circuit block MM$_k$ to execute the process of the TE part by using the pipeline method. Then, the updated variables $x_i$, $y_i$ and $s_i$ are output from circuit block TE$_k$ Also, the circuit block TE$_k$ writes the updated variables $x_i$ to the memory X$_{Bk}$, the updated variables $y_i$ to the memory Y$_{Bk}$ and the updated variables $s_i$ to the area S$_{Bk}$ in the memory Smem, respectively. By the process executed by the circuit block TE$_k$, the updated variables are stored in each memory.

The electronic circuit can include a first circuit (circuit block MM) and a second circuit (circuit block TE). For example, the first circuit is configured to update each of the elements in the third vector based on basic equations, each of the basic equations is a partial derivative of the objective function with respect to either of the variables. Here, the variables of the basic equation can be elements of the first vector or elements of the fourth vector. The fourth vector can be calculated by converting each of the elements in the first vector using a first function which takes either a first value or a second value which is greater than the first value.

The second circuit can be configured to: (1) update an element of the first vector by adding a corresponding element of a second vector or the weighted value of the second vector to the element of the first vector; (2) set an element of the first vector with a value smaller than a first value to the first value; (3) set an element of the first vector with a value greater than a second value to the second value; and (4) update an element of the second vector by adding (i) a weighted product between a first coefficient which increases or decreases monotonically based on number of updates and a corresponding element of the first vector and (ii) a weighted value of a corresponding element of the third vector.

Here, an example of an electronic circuit with a plurality of (Pb) first circuits and a plurality of (Pb) second circuits is explained. However, the electronic circuit can have at least one first circuit and at least one second circuit.

The second circuit can be configured to: convert an element of the first vector with a value smaller than a third value which is between the first value and the second value to the first value; and convert an element of the first vector with a value greater than the third value to the second value, to calculate solutions of the objective function. Also, the second circuit can be configured to calculate the solution of the objective function when the number of updates for the first vector, the second vector and the third vector exceeds a threshold. Furthermore, the second circuit can be configured to update an element of the second vector corresponding to an element of the first vector with a value smaller than the first value or an element of the first vector with a value greater than the second value to a product of the original value of the element in the second vector and a second coefficient. Instead, the second circuit can be configured to set a value of the second vector corresponding to an element of the first vector with a value smaller than the first value or a value of the second vector corresponding to an element of the first vector with a value greater than the second value to a pseudorandom number.

The first circuit can be configured to update the values of each of the elements in the third vector by calculating the value of the basic equations having elements of the first vector as variables and converting the calculated value of the basic equations by the first function. Also, the first circuit can be configured to update the values of each of the elements in the third vector by multiplying a second function having a first coefficient as the parameters.

The electronic circuit can include a first memory connected to a first input side of the first circuit and a second output side of the second circuit. The first memory is configured to store the fourth vector or the first vector. Here, a first output side of the first circuit is connected to a second input side of the second circuit.

Also, the electronic circuit can include a first memory (memory Smem), Pb (2<Pb) first circuits (circuit blocks $MM_k$), and Pb (2<Pb) second circuits (circuit blocks $TE_k$). In this case, Pb first circuits are each connected to the first memory at the first input side. Pb second circuits are: each connected to either of the first circuits at the second input side; and each connected to the first memory at the second output side.

Figure 29:
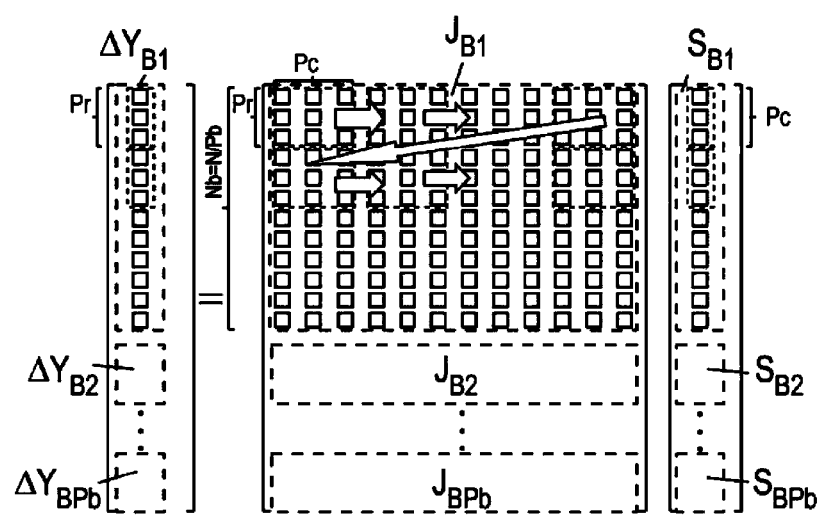
FIG. 29 is a diagram presenting a first example of methods for calculating a product between a matrix and a vector.

As presented in FIG. 29, each of the first circuits (circuit blocks $MM_k$) are configured to calculate elements $\Delta y_i$ of the third vector by multiplying either of the first matrices with dimension N/Pb×Pc and either of the fifth vectors. Here, the first matrices can be obtained by separating the coupling coefficient matrix of N×N dimensions into Pb parts. The fifth vector can be obtained by separating the fourth vector ($s_1$, $s_2$, . . . , $s_N$) into Pb parts. Also, each of the second circuits (circuit blocks $TE_k$) can be configured to update N/Pb elements of the first vector, N/Pb elements of the second vector and N/Pb elements of the fourth vector based on the element $\Delta y_i$ of the third vector calculated by either of the first circuits. The second circuits (circuit blocks $TE_k$) can be configured to save the updated N/Pb elements of the fourth vector in the first memory. Also, each of the first circuits can execute the calculations of the elements $\Delta y_i$ of the third vector in a plurality of turns. For example, each of the first circuits can separate the first matrix of dimension N/Pb×Pc into second matrices (J-sub matrices) of dimension Pr×Pc. Also, each of the first circuits can separate the fifth vectors into a plurality of sixth vectors (s-sub vectors).

Each of the first circuits can be configured to calculate elements of the third vector by executing the product operation between each of the second matrices (dimension Pr×Pc) and the corresponding sixth vector (Pc elements). Also, each of the second circuits can be configured to set an element of the first vector with a value smaller than a first value to the first value and set an element of the first vector with a value greater than a second value to the second value.

Thus, the first circuit (circuit block $MM_k$) in the electronic circuit executes processes corresponding to the aforementioned multiply-accumulator 51. Also, the second circuit (circuit block $TE_k$) in the electronic circuit executes processes corresponding to the aforementioned updater 50.

The electronic circuit can include Pb second memories (memories $X_{Bk}$), Pb third memories (memories $J_{Bk}$), Pb fourth memories (memories $Y_{Bk}$) and Pb fifth memories (memories $H_{Bk}$). Each of the second memories can be configured store Nb=N/Pb elements of the first vector. Each of the third memories can be configured to store either of the first matrices. Each of the fourth memories can be configured to store N/Pb elements of the second vector. Each of the fifth memories can be configured to store N/Pb elements of the sixth vector.

Each of the second memories is connected to the second input side and the second output side of either of the second circuits (circuit block $TE_k$). Each of the third memories is connected to the first input side of either of the first circuits (circuit blocks $MM_k$). Each of the fourth memories is connected to the second input side and the second output side of either of the second circuits. Each of the fifth memories is connected to the second input side of either of the second circuits.

Figure 30:
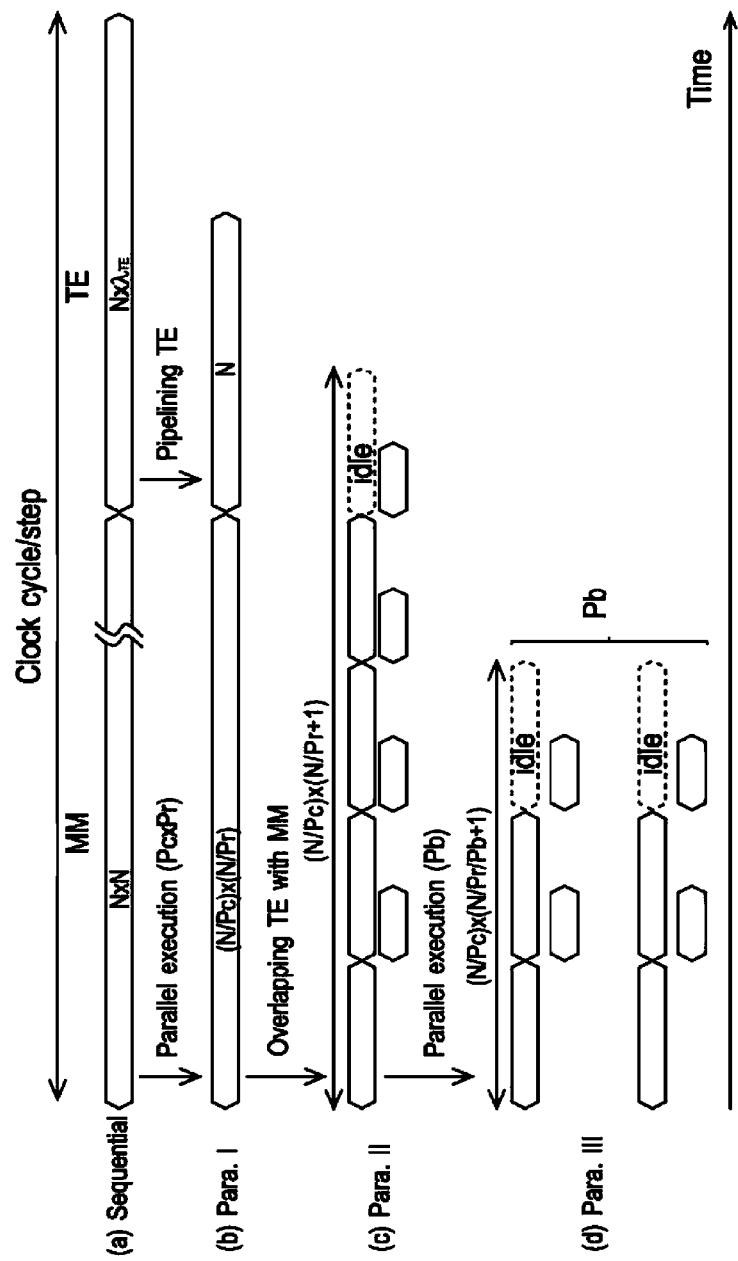
FIG. 30 is a diagram presenting examples of plurality of parallelization methods.

FIG. 30 is a diagram presenting examples of plurality of parallelization methods. The time charts of FIG. 30 include a plurality of cases (a) to (d). The horizontal axis in the time chart of FIG. 30 presents the time. The time corresponds to the number of clock cycles and the number of executed steps.

In FIG. 30, (a) presents a case when processes are executed sequentially by the processor. In the case of (a), execution of the MM part requires N×N clock cycles per processing step. To execute the TE part in the case of (a), N×$\lambda_{TE}$ clock cycles are required for each processing step. Here, $\lambda_{TE}$ indicates the clock cycles necessary to execute the TE part for each particle i.

In FIG. 30, (b) presents a case when level-I parallelization is being applied. In the level-I parallelization, the circuit block $MM_k$ is used to execute multiply-accumulate operations for Pr rows and Pc columns in parallel. Also, in level-I parallelization, the circuit block $TE_k$ is used to execute process in pipelines.

As presented in FIG. 29, the circuit block $MM_k$ calculates the product between the J sub-matrix (Pr×Pc dimensions) and the s sub-vector (Pc elements) in each of the clock cycles. When N/Pc clock cycles elapses since this product calculation has started, the circuit block $MM_k$ outputs the $\Delta y$ sub-vector with Pr elements. This process of N/Pc clock cycles which generates a $\Delta y$ sub-vector is referred to as a process of a single phase. Then, until all the values of $\Delta y_i$ (i=1, 2, . . . , N) are obtained, the process including N/Pr phases is executed. Thus, for the case of (b), the processing speed of the MM part is accelerated by a factor of Pr×Pc, compared to the case of (a). Here, the sub-matrix indicates the part of matrix which is being calculated by the algorithm. Similarly, the sub-vector indicates the part of the vector which is being calculated by the algorithm.

In the case of (b), the circuit block $TE_k$ executes calculation based on the values of $x_i$, $y_i$, hi and $\Delta y_i$ entered in each of the clock cycles. Then, the circuit block $TE_k$ outputs the updated values of $x_i$, $y_i$, $h_i$ and $\Delta y_i$ after the pipeline latency ($\lambda$p). The circuit block $TE_k$ executes each turn of the TE part process in N+$\lambda$p clock cycles. In the case of (b), the processing speed of the TE part is accelerated by approximately the factor of $\lambda_{TB}$, compared to the case of (a).

The case of (c) presents an example when level-II parallelization is applied. In the level-II parallelization, the process of the circuit block $MM_k$ and the process of the circuit block $TE_k$ are executed in parallel. In the first phase, the circuit block $MM_k$ calculates the $\Delta y$ sub-vector with Pr elements. Then, in the second phase, the circuit block $MM_k$ calculates the updated values of the variables $s_i$, $x_i$ and $y_i$ which can be calculated based on the $\Delta y$ sub-vector with Pr elements. Thus, in the second phase, part of the TE part is executed. In the second phase, the circuit block $MM_k$ calculates the next $\Delta y$ sub-vector (Pr elements) in parallel with the calculation process of variables in the circuit block $TE_k$. If level-II parallelization is applied, execution of processes corresponding to N/Pr+1 phases is required. Also, if level-II parallelization is applied, the circuit block $TE_k$ enters idle state in the first phase. Also, the circuit block $MM_k$ enters idle state in the last phase.

The case of (d) presents an example when level-III parallelization is applied. To apply level-III parallelization, Pb pairs each including the circuit block $MM_k$ and the circuit block $TE_k$ needs to be prepared. This pair corresponds to the circuit block $MMTE_k$. The electronic circuit 200 in FIG. 28 presents this configuration example including Pb pairs. In the case of (d), the number of clock cycles required for each processing step equals $N_{cyc\_step}=(N/Pc)\times(N/Pr/Pb+1)+\lambda$. Here, $\lambda$ is the latency in the processing steps. The electronic circuit 200 needs to be in waiting state of $\lambda$ clock cycles in the last turn. This is required to ensure that the latest vector $(s_1, s_2, \ldots, s_N)$ is stored in the memory Smem. Compared to cases (a) to (d) in FIG. 30, it can be inferred that the application of level-III parallelization is most effective for shortening the processing time.

Thus, the first circuit (the circuit block $MM_k$) in the electronic circuit can be configured to calculate elements of the third vector used in the next turn, when the second circuit (the circuit block $TE_k$) is calculating at least either of the N/Pb elements in the first vector, N/Pb elements in the second vector or N/Pb elements in the fourth vector based on the element $\Delta y_i$ of the third vector. At least either of the N/Pb elements in the first vector, N/Pb elements in the second vector or N/Pb elements in the fourth vector can be used by the second circuit when the elements of the third vectors are calculated in the next turn.

The overview of the electronic circuit 200 was described above. Next, details of each of the circuit blocks are explained.

Figure 31:
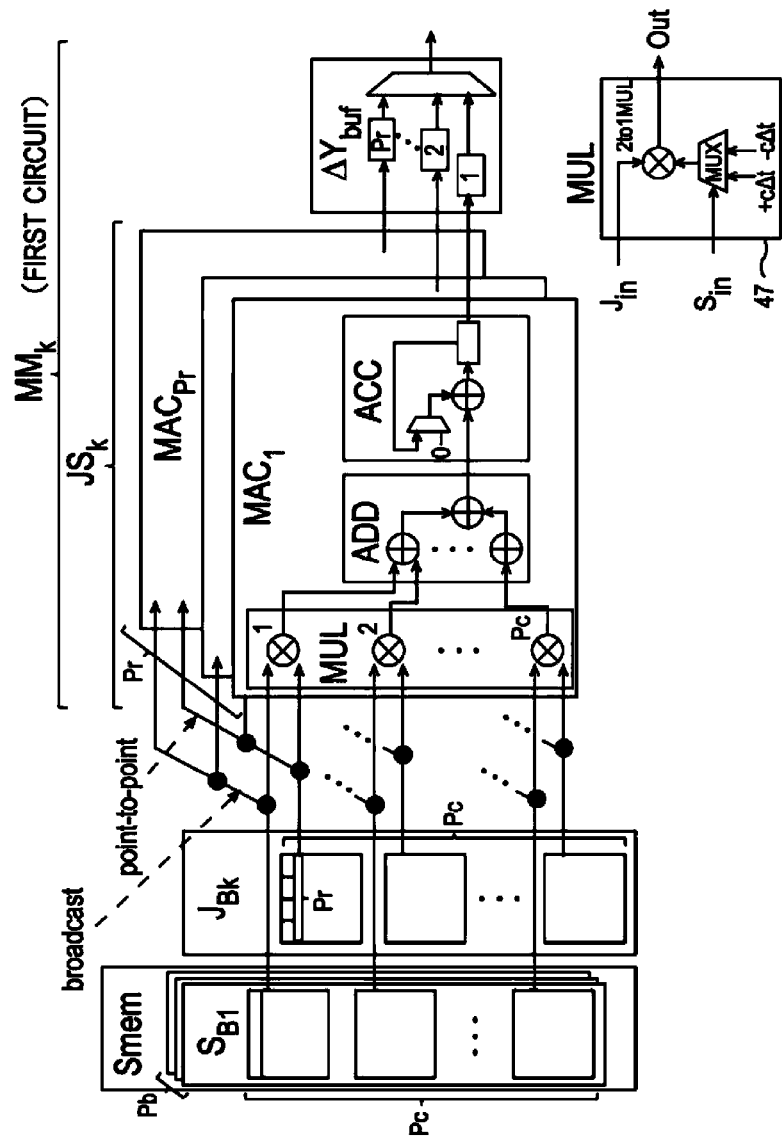
FIG. 31 is a diagram presenting a configuration example of a circuit block $MM_k$.

FIG. 31 is a diagram presenting a configuration example of a circuit block $MM_k$. The circuit block $MM_k$ includes Pr circuit blocks MAC and a buffer $\Delta Y$buf. Depending on needs, the circuit block including Pr circuit blocks MAC is referred to as the circuit block $JS_k$. The output of each of the Pr circuit blocks MAC are entered to the buffer $\Delta Y$buf. In each clock cycle, the circuit block MAC reads a s sub-vector (Pc elements) from either of the areas $S_{Bk}$ (k=1, 2, ..., Pb) in the memory Smem. For the sake of parallel read out of Pc elements of the s sub-vector, each of the areas $S_{Bk}$ (k=1, 2, ..., Pb) in the memory Smem are separated into Pc sub-areas. Each of the Pc sub-areas has a corresponding read port. Each of the areas $S_{Bk}$ (k=1, 2, ..., Pb) in the memory Smem are connected to Pr circuit blocks MAC. By adopting this wiring (connection) topology, the Pc elements of the s sub-vector which are read out from each of the areas $S_{Bk}$ (k=1, 2, ..., Pb) can be broadcasted to the Pr circuit blocks MAC. In FIG. 21, the wirings (connections) from areas other than $S_{B1}$ and Pr circuit blocks MAC are not illustrated.

The circuit block JSk including Pr circuit blocks MAC can read the sub-matrix J with dimension of Pr$\times$Pc from the memory $J_{Bk}$. The memory $J_{Bk}$ has at least Pc areas. The Pc areas in the memory $J_{Bk}$ each have a corresponding read port. Each of the read ports are connected to the Pr circuit blocks MAC. Each of the Pc areas can store Pr elements $J_{ij}$ from the matrix J per word. In each clock cycle, Pc elements $J_{ij}$ are read out from the memory $J_{Bk}$. Point-to-point communication of data is executed in each of the read ports corresponding to the areas in the memory $J_{Bk}$. Thus, Pr elements $J_{ij}$ stored in each word can be transmitted to different circuit blocks MAC. By adopting this configuration, the storage area in the memory $J_{Bk}$ and the access ports including the read ports can be utilized efficiently.

Pr circuit blocks MAC executes the product-sum operations of (18). Then, the Pr circuit blocks MAC outputs and writes Pr values of $\Delta$yi in parallel, every N/Pc clock cycles (in the final clock cycle of each phase). The buffer $\Delta Y$buf outputs the Pr values of $\Delta$yi sequentially during the next phase. Thus, the buffer $\Delta Y$buf is a type of a parallel-input/sequential-output buffer. The electronic circuit 200 in FIG. 28 includes Pb$\times$Pr$\times$Pc MAC arithmetic circuits in total. Each MAC arithmetic circuit is connected to the read port (port $J_{in}$) corresponding to either of the areas in the memory $J_{Bk}$ and the read port (port $S_{in}$) corresponding to either of the sub-areas in either of areas $S_{Bk}$ (k=1, 2, ..., Pb) in the memory Smem. Also, the MAC arithmetic circuit includes a multiplier and an adder for each read port (decoder 47). Details of the decoder 47 are described later.

Figure 32:
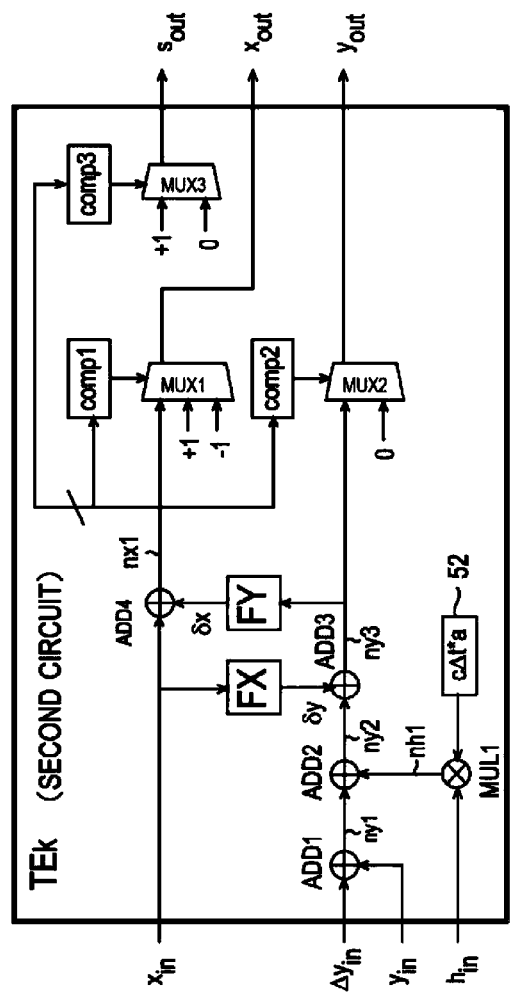
FIG. 32 is a diagram presenting a configuration example of a circuit block $TE_k$.

FIG. 32 is a diagram presenting a configuration example of a circuit block $TE_k$. The circuit block $TE_k$ in FIG. 32 includes input ports xin, yin, hin and $\Delta$yin. Also, the circuit block $TE_k$ in FIG. 32 includes output ports xout, yout and sout. The circuit block $TE_k$ can be configured by using a feed-forward type combinational circuit. The circuit block $TE_k$ also includes adders ADD1 to ADD4, a multiplier MULFX1, an arithmetic circuit FX, an arithmetic circuit FY, multiplexers MUX1 to MUX3 and comparators comp1 to comp3. The adders ADD1 to ADD4 and the multiplier MUL1 each have at least two input terminals and an output terminal. The arithmetic circuit FX is configured to execute the arithmetic operations of function FX(nx) defined in FIG. 27(*d*). The arithmetic circuit FY is configured to execute the arithmetic operations of function FY(ny) defined in FIG. 27(*d*). The multiplexer MUX1 has at least three input terminals, one control terminal and one output terminal. The multiplexers MUX2 and MUX3 each have at least two input terminals, one control terminal and one output terminal.

The input ports $\Delta$yin and yin and of the circuit block $TE_k$ are each connected to the first input terminal of the adder ADD1 and the second input terminal of the adder ADD2, respectively. The output terminal of the adder ADD1 is connected to the first input terminal of the adder ADD2. The first input terminal of the adder ADD2 is connected to the output terminal of the adder ADD1. Also, the output terminal of the multiplier MUL is connected to the second input terminal of the adder ADD2. The first input terminal of the multiplier MUL is connected to the input port hin of the circuit block $TE_k$.

Also, the first input terminal of the adder ADD3 is connected to the output terminal of the adder ADD2. The output terminal of the arithmetic circuit FX is connected to the second input terminal of the adder ADD3. The arithmetic circuit FY and the multiplexer MUX2 are connected to the output terminal of the adder ADD3. The second input terminal of the adder ADD4 is connected to the output terminal of the arithmetic circuit FY. The input port hin is connected to the first input terminal of the multiplier MUL1. Also, the counter 52 is connected to the second input terminal of the multiplier MUL1. The counter 52 is configured to output a second value which increases monotonically according to the number of clock cycles. For example, $c\Delta t \times a$ can be used as the second value. As presented in FIG. 27(a) the value of "a" is incremented according to the number of updates. Since the number of updates is proportional to the number of clock cycles, the value of $c\Delta t \times a$ increases monotonically, according to the number of clock cycles.

The arithmetic circuit FX and the second input terminal of the adder ADD4 are connected to the input port xin of the circuit block $TE_k$. The multiplexer MUX1 and the comparators comp1 to comp3 are connected to the output terminal of the adder ADD4. The output sides of the comparators comp1 to comp3 are each connected to the control terminals of the multiplexers MUX1 to MUX3.

The adder ADD1 outputs the summed signal of the input ports Δyin and yin of the circuit block $TE_k$ to the line ny1. The adder ADD2 outputs the summed signal of the signals provided from the lines ny1 and nh1 to the line ny2. The multiplier MUL1 multiplies the signal provided from the input port hin of the circuit block $TE_k$ from the multiplier MUL1 by $c\Delta t \times a$. The adder ADD3 outputs the summed signal of the signals provided from the lines δy and ny2 to the line ny3. The arithmetic circuit FX executes the operation of the function FX(nx) in FIG. 27(d) to the signal provided to the input port xin of the circuit block $TE_k$. The arithmetic circuit FX outputs the calculated result to the line δy. The adder ADD3 outputs the sum of the signals provided from the lines δx and the input port xin of the circuit block $TE_k$ to the line nx1. The arithmetic circuit FY executes the operation of the function FY(ny) in FIG. 27(d) to the signal provided from the output terminal of the adder ADD3. The arithmetic circuit FY outputs the calculated result to the line δx.

The comparators comp1 to comp3 are each connected to the output terminal of the adder ADD4 via the line nx1. Therefore, the signal provided from the adder ADD4 is provided to the comparators comp1 to comp3, respectively. The comparators comp1 and comp2 determines whether the particle i is at the position $x_i < -1$ or $x_i > 1.0$ after the updating process. This corresponds to the process of determining whether the particle i has collided to the wall or not. The comparator comp3 is configured to determine the sign of the spin $s_i$ based on the position $x_i$ of the particle i after the updating process.

The three input terminals of the multiplexer MUX1 are connected to the output terminal of the adder ADD4 (line nx1), the element providing a constant signal of +1 and the element providing a constant signal of −1, respectively. Also, the control terminal of the multiplexer MUX1 is connected to the output terminal of the comparator comp1. The output terminal of the multiplexer MUX1 is connected to the output port xout of the circuit block $TE_k$. The multiplexer MUX1 is configured to output either the signal from the line nx1, the constant signal of +1 or the constant signal of −1 to the output port xout, depending on the control signal provided from the comparator comp1.

The two input terminals of the multiplexer MUX2 are connected to the output terminal of the adder ADD3 (line ny3) and the element providing a constant signal of 0, respectively. Also, the control terminal of the multiplexer MUX2 is connected to the output terminal of the comparator comp2. The output terminal of the multiplexer MUX2 is connected to the output port yout of the circuit block $TE_k$. The multiplexer MUX2 is configured to output either the signal provided from the adder ADD3 or the constant signal of 0 to the output port yout, based on the control signal provided from the comparator comp2.

The two input terminals of the multiplexer MUX3 are connected to the element providing the constant signal of +1 and the element providing the constant signal of 0, respectively. Also, the control terminal of the multiplexer MUX3 is connected to the output terminal of the comparator comp3. The output terminal of the multiplexer MUX3 is connected to the output port sout of the circuit block $TE_k$. The multiplexer MUX3 is configured to output the constant signal of +1 or the constant signal of 0 based on the control signal provided from the comparator comp3 to the output port sout, based on the control signal provided from the comparator comp3.

Thus, each second circuit (circuit block $TE_k$) can include a counter, a first adder (adder ADD1), a first multiplier (multiplier MUL1), a second adder (adder ADD2), a first arithmetic circuit (arithmetic circuit FX), a third adder (adder ADD3), a second arithmetic circuit (arithmetic circuit FY), a fourth adder (adder ADD4), a first comparator (comparator comp1) and a first multiplexer.

The counter is configured to output a second value which increases or decreases monotonically depending on a number of clock cycles. The first adder is connected to a fourth memory (memory $Y_{Bk}$) and the first circuit (circuit block $MM_k$) in the input side. The first multiplier is connected to a fifth memory (memory $H_{Bk}$) and a counter in the input side. The second adder is connected to the first adder and the first multiplier in the input side. The first arithmetic circuit is connected to a second memory (memory $X_{Bk}$) in the input side. Also, the first arithmetic circuit is configured to output a third value which increases or decreases monotonically depending on the number of clock cycles. For example, $(-D+p)\Delta t$ can be used as the third value. The third adder is connected to the second adder and the first arithmetic circuit in the input side. The second arithmetic circuit is connected to the third adder in the input side. Also, the second arithmetic circuit is configured to output a weighted signal of the input from the third adder. The fourth adder is connected to the second memory and the second arithmetic circuit in the input side. The first comparator is connected to the fourth adder in the input side. The first multiplexer is connected to the fourth adder in the input side. Also, the first multiplexer is configured to output either a first constant signal of the first value (for example, −1) or a second constant signal of the second value (for example, +1) to the second memory based on the input of the first comparator.

Also, each of the second circuits (circuit blocks $TE_k$) can include a second comparator (comparator comp2) and a second multiplexer (multiplexer MUX2). The second comparator is connected to a fourth adder (adder ADD4) in the input side. The second multiplexer is connected to a third adder (adder ADD3) in the input side. The second multiplexer is configured to output a third signal (for example, constant signal of 0) or output the signal of the third adder to the fourth memory (memory $Y_{Bk}$), based on the input from the second comparator.

Also, each of the second circuits (circuit blocks $TE_k$) does not necessary have to include the second comparator (comparator comp2) and the second multiplexer (multiplexer MUX2). In this case, the output terminal of the third adder (adder ADD3) is connected to the output port yout. Thus, the output signal of the third adder is provided to the fourth memory (memory $Y_{Bk}$).

Also, each of the second circuits (circuit blocks $TE_k$) can include a third comparator (comparator comp3) and a third multiplexer (multiplexer MUX3). The third comparator is connected to the fourth adder (adder ADD4) in the input side. The third multiplexer is configured to output a second constant signal of the second value (for example, +1) or a third constant signal (for example, a constant signal of 0) to the first memory (memory Smem), based on the input from the third comparator.

Generally, the spin sa takes the binary values of either −1 or +1. If these values are expressed using signed binary numbers, at least two bits of information are required. However, the spin s can be encoded as a binary variable taking either 0 or 1 as the values. If such encoding is adopted, the values of the spins can be expressed using a single bit of information. Thereby, the amount of transmitted data in the signal lines and the consumption of storage space can be reduced. Thus, a signal wire which transmits a single bit of information instead of multiple bits of information can be used as the line 39 (FIG. 28). Here, the line 39 transmits the updated values of the spins $s_i$ from the circuit block $TE_k$ (k=1, 2, . . . , Pb) to the memory Smem. Also, in the memory Smem, the values of each of the spins sa can each be stored in 1 bit of storage. Also, a signal wire which transmits a single bit of information instead of multiple bits of information can be used as the line 40 (FIG. 28). Here, the line 40 transmits the values of the spins s read out from the memory Smem to the circuit blocks $MM_k$ (k=1, 2, . . . , Pb). The circuit block MUL (FIG. 31) located in the input stage of the circuit block MAC1 executes the encoding to signed binary numbers. Thus, regardless of the fact that 1 bit of information is transmitted in the signal wires and the values of spins $s_i$ are saved in 1 bit format, the functions of the circuit are not limited.

Here, a circuit which converts a single bit of information to signed binary numbers is explained with reference to FIG. 31. The decoder 47 in FIG. 31 describes detailed configuration of the circuit block MUL located in the input stage of the circuit block MAC1. The decoder 47 includes a multiplexer MUX and a multiplier. The multiplexer MUX includes at least two input terminals, one control terminal and one output terminal. The multiplier includes two input terminals and an output terminal. An element which provides a constant signal of +cΔt and an element which provides a constant signal of −cΔt are connected to the two input terminals of the multiplexer MUX, respectively. Also, the read port (port $S_{in}$) corresponding to either of the sub-areas in either of the areas $S_{Bk}$ (k=1, 2, . . . , Pb) in the memory Smem are connected to the control terminal of the multiplexer MUX. Also, the output terminal of the multiplexer MUX is connected to the second input of the multiplier. Also, the first input terminal of the multiplier is connected to the read port (port $J_{in}$) corresponding to either of the areas in the memory $J_{Bk}$. When the signal provided from the port $S_{in}$ is 1, the multiplexer MUX outputs a signal corresponding to the value +cΔt from the output terminal. Also, the multiplexer MUX outputs a signal corresponding to the value −cΔt from the output terminal when the signal provided from the port $S_{in}$ is 0. The multiplier outputs the product signal of the input signal of the multiplexer MUX and the input signal of the port $J_{in}$, from the output terminal Out.

Thus, the first memory (memory Smem) can be configured to save each element of the fourth vector in 1 bit format. In this case, each of the first circuits (circuit blocks $MM_k$) can include a decoder which is configured to decode the 1 bit information read from the first memory to signed binary numbers.

However, the first memory (memory Smem) can save each element of the fourth vector in signed binary number formats. In this case, the third multiplexer (multiplexer MUX3) of the second circuit (circuit block $TE_k$) can output +1 or −1 depending on the input from the third comparator (comparator comp3). It is not necessary to implement a decoder which decodes information read from the first memory in each of the first circuits (circuit blocks $MM_k$). If the algorithm which calculates elements of the third vector using elements of the first vector as variables, each element of the first vector can be stored in the first memory.

(Implementation Example to Plurality of Electronic Circuits)

If the Simulated Bifurcation Algorithm is interpreted as a model of N particles, the Simulated Bifurcation Algorithm is an algorithm which updates the positions and the momentums of the N particles repeatedly. Thus, it can be interpreted that the Simulated Bifurcation Algorithm is a model which calculates the time evolution of the positions and the momentums of the N particles. In the following, the state of the particle i includes the position $x_i$ of the particle i and the momentum $y_i$ of the particle i.

The process of calculating states of N particles can be executed in parallel by using a plurality of electronic circuits. However, in order to calculate the states of N particles at $n_{cycle}$=u+1 using the algorithm of FIG. 27(a), the states of N particles at $n_{cycle}$=u is required. For example, suppose there are M electronic circuits. In this case, each electronic circuit can calculate states of N/M particles at $n_{cycle}$=u+1 based on the states of N particles (all the particles) at $n_{cycle}$=u. Here, each electronic circuit has information on the states of N particles at $n_{cycle}$=u. However, each electronic circuit cannot calculate states of N/M particles at $n_{cycle}$=u+2 without referring to information on the states of (N−N/M) particles at $n_{cycle}$=u+1 calculated by other electronic circuits. Therefore, a configuration where each of the electronic circuits can obtain information on the states of particles calculated by other electronic circuits can be used.

Figure 33:
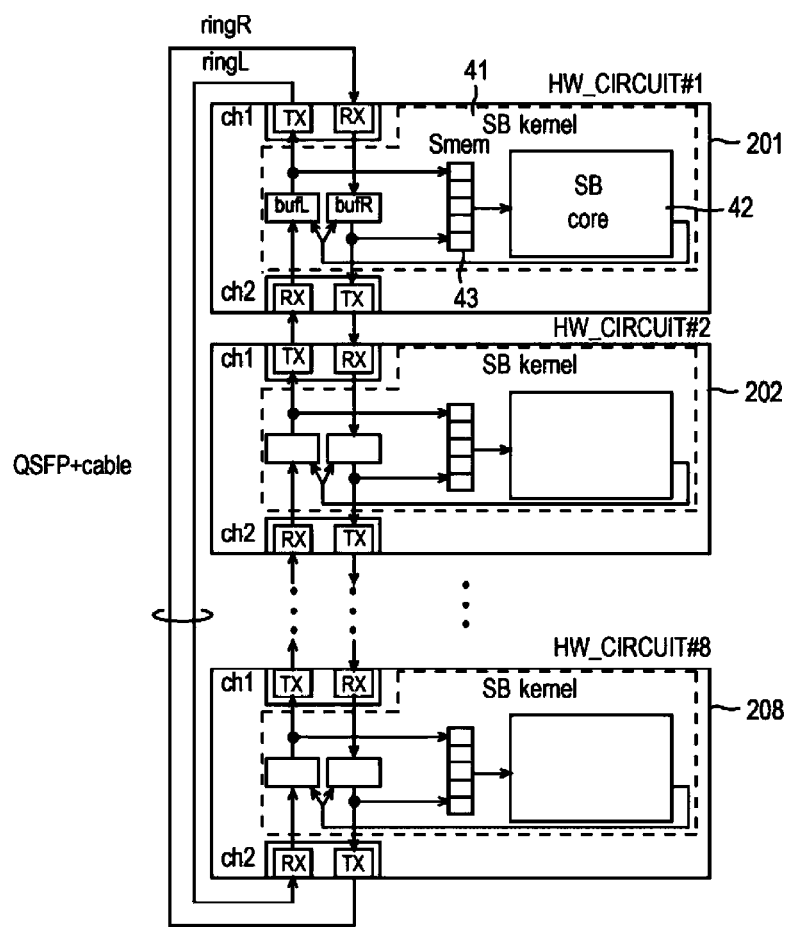
FIG. 33 is a diagram presenting a configuration example including a plurality of electronic circuits can communicate with each other.

FIG. 33 is a diagram presenting a configuration example including a plurality of electronic circuits can communicate which each other. FIG. 33 presents electronic circuits 201 to 208 (HW_CIRCUIT #1-#8). FIG. 33 corresponds to the case when M=8 holds. However, the number of electronic circuits M can take a different value. The electronic circuits 201 to 208 each include a SB Kernel circuit 41, a communication circuit ch1 and a communication circuit ch2. For example, FPGAs can be used as the electronic circuits 201 to 208. However, ASICs can be used as the electronic circuits 201 to 208. Thus, the type of electronic circuit used as the electronic circuits 201 to 208 is not limited. The electronic circuits 201 to 208 can each include communication circuits ch1 and ch2, a buffer memory bufL and a buffer memory bufR besides elements of the aforementioned electronic circuit 200. In the following, details of the computation system including a plurality of electronic circuits and each of the electronic circuits are explained, focusing on the difference from the aforementioned electronic circuit 200.

The communication circuits ch1 and ch2 in FIG. 33 each have a transmission port TX and a reception port RX. The transmission port TX and the reception port RX can operate independently. Therefore, the communication circuits ch1 and ch2 are capable of full-duplex communication. The SB Kernel circuit 41 includes a memory 43 (Smem), an arithmetic circuit 42 (SB Core), a buffer memory bufL and a buffer memory bufR. The memory 43 can save a vector ($s_1$, $s_2$, ..., $s_N$) with N elements. The buffer memories bufL and bufR are each connected to the memory 43. The arithmetic circuit 42 (SB Core) includes Pb circuit blocks $MM_k$ (first circuits), Pb circuit blocks $TE_k$ (second circuits), Pb memories $X_{Bk}$ (second memories), Pb memories $J_{Bk}$ (third memories), Pb memories $Y_{Bk}$ (fourth memories) and Pb memories $H_{Bk}$ (fifth memories). Thus, the arithmetic circuit 42 (SB Core) and memory 43 correspond to the aforementioned electronic circuit 200.

Thus, the electronic circuit can include a first communication circuit (communication circuit ch1), a second communication circuit (communication circuit ch2), a first buffer memory (buffer memory bufL) and a second buffer memory (buffer memory bufR). The first communication circuit includes a first transmission port (transmission port TX of the communication circuit ch1) and a first reception port (reception port RX of the communication circuit ch1). The second communication circuit includes a second transmission port (transmission port TX of the communication circuit ch2) and a second reception port (reception port RX of the communication circuit ch2). The first buffer memory is connected to a first memory (memory 43), a second circuit (circuit block $TE_k$), the second reception port and the first transmission port. The second buffer memory is connected to the first memory, the second circuit (circuit block $TE_k$), the first reception port and the second transmission port.

Referring to FIG. 33, the electronic circuits 201 to 208 are connected to form a ring-topology. Thus, the communication circuit ch2 of the HW_CIRCUIT #h (h=1, 2, ..., M) is connected to the communication circuit ch1 of the HW_CIRCUIT #(h+1). Also, the communication circuit ch2 of the HW_CIRCUIT #M is connected to the communication circuit ch1 of the HW_CIRCUIT #1. Connection between the electronic circuits can be implemented by communication cables. Also, communication between the electronic circuits can be formed by wirings on the board. Thus, the connection between the electronic circuits can be implemented in any way. For example, instead of using physical connections for the communication medium, the plurality of electronic circuits can use wireless communication.

In FIG. 33, a data-ring ringR and a data-ring ringL are formed in the ring-topology. In the data-ring ringR, communication is executed in the clockwise direction. In the data-ring ringL, communication is executed in the anticlockwise direction. The topology of FIG. 33 is called the double ring-topology. Since the communication route in the clockwise direction and the communication route in the anticlockwise direction exists in the ring-topology, the topology of FIG. 33 enables approximately doubled data transmission rate compared to cases when a single ring-topology including only a single communication route is used.

Thus, the computation system can have a plurality of electronic circuits. The first transmission port (the transmission port TX of the communication circuit ch1) of the electronic circuit is connected to the second reception port (the reception port RX of the communication circuit ch2) of a neighboring electronic circuit. Also, the first reception port (the reception port RX of the communication circuit ch1) of the electronic circuit is connected to the second transmission port (the transmission port TX of the communication circuit ch1) of the neighboring electronic circuit By using a plurality of electronic circuits, a ring-shaped communication route can be formed both in the clockwise direction and the anticlockwise direction.

FIG. 34 is a diagram presenting a second example of methods for calculating a product between a matrix and a vector. In the case of FIG. 34, the process is executed concurrently in the plurality of electronic circuits. In the algorithm of FIG. 34, the updating processes of each variable are executed until the counter variable $n_{cycle}$ is incremented to a determined value. In the loop 44, the processes of transmitting data at the transmission ports TX of the communication circuits ch1 and ch2 and the processes of receiving data at the reception ports RX of the communication circuits ch1 and ch2 are executed in each electronic circuit. In the loop 45, part of the matrix-vector product (product-sum operation) is executed in each electronic circuit. In the loop 46, the calculation process corresponding to time-evolution is executed in each electronic circuit.

Figure 35:
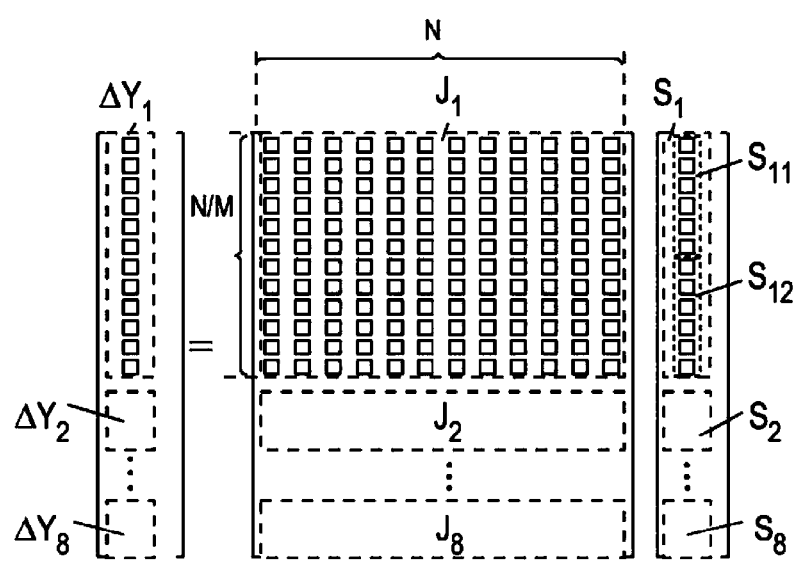
FIG. 35 is a diagram presenting an example of an algorithm executed in each electronic circuit.

FIG. 35 is a diagram presenting an example of an algorithm executed in each electronic circuit. FIG. 35 presents a calculation method of matrix products when the number of electronic circuits M is 8. As presented in FIG. 35, product-sum operations are executed by separating the matrices into M sub-matrices and separating the vectors into M sub-vectors. For example, the HW_CIRCUIT #h calculates the N/M coupling terms ($\Delta Y_h$) by using the matrix $J_n$ with N/M rows and N columns.

As explained in the description of FIG. 27, data corresponding to a full-sized vector ($s_1$, $s_2$, ..., $s_N$) with N elements is required for each HW_CIRCUIT #h(h=1, 2, ..., M) to execute the updating process of variables. Therefore, the HW_CIRCUIT #h can transmit the updated N/M variables $\{s_m|m=(h-1)N/M+1, (h-1)N/M+2, ..., hN/M\}$ to other electronic circuits connected to the HW_CIRCUIT #h. This operation is called the transmission mode. Also, the HW_CIRCUIT #h can receive the N/M variables updated by another electronic circuit connected to the HW_CIRCUIT #h after the updates of variables are done.

For example, if the HW_CIRCUIT #1 is in transmission mode with respect to the data-ring ringR, the updated variables $\{s_m|m=1, 2, ..., N/M\}$ are transmitted to the HW_CIRCUIT #2. In this timing, the HW_CIRCUIT #2 is in reception mode with respect to the data-ring ringR. Simultaneously, the HW_CIRCUIT #1 can be in reception mode with respect to the data-ring ringL. Therefore, the HW_CIRCUIT #1 can receive the updated variables $\{s_m|m=N/M+1, N/M+2, ..., 2N/M\}$ from the HW_CIRCUIT #2 which is in transmission mode with respect to the data-ring ringL. Then, the HW_CIRCUIT #2 can transmit the variables $\{s_m|m=1, 2, ..., N/M\}$ and the variables $\{s_m|m=N/M+1, N/M+2, ..., 2N/M\}$ to the HW_CIRCUIT #3. Thus, the electronic circuit can transmit the updated variables to other electronic circuits which are directly connected to the electronic circuit. Concurrently, the electronic circuit can receive updated variables from other electronic circuits which are directly connected to the electronic circuit. Also, the electronic circuit can forward the variables updated by a first electronic circuit to a second electronic circuit.

As mentioned above, transmission processes and reception processes including the forwarding of data can be executed by each electronic circuit. Therefore, M electronic circuits can use the latest values of the fourth vector ($s_1$, $s_2$, ..., $s_N$) in each iteration of the variable updating processes. However, to ensure that the plurality of electronic circuits connected to form a ring topology can obtain the same data in the updating timings, the operation of the plurality of electronic circuits can be synchronized.

Figure 36:
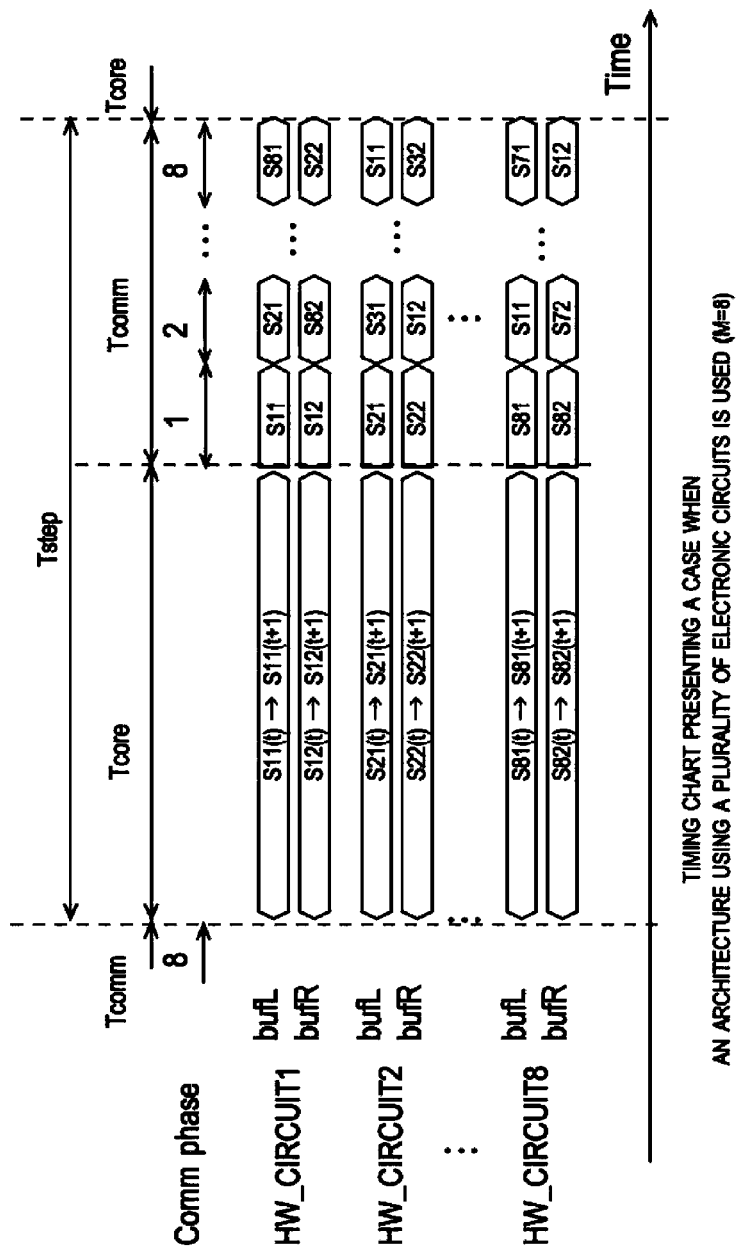
FIG. 36 is a timing chart presenting an example of processes executed by the plurality of electronic circuits.

FIG. 36 is a timing chart presenting an example of processes executed by the plurality of electronic circuits. The horizontal axis of FIG. 36 presents the time. The each of the iteration periods Tstep in the process includes a communication period Tcomm and a calculation period Tcore. In the calculation period Tcore, the updated values of each variable are calculated in the arithmetic circuit 42 (SB Core). Also, the communication period Tcomm includes communication phases equal to the number of electronic circuits M. In order to make the explanation simpler, a case when M electronic circuits operate synchronously is described. However, the number of electronic circuits which operate synchronously can be different. The arithmetic circuit 42 of the HW_CIRCUIT #h updates the variables $\{s_m | m=(h-1)N/M+1, (h-1)N/M+2, \ldots, hN/M\}$ corresponding to the N/M particles during the calculation period Tcore.

In the following, the process executed during one communication phase of the communication period Tcomm is described. The arithmetic circuit 42 separates the updated variables $\{s_m | m=(h-1)N/M+1, (h-1)N/M+2, \ldots, hN/M\}$ into two groups (groups $S_{h1}$ and $S_{h2}$). One group (group $S_{h1}$) is saved in the buffer memory bufL. The other group (group $S_{h2}$) is saved in the buffer memory bufR.

Each electronic circuit (HW_CIRCUIT #1 to #M) can transmit the data stored in the buffer memory bufL by using the data-ring ringL to other electronic circuits via the transmission port TX of the communication circuit ch1. Also, each electronic circuit (HW_CIRCUIT #1 to #M) can transmit the data stored in the buffer memory bufR by using the data-ring ringR to other electronic circuits via the transmission port TX of the communication circuit ch2. The transmission process of data stored in the buffer memory bufL and the transmission process of data stored in the buffer memory bufR can be executed concurrently.

Also, the data stored in the buffer memories bufL and bufR can be stored in the memory 43 (Smem). Thus, the same data contents as the data transmitted from the transmission port TX is saved in the memory 43 (Smem). Also, the process of transmitting the data stored in the buffer memories bufL and bufR to the transmission port TX and the process of saving the corresponding data to the memory 43 (Smem) can be executed concurrently. This operation is called the "send & write" operation.

Thus, the third circuit (for example, the SB Kernel circuit 41) can be configured to separate the fourth vector updated by Pb second circuits (circuit blocks $TE_k$) into first data and second data, store the first data which is a part of the fourth vector to a first buffer memory (buffer memory bufL) and store the second data which is another part of the fourth vector to a second buffer memory (buffer memory bufR). Also, the third circuit can be configured to: transmit the first data stored in the first buffer memory from a first transmission port (the transmission port TX of the communication circuit ch1); transmit the second data stored in the second buffer memory from a second transmission port (the transmission port TX of the communication circuit ch2); save the first data stored in the first buffer memory to the first memory (memory 43) and save the second data stored in the second buffer memory to the first memory (memory 43).

When the process of transmitting the data stored in the buffer memory bufL and the process of transmitting the data stored in the buffer memory bufR are completed, each of the electronic circuits (HW_CIRCUIT #1 to #M) receives and stores data transmitted from other electronic circuits to the buffer memories bufR and bufL. Thus, each of the electronic circuits (HW_CIRCUIT #1 to #M) saves data received via the reception port RX of the communication circuit ch2 to the buffer memory bufL. The reception port RX of the communication circuit ch2 is connected to the data-ring ringL.

Also, each electronic circuit (HW_CIRCUIT #1 to #M) saves data received via the reception port RX of the communication circuit ch1 to the buffer memory bufR. The reception port RX of the communication circuit ch1 is connected to the data-ring ringR. The process of receiving data at the reception port RX (data-ring ringL) of the communication circuit ch2 and the process of receiving data at the reception port RX (data-ring ringR) of the communication circuit ch1 can be executed concurrently. The operation of receiving data before transmission of data described above is called the "first-send-then-receive" policy.

Thus, the third circuit (for example, the SB Kernel circuit 41) can be configured to: store third data received from a second reception port (reception port RX of the communication circuit ch2) to a first buffer memory (buffer memory bufL); store fourth data received from a first reception port (reception port RX of the communication circuit ch1) to a second buffer memory (buffer memory bufR); store the third data to the first memory (memory 43) and store the fourth data to the first memory (memory 43).

Processes executed in a single communication phase include the data transmission process at the data-rings ringR and ringL (this may include the process of storing data to the memory 43) and the data reception process at the data-rings ringR and ringL. By repeating the process of the communication phase M times, which is equal to the number of electronic circuits, M electronic circuits can obtain the latest values of the vector $(s_1, s_2, \ldots, s_N)$ in each iteration (calculation period Tcore) of the variable updating process. The data of the latest vector $(s_1, s_2, \ldots, s_N)$ is saved in the memory 43 (Smem).

In FIG. 33, data was directly transmitted from the buffer memory bufL to the transmission port TX of the communication circuit ch1. Also, data received at the reception port RX of the communication circuit ch2 was transmitted directly to the buffer memory bufL. In FIG. 33, data was transmitted directly from the buffer memory bufR to the transmission port TX of the communication circuit ch2. Also, data received at the reception port RX of the communication circuit ch1 was transmitted directly to the buffer memory bufR. However, as presented in FIG. 36, other memories can be allocated between the communication circuit (communication circuit ch1 or ch2) and the buffer memory (buffer memory bufL or bufR).

Figure 37:
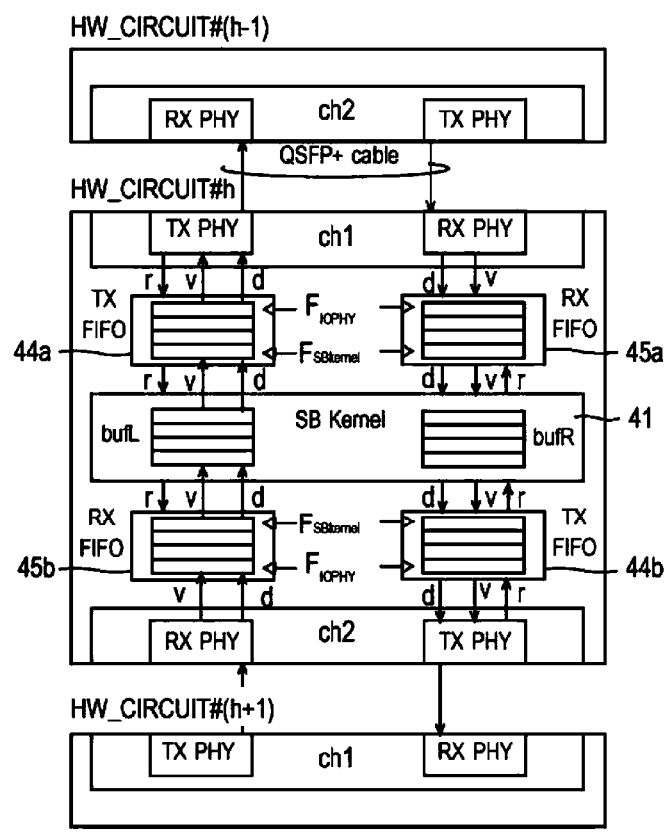
FIG. 37 is a diagram presenting a more detailed configuration example of a communication channel.

FIG. 37 is a diagram presenting a more detailed configuration example of a communication channel. The HW_CIRCUIT #h of FIG. 37 includes memories 44a, 44b, 45a and 45b besides the components of the electronic circuits 201 to 208 in FIG. 33. The transmitter TX PHY in FIG. 37 corresponds to the transmission port TX described above. Also, the receiver RX PHY corresponds to the reception port RX described above. The memory 44a is connected between the transmission port TX of the communication circuit ch1 and the buffer memory bufL. The memory 44b is connected between the transmission port TX of the communication circuit ch2 and the buffer memory bufR. The memory 45a is connected between the reception port RX of the communication circuit ch1 and the buffer memory bufR. The memory 45b is connected between the reception port RX of the communication circuit ch2 and the buffer memory bufL. The memories 44a and 44b correspond to the TX FIFO memories. On the other hand, memories 45a and 45b correspond to the RX FIFO memories. Here, a FIFO memory is a First-In-First-Out type memory. In FIG. 37, the arithmetic circuit 42 (SB Core) and the memory 43 (Smem) are not illustrated.

The data the arithmetic circuit 42 (SB Core) stored in the buffer memory bufL is transmitted to the HW_CIRCUIT #(h−1) from the transmission port TX of the communication circuit ch1 via the memory 44a (TX FIFO memory). The data the arithmetic circuit 42 (SB Core) stored in the buffer memory bufR is transmitted to the HW_CIRCUIT #(h+1) from the transmission port TX of the communication circuit ch2 via the memory 44b (TX FIFO memory). The data received in the reception port RX of the communication circuit ch1 is transmitted to the buffer memory bufR via the memory 45a (RX FIFO memory). The data received in the reception port RX of the communication circuit ch2 is transmitted to the buffer memory bufL via the memory 45b (RX FIFO memory). Thus, the communication channel includes a combination of the transmission port TX, TX FIFO memory and the buffer memory or a combination of the reception port RX, RX FIFO memory and the buffer memory.

The driving frequency $F_{SB\ Kernel}$ of the SB Kernel circuit 41 can be equal to the driving frequency $F_{IOPHY}$ of the communication channel. Also, the driving frequency $F_{SB\ Kernel}$ of the SB Kernel circuit 41 can be different from the driving frequency $F_{IOPHY}$ of the communication channel. The memories 44a, 44b, 45a and 45b (TX FIFO memories and RX FIFO memories) can form a streaming data buffer using heterogeneous read/write speeds during communication processes. For example, the write port of the TX FIFO memory can be driven by the frequency $F_{SB\ Kernel}$. Also, the read port of the TX FIFO memory can be driven by the frequency $F_{IOPHY}$. Also, the read port of the RX FIFO memory can be driven by the frequency $F_{IOPHY}$. The write port of the RX FIFO memory can be driven by the frequency $F_{SB\ Kernel}$.

Figure 38:
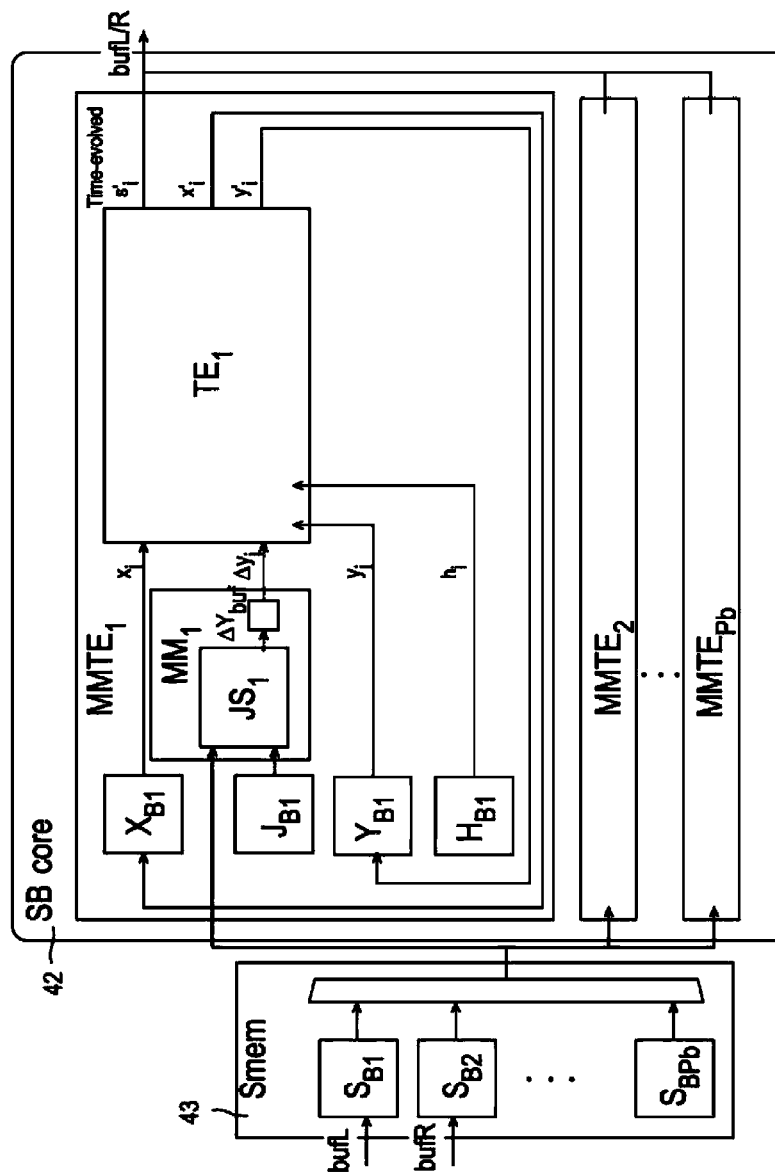
FIG. 38 is a block diagram presenting a configuration example of hardware supporting a ring topology.

FIG. 38 is a block diagram presenting a configuration example of hardware supporting a ring topology. FIG. 38 presents an arithmetic circuit 42 (SB Core) and a memory 43 (Smem). The arithmetic circuit 42 includes the features and elements corresponding to the circuit blocks $MMTE_1$ to $MMTE_{Pb}$ of the aforementioned electronic circuit 200. In the aforementioned electronic circuit 200, the memory Smem adopted a double-buffer structure in order to resolve data dependency issues. However, in the implementation example including the plurality of electronic circuits presented in FIG. 33 and FIG. 37, the buffer memories bufL and bufR resolve the data dependency issues. Thus, the memory 43 in FIG. 38 does not necessary have to be a memory which has a double buffer structure.

Next, the method for synchronizing operations between the plurality of electronic circuits is described. The plurality of electronic circuits does not have to be launched simultaneously. Also, the clocks of the plurality of electronic circuits do not need to be synchronized. In the following, a method to synchronize the operation timings of a plurality of electronic circuits autonomously in a case when the plurality of electronic circuits is launched in different timings is explained. In this case, the clocks of the plurality of electronic circuits are not synchronized. First, the case when the plurality of electronic circuits is synchronized (the time chart of FIG. 39) is explained. Then, the case when each of the electronic circuits is launched sequentially in different timings (the time chart of FIG. 40) is explained. In the time charts of FIG. 39 and FIG. 40, the horizontal axis corresponds to the time.

Figure 39:
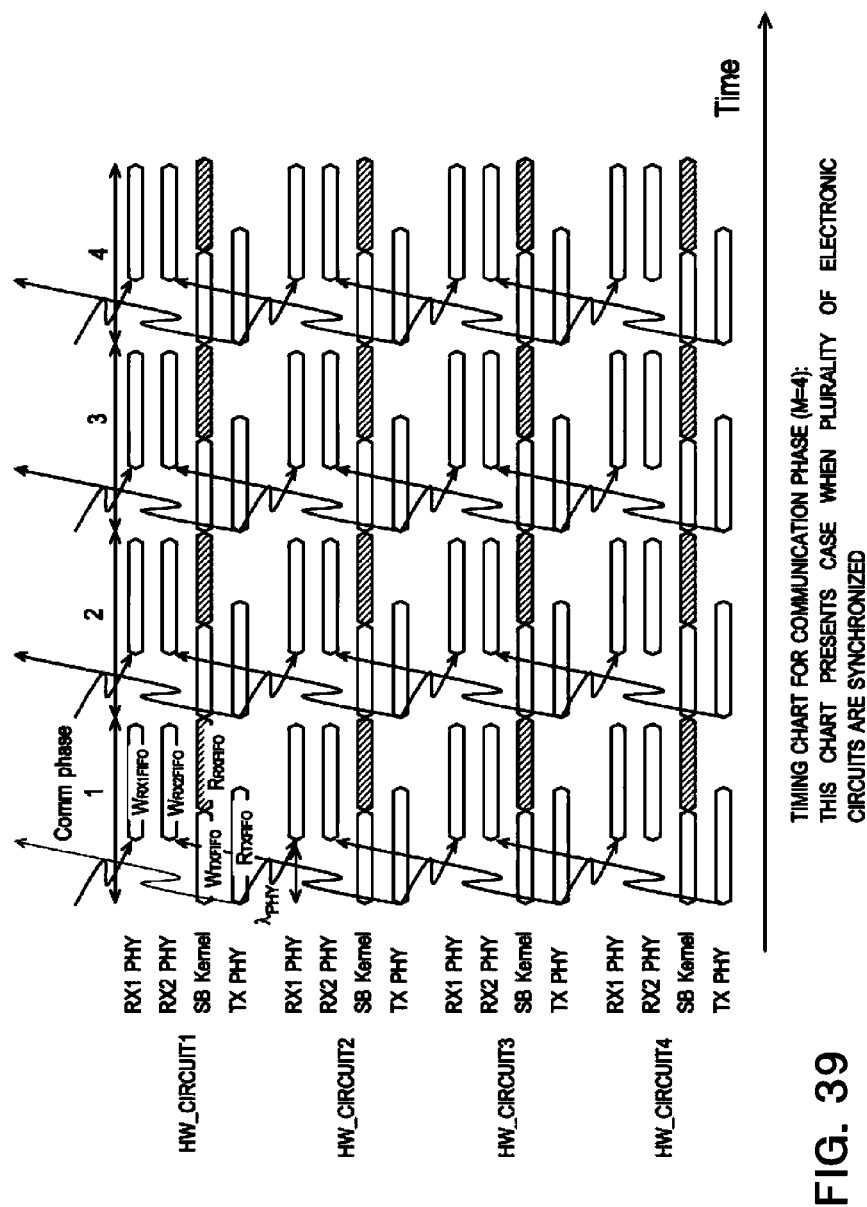
FIG. 39 is a diagram presenting example timings during a communication phase.

In the time chart of FIG. 39, the SB Kernel circuit 41 of the HW_CIRCUIT #h writes out the data stored in the buffer memories bufL and bufR to the TX FIFO (memories 44a and 44b). This operation is called the Twrite_TX FIFO. In this timing, the transmission operation of the transmitter TX PHY starts. The transmitter TX PHY reads out data from the TX FIFO. Then, the transmitter TX PHY transmits the data from the ports TX of the communication circuits ch1 and ch2, concurrently. This operation is called the Tread_TX FIFO.

If data is not stored in the TX FIFO, the transmitter TX PHY does not read out data from the TX FIFO. The transmitted data is stored in the RX FIFO corresponding to the communication circuit ch2 of the HW_CIRCUIT #(h−1) and the RX FIFO corresponding to the communication circuit ch1 of the HW_CIRCUIT #(h+1) after a physical delay of $\lambda_{PHY}$. Here, the physical delay of $\lambda_{PHY}$ includes the internal latency of the transmitter TX PHY, the internal latency of the receiver RX PHY and the delay due to the transmission lines. The physical delay $\lambda_{PHY}$ may include the latency during reception and transmission at the photoelectric conversion element.

The SB Kernel circuit 41 can start the reception process after data is written to the TX FIFO (memories 44a and 44b). Data writes to the TX FIFO corresponds to the transmission process. After the receiver RX PHY receives data, the receiver RX PHY writes the corresponding data to the RX FIFO (memories 45a and 45b). Then, the SB Kernel circuit 41 writes the data stored in the RX FIFO (memories 45a and 45b) to the buffer memories bufL and bufR. The SB Kernel circuit 41 is stallable. Therefore, if data is not stored in either of the RX FIFOs (either memory 45a or 45b), the SB Kernel circuit 41 can enter waiting state (stalling state), writing no data to the buffer memories bufL and bufR. In the time chart of FIG. 39, the SB Kernel circuit 41 is writing data received by the receiver RX PHY to the RX FIFO, before entering the reception process. Therefore, the RX FIFO will not become empty, preventing the SB Kernel circuit 41 from entering stalling state.

Figure 40:
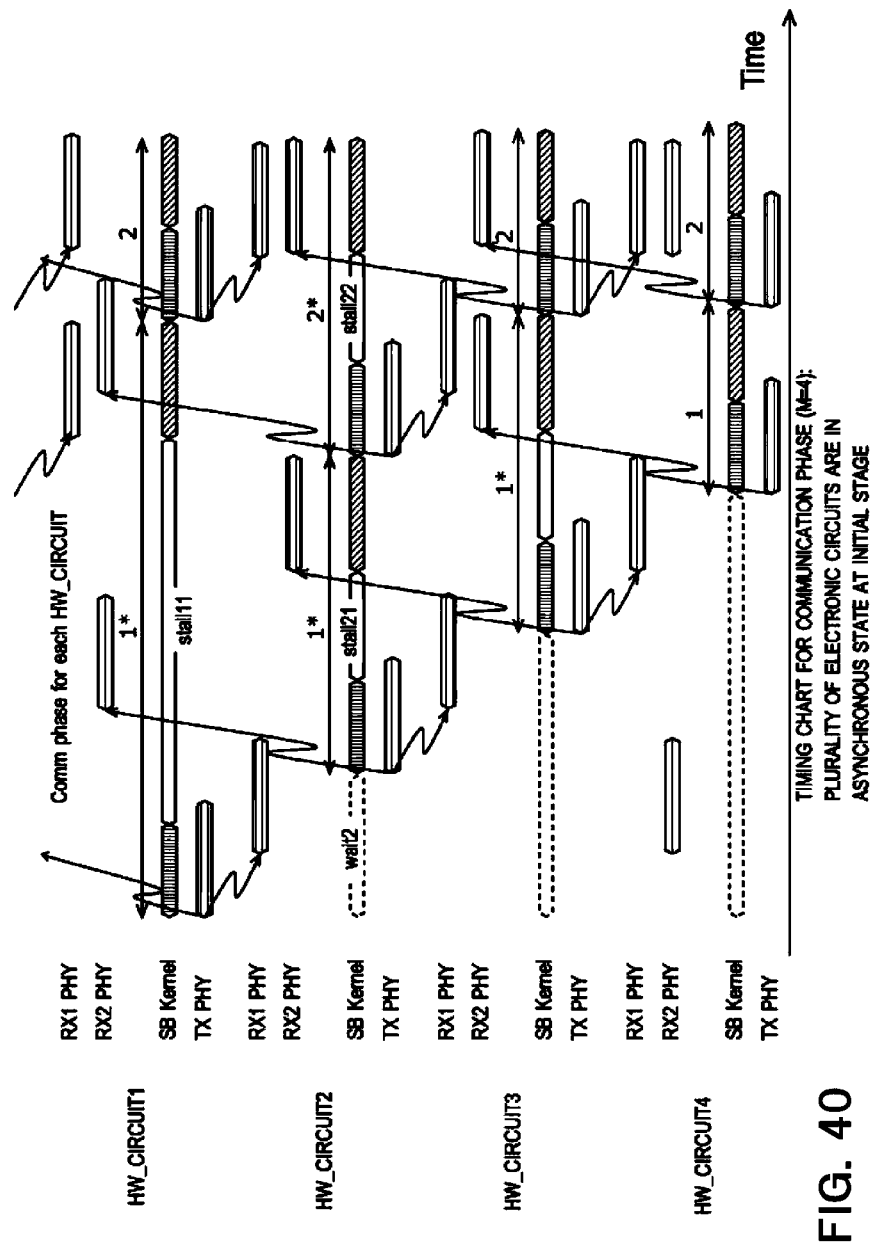
FIG. 40 is a diagram presenting example timings during a communication phase.

In the time chart of FIG. 40, the SB Kernel circuit 41 of the HW_CIRCUIT #h executes transmission operation (data writes to the TX FIFO) regardless of the operation states of other electronic circuits (HW_CIRCUIT). The transmitter TX PHY of the communication circuits ch1 and ch2 checks whether there is any data in the TX FIFO (memories 44a and 44b). If there is any data, the transmitter TX PHY of the communication circuits ch1 and ch2 reads data out of the TX FIFO at an arbitrary timing and transmits the corresponding data. The data read from the TX FIFO of the HW_CIRCUIT #h is stored in the RX FIFO corresponding to the communication circuit ch2 of the HW_CIRCUIT #(h−1) and the RX FIFO corresponding to the communication circuit ch1 of the HW_CIRCUIT #(h+1) after a physical delay of $\lambda_{PHY}$. The receiver RX PHY in the communication circuit ch2 of the HW_CIRCUIT #(h−1) and the receiver RX PHY in the communication circuit ch1 of the HW_CIRCUIT #(h+1) is in the receiving state regardless of control from the host side (SB Kernel circuit 41 side). Therefore, the receiver RX PHY is set to auto-run mode. In this case, if the receiver RX PHY receives any data, the received data is written to the RX FIFO, regardless of the timing.

The receiver RX PHY of the HW_CIRCUIT #h starts the reception process after data is written to the TX FIFO (memories 44a and 44b) by the SB Kernel circuit 41. Here, the data write to the TX FIFO corresponds to the transmission process. However, if data is not stored in either the RX FIFO corresponding to the communication circuit ch1 of the HW_CIRCUIT #h or the RX FIFO corresponding to the communication circuit ch2 of the HW_CIRCUIT #h, the SB Kernel circuit 41 can enter waiting state (stalling state), temporarily. Then, the SB Kernel circuit 41 can resume the reception process if data is stored in both the RX FIFO corresponding to the communication circuit ch1 and the RX FIFO corresponding to the communication circuit ch2. Thus, both the HW_CIRCUIT #(h−1) and the HW_CIRCUIT #(h+1) starts to transmit data. Then, after a period equal to the physical delay Aw has elapsed since transmission of data is completed by both of the electronic circuits, data is stored in both of the RX FIFO. In this case, the SB Kernel circuit 41 exits the waiting state (stalling state) and resumes reception operation. The SB Kernel circuit 41 can write data stored in the RX FIFO (memories 45$a$ and 45$b$) to the buffer memory bufL and bufR.

In the time chart of FIG. 40, the process of entering the waiting state (stalling state) and the process of exiting the waiting state (stalling state) are repeated. Namely, the electronic circuit (HW_CIRCUIT) with no data in the RX FIFO (memories 45$a$ and 45$b$) can enter waiting state. If data received from other electronic circuits is stored in the RX FIFO of the corresponding electronic circuit, the electronic circuit exits waiting state. By repeating the above operation, the operations of the plurality of electronic circuits can be synchronized. By synchronizing operations of the plurality of electronic circuits, the timing differences can be reduced to durations shorter than the length of a single communication phase.

Thus, the electronic circuit can include a first FIFO memory (memory 44$a$), a second FIFO memory (memory 45$a$), a third FIFO memory (memory 45$b$) and a fourth FIFO memory (memory 44$b$). The first FIFO memory is connected between the first transmission port (transmission port TX of the communication circuit ch1) and the first buffer memory (buffer memory bufL). The second FIFO memory is connected between the first reception port (reception port RX of the communication circuit ch1) and the second buffer memory (buffer memory bufR). The third FIFO memory is connected between the second reception port (reception port RX of the communication circuit ch2) and the first buffer memory. The fourth FIFO memory is connected between the second transmission port (transmission port TX of the communication circuit ch2) and the second buffer memory. The third circuit can be configured to transition to a waiting state when data is not stored in both the second FIFO memory and the fourth FIFO memory. Also, the third circuit can be configured to exit the waiting state when the data is stored in both the second FIFO memory and the fourth FIFO memory.

In above, a plurality of implementation examples of the Simulated Bifurcation Algorithm has been described. However, the Simulated Bifurcation Algorithm can be implemented using other configurations. Also, the electronic circuit or the information processing device executing the Simulated Bifurcation Algorithm can be prepared by combining the plurality of implementation examples described above. By using the electronic circuits or the information processing devices according to the above embodiments, the solution of the combinatorial optimization problems can be solved within practical periods. Also, by using the electronic circuits or the information processing devices according to the above embodiments, optimal solutions of the combinatorial optimization problems or the approximate solutions which are closer to the optimal solutions of the combinatorial optimization problems can be calculated.

Particularly, by using the information processing devices, programs, information processing methods, electronic circuits and computation systems described above, Polynomial Unconstrained Binary Optimization (PUBO) including Higher Order Binary Optimization (HOBO) can be solved. If information processing devices, programs, information processing methods, electronic circuits and computation systems capable of handling objective functions including terms of degrees of 3 or higher are used, the introduction of penalty functions to convert objective functions with higher order terms to quadratic functions is no longer necessary. Therefore, by providing the information processing devices, programs, information processing methods, electronic circuits and computation systems described above, various combinatorial optimization problems can be solved more easily.

The embodiments of the disclosure may include the following examples.

Example 1

An information processing device comprising:
a first processing circuit configured to update a third vector based on basic equations, each of the basic equations is a partial derivative of an objective function with respect to either of the variables in the objective function, and the variables of the objective function are elements of a first vector or elements of a fourth vector which is calculated by converting each of the elements in the first vector using a first function which takes either a first value or a second value which is greater than the first value;
a second processing circuit configured to:
update the element of the first vector by adding a corresponding element of a second vector or a weighted value of a second vector to the element of the first vector;
set the element of the first vector smaller than a first value to the first value;
set the element of the first vector greater than a second value to the second value; and
update the element of the second vector by adding a weighted product between a first coefficient which increases or decreases monotonically based on number of updates and a corresponding element of the first vector, and adding a weighted value of the corresponding element of the third vector.

Example 2

The information processing device according to example 1, wherein
the second processing circuit is configured to: convert the element of the first vector smaller than a third value which is between the first value and the second value to the first value; and convert the element of the first vector greater than the third value to the second value to calculate solutions of combinatorial optimization problems.

Example 3

The information processing device according to example 2, wherein
the second processing circuit is configured to calculate the solution of the combinatorial optimization problem when the first coefficient or a number of updates for the first vector, the second vector and the third vector exceeds a threshold.

Example 4

The information processing device according to either one of examples 1 to 3, wherein
the second processing circuit is configured to update the element of the second vector corresponding to the element of the first vector smaller than the first value or the element of the first vector greater than the second value to a product of an original value of the element in the second vector and a second coefficient.

Example 5

The information processing device according to either one of examples 1 to 3, wherein
the second processing circuit is configured to set pseudorandom numbers to either the element of the second vector corresponding to the element of the first vector smaller than the first value or the element of the second vector corresponding to the element of the first vector greater than the second value.

Example 6

The information processing device according to either one of examples 1 to 3, wherein
the second processing circuit is configured to update the element of the second vector corresponding to the element of the first vector with an absolute value greater than 1 by multiplying a second coefficient which is greater than −1 and equal to or less than 0 to an original value of the second vector.

Example 7

The information processing device according to either one of examples 1 to 6, wherein
the first processing circuit is configured to update each of the elements in the third vector based on values of the basic equations converted by the first function, wherein the values of the basic equations are calculated by using the elements of the first vector as variables.

Example 8

The information processing device according to example 7 wherein
the first processing circuit is configured to update each of the elements in the third vector by multiplying a second function having the first coefficient as a parameter.

Example 9

The information processing device according to either one of examples 1 to 8, wherein
the second processing circuit is configured to update the element of the second vector by: calculating a third coefficient by dividing a first vector norm or a fourth vector norm with a third vector norm; adding the weighted product between the first coefficient and the corresponding element of the first vector; and adding the element of the third vector weighted by the third coefficient.

Example 10

The information processing device according to either one of examples 1 to 8, wherein
the second processing circuit is configured to update the element of the second vector by: calculating a third coefficient which is an first inner product between the first vectors divided by a absolute value of an second inner product between the first vector or the fourth vector and the third vector; adding the weighted product between the first coefficient and the corresponding element of the first vector; and adding the element of the third vector weighted by the third coefficient.

Example 11

The information processing device according to either one of examples 1 to 8, wherein
the second processing circuit is configured to update the element of the second vector by: calculating a third coefficient which is equal to a fourth vector norm divided by a third vector norm; adding the weighted product between the first coefficient and the corresponding element of the first vector; and adding the element of the third vector weighted by the third coefficient.

Example 12

The information processing device according to either one of examples 1 to 8, wherein
the second processing circuit is configured to update an element of the second vector by: calculating a third coefficient which is equal to an first inner product between fourth vectors divided by an second inner product between the fourth vector and the third vector; adding the weighted product between the first coefficient and the corresponding element of the first vector; and adding the element of the third vector weighted by the third coefficient.

Example 13

The information processing device according to either one of examples 9 to 12, wherein
the second processing circuit is configured to update the element of the second vector by using a fourth coefficient which is a value of the third coefficient converted by a low-pass filter, instead of the third coefficient.

Example 14

The information processing device according to either one of examples 9 to 13, wherein
the first value is −1, the second value is 1 and the objective function includes a term corresponding to the energy equation of the Ising Model.

Example 15

The information processing device according to example 14, wherein
the objective function includes a many-body interaction term.

Example 16

The information processing device according to either one of examples 1 to 14, wherein the term of the basic equations including the rank-1 tensor decreases or increases monotonically depending on a number of updates.

Example 17

The information processing device according to either one of examples 1 to 16, further comprises:
a plurality of processors;
at least either of the plurality of processors used as the second processing circuit is configured to calculate some of the elements in the first vector and some of the elements in the second vector.

Example 18

The information processing device according to example 17, wherein
at least either of the plurality of processors used as the first processing circuit is configured to update some of the elements in the third vector.

Example 19

The information processing device according to example 17 or 18, further comprising:
a shared memory which is accessible from the plurality of processors, wherein
the updater is configured to save elements of the updated first vector or the updated fourth vector to the shared memory.

Example 20

The information processing device according to either one of examples 17 to 19, wherein
the plurality of processors are cores of a Graphics Processing Unit.

Example 21

A non-transitory computer readable medium having a computer program stored therein which causes a computer to execute processes comprising:
updating a third vector based on basic equations having elements of a first vector or a fourth vector as variables, each of the basic equations is a partial derivative of an objective function with respect to either of the variables in the objective function, and the variables of the objective function are elements of a first vector or elements of a fourth vector which is calculated by converting each of the elements in the first vector using a first function which takes either a first value or a second value which is greater than the first value;
updating the element of the first vector by adding a corresponding element of a second vector or a weighted value of a second vector to the element of the first vector;
setting the element of the first vector smaller than a first value to the first value;
setting the element of the first vector greater than a second value to the second value; and
updating the element of the second vector by adding a weighted product between a first coefficient which increases or decreases monotonically based on a number of updates and a corresponding element of the first vector, and adding a weighted value of the corresponding element of the third vector.

Example 22

An information processing method comprising the steps of:
updating a third vector based on basic equations having elements of a first vector or a fourth vector as variables, each of the basic equations is a partial derivative of an objective function with respect to either of the variables in the objective function, and the variables of the objective function are elements of a first vector or elements of a fourth vector which is calculated by converting each of the elements in the first vector using a first function which takes either a first value or a second value which is greater than the first value;
updating the element of the first vector by adding a corresponding element of a second vector or a weighted value of a second vector to the element of the first vector;
setting the element of the first vector smaller than a first value to the first value;
setting the element of the first vector greater than a second value to the second value; and
updating the element of the second vector by adding a weighted product between a first coefficient which increases or decreases monotonically based on a number of updates and a corresponding element of the first vector, and adding a weighted value of the corresponding element of the third vector.

Example 23

An electronic circuit comprising:
a first circuit configured to update a third vector based on basic equations having elements of a first vector or a fourth vector as variables, each of the basic equations is a partial derivative of an objective function with respect to either of the variables in the objective function, and the variables of the objective function are elements of a first vector or elements of a fourth vector which is calculated by converting each of the elements in the first vector using a first function which takes either a first value or a second value which is greater than the first value; and
a second circuit configured to:
update the element of the first vector by adding a corresponding element of a second vector or a weighted value of a second vector to the element of the first vector;
set the element of the first vector smaller than a first value to the first value; set the element of the first vector greater than a second value to the second value; and
update the element of the second vector by adding a weighted product between a first coefficient which increases or decreases monotonically based on a number of updates and a corresponding element of the first vector, and adding a weighted value of the corresponding element of the third vector.

Example 24

The electronic circuit according to example 23, wherein the second circuit is configured to: convert the element of the first vector smaller than a third value which is between the first value and the second value to the first value; and convert the element of the first vector greater than the third value to the second value to calculate solutions of combinatorial optimization problems.

Example 25

The electronic circuit according to examples 23 or 24, wherein
the second circuit is configured to calculate the solution of the combinatorial optimization problem when the first coefficient or a number of updates for the first vector, the second vector and the third vector exceeds a threshold.

Example 26

The electronic circuit according to either one of examples 23 to 25, wherein
the second circuit is configured to update the element of the second vector corresponding to the element of the first vector smaller than the first value or the element of the first vector greater than the second value to a product of an original value of the element in the second vector and a second coefficient.

Example 27

The electronic circuit according to either one of examples 23 to 25, wherein
the second circuit is configured to set pseudorandom numbers to either the element of the second vector corresponding to the element of the first vector smaller than the first value or the element of the second vector corresponding to the element of the first vector greater than the second value.

Example 28

The electronic circuit according to either one of examples 23 to 27, wherein
the first circuit is configured to update each of the elements in the third vector based on values of the basic equations converted by the first function, wherein the values of the basic equations are calculated by using the elements of the first vector as variables.

Example 29

The electronic circuit according to example 28, wherein
the first circuit is configured to update each of the elements in the third vector by multiplying a second function having the first coefficient as a parameter.

Example 30

The electronic circuit according to either one of examples 23 to 29, further comprising:
a first memory connected to an first input side of the first circuit and an second output side of the second circuit, configured to store the fourth vector or the first vector, wherein
a first output side of the first circuit is connected to a second input side of the second circuit.

Example 31

The electronic circuit according to example 30, wherein
the first memory is configured to save each element of the fourth vector in 1 bit format,
the first circuit includes a decoder which is configured to decode the 1 bit information read from the first memory to signed binary numbers.

Example 32

The electronic circuit according to example 30, wherein
the first circuit is configured to calculate the elements of the third vector used in the next turn, when the second circuit is calculating at least either of the elements in the first vector, the elements in the second vector or the elements in the fourth vector based on the element of the third vector.

Example 33

The electronic circuit according to either one of examples 30 to 32, further comprising:
Pb (Pb is an integer equal to or greater than 2) first circuits; and
Pb (2<Pb) second circuits, wherein
the Pb first circuits are each connected to the first memory at the first input side, and
the Pb second circuits are: each connected to either of the first circuits at the second input side; and each connected to the first memory at the second output side.

Example 34

The electronic circuit according to example 33, wherein
each of the first circuits are configured to calculate the elements of the third vector by multiplying either of first matrices with dimension N/Pb×Pc and either of fifth vectors, the first matrices is obtained by separating a coupling coefficient matrix with N×N dimensions into Pb parts, and the fifth vector can be obtained by separating the fourth vector into Pb parts,
each of the second circuits are configured to: update N/Pb elements of the first vector, N/Pb elements of the second vector and N/Pb elements of the fourth vector based on the element of the third vector calculated by either of the first circuits, and save the updated N/Pb elements of the fourth vector in the first memory.

Example 35

The electronic circuit according to example 34, wherein
each of the first circuits is configured to separate the first matrix of dimension N/Pb×Pc into second matrices of dimension Pr×Pc, separate the fifth vectors into a plurality of sixth vectors, calculate the elements of the third vector by executing the product operation between each of the second matrices and the corresponding sixth vector.

Example 36

The electronic circuit according to examples 34 or 35, further comprising:
Pb second memories each configured store N/Pb elements of the first vector;

Pb third memories each configured to store either of the first matrices;
Pb fourth memories each configured to store N/Pb elements of the second vector; and
Pb fifth memories each configured to store N/Pb elements of the sixth vector, wherein
each of the second memories is connected to the second input side and the second output side of either of the second circuits, each of the third memories is connected to the first input side of either of the first circuits, each of the fourth memories is connected to the second input side and the second output side of either of the second circuits and each of the fifth memories is connected to the second input side of either of the second circuits.

Example 37

The electronic circuit according to example 36, wherein the second circuit includes:
a counter configured to output a second value which increases or decreases monotonically depending clock cycles;
a first adder connected to the fourth memory and the first circuit;
a first multiplier connected to the fifth memory and the counter;
a second adder connected to the first adder and the first multiplier;
a first arithmetic circuit connected to the second memory, configured to output a third value which increases or decreases monotonically depending on the clock cycles;
a third adder is connected to the second adder and the first arithmetic circuit;
a second arithmetic circuit is connected to the third adder and configured to output a weighted signal of the input from the third adder;
a fourth adder is connected to the second memory and the second arithmetic circuit;
a first comparator is connected to the fourth adder; and
a first multiplexer is connected to the fourth adder and configured to output either a first constant signal of the first value or a second constant signal of the second value to the second memory, based on the input of the first comparator.

Example 38

The electronic circuit according to example 37, wherein each of the second circuits include:
a second comparator connected to the fourth adder;
a second multiplexer connected to the third adder and configured to output a third signal or output a signal of the third adder to the fourth memory, based on the input from the second comparator.

Example 39

The electronic circuit according to example 38, wherein each of the second circuits includes:
a third comparator connected to the fourth adder; and
a third multiplexer configured to output a second constant signal of the second value or a third constant signal to the first memory, based on the input from the third comparator.

Example 40

The electronic circuit according to either one of examples 36 to 39, wherein
the first memory has Pb first areas and Pb second areas,
the first area and the second area are configured so that when the elements of the fourth vector are broadcasted from the first area to the Pb first circuits, the elements of the fourth vector provided from the second circuit are saved in the second area, and
the first area and the second area are configured so that when the elements of the fourth vector are broadcasted from the second area to the Pb first circuits, elements of the fourth vector provided from the second circuit are saved in the first area.

Example 41

The electronic circuit according to either one of examples 30 to 40, further comprising:
a first communication circuit including a first transmission port and a first reception port;
a second communication circuit including a second transmission port and a second reception port;
a first buffer memory connected to the first memory, the second circuit, the second reception port and the first transmission port; and
a second buffer memory connected to the first memory, the second circuit, the first reception port and the second transmission port.

Example 42

The electronic circuit according to example 41, further comprising a third circuit is configured to:
separate the fourth vector updated by the Pb second circuits into first data and second data;
store first data which is a part of the separated fourth vector to the first buffer memory;
store second data which is another part of the separated fourth vector to the second buffer memory;
transmit the first data stored in the first buffer memory from the first transmission port;
transmit the second data stored in the second buffer memory from the second transmission port;
save the first data stored in the first buffer memory to the first memory; and save the second data stored in the second buffer memory to the first memory.

Example 43

The electronic circuit according to example 42, wherein the third circuit is configured to:
store third data received from the second reception port to the first buffer memory;
store fourth data received from the first reception port to the second buffer memory;
store the third data to the first memory; and
store the fourth data to the first memory.

Example 44

The electronic circuit according to either one of examples 40 to 43, further comprising:
a first FIFO memory connected between the first transmission port and the first buffer memory;

a second FIFO memory connected between the first reception port and the second buffer memory;
a third FIFO memory connected between the second reception port and the first buffer memory; and
a fourth FIFO memory connected between the second transmission port and the second buffer memory, wherein
the third circuit is configured to transition to a waiting state when data is not stored in both the second FIFO memory and the fourth FIFO memory, and to exit the waiting state when the data is stored in both the second FIFO memory and the fourth FIFO memory.

Example 45

A computation system comprising:
a plurality of electronic circuits according to either one of examples 40 to 44,
the first transmission port of the electronic circuit is connected to the second reception port of a neighboring electronic circuit,
the first reception port of the electronic circuit is connected to the second transmission port of the neighboring electronic circuit, forming a ring-shaped communication route both in the clockwise direction and the anticlockwise direction.

The terms used in the embodiments should be interpreted broadly. For example, the term "processor" may include a general-purpose processor, a central processor (CPU), a microprocessor, a digital signal processor (DSP), a controller, a micro-controller, and a state machine. Depending on situations, the "processor" may indicate an application specific integrated circuit, a field programmable gate array (FPGA), a programmable logic circuit (PLD), and the like. The "processor" may indicate a combination of processing devices such as a plurality of microprocessors, a combination of a DSP and a microprocessor, and one or more microprocessors cooperating with a DSP core.

As another example, the term "memory" may include any electronic component capable of storing electronic information. The "memory" can indicate a random access memory (RAM), a read only memory (ROM), a programmable read only memory (PROM), an erasable programmable read only memory (EPROM), an electrically erasable PROM (EEPROM), a nonvolatile random access memory (NVRAM), a flash memory, and a magnetic or optical data storage. The data saved in the devices mentioned above can be read by a processor. If the processor performs reads, writes or both reads and writes to the memory, the memory can be considered to be communicating electrically with the processor. The memory can be integrated with the processor. In such cases as well, the memory can be considered as communicating electrically with the processor.

The term "storage device" or "storage" may include any device that can store data using magnetic technology, optical technology, or nonvolatile memory. For example, the storage can be a HDD, an optical disk, a SSD, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An optimization problem solver device comprising:
a first processing circuit configured to:
update a third vector based on basic equations, each of the basic equations is a partial derivative of an objective function with respect to either of variables in the objective function, and the variables of the objective function are elements of a first vector or elements of a fourth vector, wherein the fourth vector is calculated by converting each of the elements in the first vector using a first function which takes either a first value or a second value, wherein the second value is greater than the first value;
a second processing circuit connected to a first output side of the first processing circuit and configured to:
update the elements of the first vector by adding a corresponding element of a second vector or a weighted value of a second vector to the elements of the first vector;
set the elements of the first vector smaller than a first value to the first value;
set the elements of the first vector greater than a second value to the second value; and
update the elements of the second vector by adding a weighted product between a first coefficient which increases or decreases monotonically based on a number of updates and a corresponding element of the first vector to the corresponding element of the second vector, and adding a weighted value of the corresponding element of the third vector to the corresponding element of the second vector;
a first memory connected to a first input side of the first processing circuit and a second output side of the second processing circuit, and configured to store the first vector or the fourth vector;
a second memory connected to a second input side and the second output side of the second processing circuit, and configured to store the first vector; and
a fourth memory connected to the second input side and the second output side of the second processing circuit, and configured to store the second vector,
wherein
the first processing circuit is configured to calculate the elements of the third vector based on the partial derivative of the objective function by using the first vector or the fourth vector read from the first memory, and
the second processing circuit is configured to:
update the first vector and the second vector by using the third vector calculated by the first processing circuit and save the updated first vector in the first memory; or
update the first vector, the second vector, and the fourth vector by using the third vector calculated by the first processing circuit, and save the updated fourth vector in the first memory.

2. The optimization problem solver device according to claim 1, wherein
the second processing circuit is configured to update the elements of the second vector corresponding to the elements of the first vector smaller than the first value or the elements of the first vector greater than the second value to a product of an original value of the element in the second vector and a second coefficient.

3. The optimization problem solver device according to claim 1, wherein
the first processing circuit is configured to update each of the elements in the third vector based on a values of the basic equations converted by the first function, wherein the values of the basic equations are calculated by using the elements of the first vector as variables.

4. The optimization problem solver device according to claim 1, wherein
the second processing circuit is configured to update the elements of the second vector by: calculating a third coefficient by dividing a first vector norm or a fourth vector norm with a third vector norm; adding the weighted product between the first coefficient and the corresponding element of the first vector to the corresponding element of the second vector; and adding the element of the third vector weighted by the third coefficient to the corresponding element of the second vector.

5. The optimization problem solver device according to claim 1, wherein
the second processing circuit is configured to update the elements of the second vector by: calculating a third coefficient which is a first inner product between the first vectors divided by an absolute value of a second inner product between the first vector or the fourth vector and the third vector; adding the weighted product between the first coefficient and the corresponding element of the first vector to the corresponding element of the second vector; and adding the element of the third vector weighted by the third coefficient to the corresponding element of the second vector.

6. The optimization problem solver device according to claim 4, wherein
the second processing circuit is configured to update the elements of the second vector by using a fourth coefficient which is a value of the third coefficient converted by a low-pass filter, instead of the third coefficient.

7. The optimization problem solver device according to claim 1, wherein
the first value is −1, the second value is 1 and the objective function includes a term corresponding to an energy equation of the Ising Model.

8. The optimization problem solver device according to claim 7, wherein
the objective function includes a many-body interaction term.

9. A non-transitory computer readable medium having a computer program stored therein which causes a computer to function as:
a first circuit updating a third vector based on basic equations having elements of a first vector or a fourth vector as variables, each of the basic equations is a partial derivative of an objective function with respect to either of variables in the objective function, and the variables of the objective function are elements of a first vector or elements of a fourth vector, wherein the fourth vector is calculated by converting each of the elements in the first vector using a first function which takes either a first value or a second value, wherein the second value is greater than the first value;
a second circuit connected to a first output side of the first circuit and:
updating the elements of the first vector by adding a corresponding element of a second vector or a weighted value of a second vector to the elements of the first vector;
setting the elements of the first vector smaller than a first value to the first value;
setting the elements of the first vector greater than a second value to the second value; and
updating the elements of the second vector by adding a weighted product between a first coefficient which increases or decreases monotonically based on a number of updates and a corresponding element of the first vector to the corresponding element of the second vector, and adding a weighted value of the corresponding element of the third vector to the corresponding element of the second vector,
wherein
the first circuit is configured to calculate the elements of the third vector based on the partial derivative of the objective function by using the first vector or the fourth vector read from a first memory connected to a first input side of the first circuit and a second output side of the second circuit, and
the second circuit is configured to:
update the first vector and the second vector by using the third vector calculated by the first circuit and save the updated first vector in the first memory; or
update the first vector, the second vector, and the fourth vector by using the third vector calculated by the first circuit, and save the updated fourth vector in the first memory.

10. An optimization problem solver method comprising the steps of:
updating, by a first circuit, a third vector based on basic equations having elements of a first vector or a fourth vector as variables, each of the basic equations is a partial derivative of an objective function with respect to either of variables in the objective function, and the variables of the objective function are elements of a first vector or elements of a fourth vector, wherein the fourth vector is calculated by converting each of the elements in the first vector using a first function which takes either a first value or a second value, wherein the second value is greater than the first value;
updating, by a second circuit connected to a first output side of the first circuit, the elements of the first vector by adding a corresponding element of a second vector or a weighted value of a second vector to the elements of the first vector;
setting, by the second circuit, the elements of the first vector smaller than a first value to the first value;
setting, by the second circuit, the elements of the first vector greater than a second value to the second value; and
updating, by the second circuit, the elements of the second vector by adding a weighted product between a first coefficient which increases or decreases monotonically based on a number of updates and a corresponding element of the first vector to the corresponding element of the second vector, and adding a weighted value of the corresponding element of the third vector to the corresponding element of the second vector,
wherein
the method further comprises calculating, by the first circuit, the elements of the third vector based on the partial derivative of the objective function by using the first vector or the fourth vector read from a first memory connected to the first input side of the first circuit and a second output side of the second circuit, and the method further comprises:
updating, by the second circuit, the first vector and the second vector by using the third vector calculated by the first circuit and saving the updated first vector in the first memory; or updating, by the second circuit, the first vector, the second vector, and the fourth vector by using the third vector calculated by the first circuit and saving the updated fourth vector in the first memory.

11. An optimization problem solver circuit comprising:
a first circuit configured to update a third vector based on basic equations having elements of a first vector or a fourth vector as variables, each of the basic equations is a partial derivative of an objective function with respect to either of variables in the objective function, and the variables of the objective function are elements of a first vector or elements of a fourth vector, wherein the fourth vector is calculated by converting each of the elements in the first vector using a first function which takes either a first value or a second value, wherein the second value is greater than the first value;

a second circuit connected to a first output side of the first circuit and configured to:
update the elements of the first vector by adding a corresponding element of a second vector or a weighted value of a second vector to the elements of the first vector;
set the elements of the first vector smaller than a first value to the first value;
set the elements of the first vector greater than a second value to the second value; and
update the elements of the second vector by adding a weighted product between a first coefficient which increases or decreases monotonically based on a number of updates and a corresponding element of the first vector to the corresponding element of the second vector, and adding a weighted value of the corresponding element of the third vector to the corresponding element of the second vector;

a first memory connected to a first input side of the first circuit and a second output side of the second circuit, and configured to store the first vector or the fourth vector;

a second memory connected to a second input side and the second output side of the second circuit, and configured to store the first vector; and a fourth memory connected to the second input side and the second output side of the second circuit, and configured to store the second vector, wherein
the first circuit is configured to calculate the elements of the third vector based on the partial derivative of the objective function by using the first vector or the fourth vector read from the first memory, and
the second circuit is configured to:
update the first vector and the second vector by using the third vector calculated by the first circuit and save the updated first vector in the first memory; or
update the first vector, the second vector, and the fourth vector by using the third vector calculated by the first circuit, and save the updated fourth vector in the first memory.

12. The optimization problem solver circuit according to claim 11, wherein
the second circuit is configured to update the elements of the second vector corresponding to the elements of the first vector smaller than the first value or the elements of the first vector greater than the second value to a product of an original value of the element in the second vector and a second coefficient.

13. The optimization problem solver circuit according to claim 11, wherein
the first circuit is configured to update each of the elements in the third vector based on values of the basic equations converted by the first function, wherein the values of the basic equations are calculated by using the elements of the first vector as variables.

14. The optimization problem solver circuit according to claim 11, wherein
the first memory is configured to save each element of the fourth vector in 1 bit format,
the first circuit includes a decoder which is configured to decode 1 bit information read from the first memory to signed binary numbers.

15. The optimization problem solver circuit according to claim 11, wherein
the first circuit is configured to calculate elements of the third vector used in a next turn, when the second circuit is calculating at least one of the elements in the first vector, the elements in the second vector or the elements in the fourth vector based on the elements of the third vector.

16. The optimization problem solver circuit according to claim 11, further comprising:
Pb (Pb is an integer equal to or greater than 2) first circuits; and
Pb (2<Pb) second circuits, wherein
the Pb first circuits are each connected to the first memory at the first input side, and
the Pb second circuits are: each connected to one of the first circuits at the second input side; and each connected to the first memory at the second output side.

17. The optimization problem solver circuit according to claim 16, wherein
each of the first circuits is configured to calculate the elements of the third vector by using one of the first vectors or one of fifth vectors, the fifth vector being obtained by separating the fourth vector into Pb parts.

18. The optimization problem solver circuit according to claim 17, wherein
each of the first circuits is configured to separate the fifth vectors into a plurality of sixth vectors, calculate the elements of the third vector by using the sixth vectors.

19. The optimization problem solver circuit according to claim 18, wherein
the second memory is one of Pb second memories each configured to store N/Pb elements of the first vector;
the fourth memory is one of Pb fourth memories each configured to store N/Pb elements of the second vector; and
the circuit further comprises Pb fifth memories each configured to store N/Pb elements of the sixth vector, wherein
each of the second memories is connected to the second input side and the second output side of one of the second circuits, each of the fourth memories is connected to the second input side and the second output side of one of the second circuits, and each of the fifth memories is connected to the second input side of one of the second circuits.

20. A non-transitory computer readable medium storing circuit information described in hardware description language, the circuit information makes an electric circuit to be as a calculation device that execute calculations for optimization problem using an objective function as an evaluation value by using a first vector, a second vector, and a third vector included in a term corresponding to the objective function, the calculation device comprises:

a first circuit updating the third vector based on basic equations, each of the basic equations is a partial derivative of the objective function with respect to either of variables in the objective function, and the variables of the objective function are elements of the first vector or elements of a fourth vector, wherein the fourth vector is calculated by converting each of the elements in the first vector using a first function which takes either a first value or a second value, wherein the second value is greater than the first value;

a second circuit connected to a first output side of the first circuit and:
  updating the elements of the first vector by adding a corresponding element of the second vector or a weighted value of the second vector to the elements of the first vector;
  setting the elements of the first vector smaller than a first value to the first value;
  setting the elements of the first vector greater than a second value to the second value; and
  updating the elements of the second vector by adding a weighted product between a first coefficient which increases or decreases monotonically based on a number of updates and a corresponding element of the first vector to the corresponding element of the second vector, and adding a weighted value of the corresponding element of the third vector to the corresponding element of the second vector, wherein
  the first circuit is configured to calculate the elements of the third vector based on the partial derivative of the objective function by using the first vector or the fourth vector read from a first memory connected to the first input side of the first circuit and a second output side of the second circuit, and
  the second circuit is configured to:
    update the first vector and the second vector by using the third vector calculated by the first processing circuit and save the updated first vector in the first memory, or
    update the first vector, the second vector, and the fourth vector by using the third vector calculated by the first circuit, and save the updated fourth vector in the first memory.

21. A server comprising:
the non-transitory computer readable medium according to claim 20; and
at least one processor sending the circuit information to at least one other devices.

22. A non-transitory computer readable medium storing circuit information described in hardware description language, the circuit information makes a reconfigurable semiconductor device to be as a calculation device that execute calculations for optimization problem using an objective function as an evaluation value by using a first vector, a second vector, and a third vector included in a term corresponding to the objective function, the calculation device comprises:

a first circuit updating the third vector based on basic equations, each of the basic equations is a partial derivative of the objective function with respect to either of variables in the objective function, and the variables of the objective function are elements of the first vector or elements of a fourth vector, wherein the fourth vector is calculated by converting each of the elements in the first vector using a first function which takes either a first value or a second value, wherein the second value is greater than the first value;

a second circuit connected to a first output side of the first circuit and:
  updating the elements of the first vector by adding a corresponding element of the second vector or a weighted value of the second vector to the elements of the first vector;
  setting the elements of the first vector smaller than a first value to the first value;
  setting the elements of the first vector greater than a second value to the second value; and
  updating the elements of the second vector by adding a weighted product between a first coefficient which increases or decreases monotonically based on a number of updates and a corresponding element of the first vector to the corresponding element of the second vector, and adding a weighted value of the corresponding element of the third vector to the corresponding element of the second vector, wherein
the first circuit is configured to calculate the elements of the third vector based on the partial derivative of the objective function by using the first vector or the fourth vector read from a first memory connected to the first input side of the first circuit and a second output side of the second circuit, and
the second circuit is configured to:
  update the first vector and the second vector by using the third vector calculated by the first circuit and save the updated first vector in the first memory, or
  update the first vector, the second vector, and the fourth vector by using the third vector calculated by the first circuit, and save the updated fourth vector in the first memory.

23. A server comprising:
the non-transitory computer readable medium according to claim 22; and
at least one processor sending the circuit information to at least one other device.

* * * * *